US010263802B2

(12) United States Patent
Burns et al.

(10) Patent No.: US 10,263,802 B2
(45) Date of Patent: Apr. 16, 2019

(54) METHODS AND DEVICES FOR ESTABLISHING CONNECTIONS WITH REMOTE CAMERAS

(71) Applicant: GOOGLE LLC, Mountain View, CA (US)

(72) Inventors: Christopher Charles Burns, Santa Clara, CA (US); Gregory Cortis Clark, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 185 days.

(21) Appl. No.: 15/208,585

(22) Filed: Jul. 12, 2016

(65) Prior Publication Data

US 2018/0019889 A1 Jan. 18, 2018

(51) Int. Cl.
*H04L 12/28* (2006.01)
*H04L 12/46* (2006.01)
(Continued)

(52) U.S. Cl.
CPC ........ *H04L 12/2807* (2013.01); *H04L 12/282* (2013.01); *H04L 12/4625* (2013.01);
(Continued)

(58) Field of Classification Search
CPC ............. H04L 12/2807; H04L 12/4625; H04L 12/282; H04L 2012/2841;
(Continued)

(56) References Cited

U.S. PATENT DOCUMENTS 5,625,410 A 4/1997 Washino et al.
5,765,485 A 6/1998 Thoman et al.
(Continued)

FOREIGN PATENT DOCUMENTS

WO WO 2006/120596 11/2006
WO WO 2014/137372 9/2014

OTHER PUBLICATIONS

"Dropcam", posted at play.google.com, Aug. 20, 2015, [site visited Jan. 17, 2017]. Available from Internet: <https://play.google.com/store/apps/details?id=com.dropcam.android>.
(Continued)

*Primary Examiner* — Marly S Camargo
(74) *Attorney, Agent, or Firm* — Morgan, Lewis & Bockius LLP

(57) ABSTRACT

The various embodiments described herein include methods, devices, and systems for presenting video feeds in a user interface. In one aspect, a method includes: (1) receiving a request to execute an application for communicating with a plurality of smart devices, including a plurality of cameras; (2) in response to receiving the request, establishing a connection for each of at least a subset of the cameras; (3) identifying a user interface for display to a user via the display, the user interface including a video feed from a particular camera; (4) after identifying the user interface, determining whether a connection has been established for the particular camera; (5) in accordance with a determination that the connection has been established for the particular camera, requesting, via the connection, the video feed for the particular camera; and (6) displaying the user interface with the video feed for the particular camera.

19 Claims, 55 Drawing Sheets

(51) Int. Cl.
  *H04W 4/80* (2018.01)
  *H04W 4/60* (2018.01)
(52) U.S. Cl.
  CPC  *H04L 2012/285* (2013.01); *H04L 2012/2841* (2013.01); *H04L 2012/2849* (2013.01)
(58) Field of Classification Search
  CPC ..... H04L 2012/2849; H04L 2012/285; H04W 4/80; H04W 4/60; H24F 11/30
  USPC ......... 725/105; 709/203, 227, 230; 710/1, 2, 710/3, 4, 5, 20, 53, 58; 715/744; 345/473; 348/211.3
  See application file for complete search history.

(56) References Cited

U.S. PATENT DOCUMENTS

| | | |
|---|---|---|
| D424,036 S | 5/2000 | Arora et al. |
| D456,293 S | 4/2002 | Tsumura et al. |
| 6,593,956 B1 | 7/2003 | Potts |
| D550,227 S | 9/2007 | Sato et al. |
| 7,382,244 B1 | 6/2008 | Donovan et al. |
| D597,864 S | 8/2009 | Sakuma et al. |
| D607,004 S | 12/2009 | Kordus et al. |
| D621,730 S | 8/2010 | Driver et al. |
| D626,131 S | 10/2010 | Kruzeniski et al. |
| 7,877,708 B2 | 1/2011 | Zinn et al. |
| 7,884,855 B2 | 2/2011 | Ortiz |
| 7,903,115 B2 | 3/2011 | Platzer et al. |
| 7,996,771 B2 | 8/2011 | Girgensohn et al. |
| D647,809 S | 11/2011 | Driver |
| D656,157 S | 3/2012 | Khan et al. |
| D658,674 S | 5/2012 | Shallcross et al. |
| D661,701 S | 6/2012 | Brown et al. |
| D662,508 S | 6/2012 | Kim |
| D664,966 S | 8/2012 | Shallcross et al. |
| D664,978 S | 8/2012 | Tanghe et al. |
| D672,364 S | 12/2012 | Reyna et al. |
| 8,340,654 B2 | 12/2012 | Bratton et al. |
| D677,269 S | 3/2013 | Scott et al. |
| D678,898 S | 3/2013 | Walsh et al. |
| 8,390,684 B2 | 3/2013 | Piran et al. |
| D681,653 S | 5/2013 | Bitran et al. |
| D681,660 S | 5/2013 | Matas |
| D684,164 S | 6/2013 | Friedlander et al. |
| D686,221 S | 7/2013 | Brinda et al. |
| D689,892 S | 9/2013 | Perry et al. |
| D689,895 S | 9/2013 | DeLuca |
| D692,450 S | 10/2013 | Convay et al. |
| D694,255 S | 11/2013 | Jones, Jr. |
| 8,589,374 B2 | 11/2013 | Chaudhri |
| 8,615,511 B2 | 12/2013 | Jones |
| D697,940 S | 1/2014 | Bitran et al. |
| 8,665,375 B2 | 3/2014 | Moore et al. |
| D702,704 S | 4/2014 | Santos et al. |
| D708,197 S | 7/2014 | Pasceri et al. |
| D708,204 S | 7/2014 | Pasceri et al. |
| D712,928 S | 9/2014 | Brener et al. |
| D714,334 S | 9/2014 | Cojuangco et al. |
| 8,830,193 B2 | 9/2014 | Shah |
| 8,843,239 B2 | 9/2014 | Mighdoll et al. |
| D716,334 S | 10/2014 | Lee et al. |
| D717,809 S | 11/2014 | Tsuru et al. |
| D717,823 S | 11/2014 | Brotman et al. |
| 8,917,274 B2 | 12/2014 | Ma et al. |
| D720,765 S | 1/2015 | Xie et al. |
| D720,766 S | 1/2015 | Mandal et al. |
| D721,382 S | 1/2015 | Brinda et al. |
| D723,576 S | 3/2015 | Jones |
| D724,603 S | 3/2015 | Williams et al. |
| D725,666 S | 3/2015 | Tseng et al. |
| 8,984,436 B1 | 3/2015 | Tseng et al. |
| 8,988,232 B1 | 3/2015 | Sloo et al. |
| D726,735 S | 4/2015 | Asai |
| D727,336 S | 4/2015 | Allison et al. |
| D727,928 S | 4/2015 | Allison et al. |
| D736,223 S | 8/2015 | Park |
| D736,792 S | 8/2015 | Brinda et al. |
| D737,131 S | 8/2015 | Frandsen |
| D737,278 S | 8/2015 | Shin et al. |
| D737,283 S | 8/2015 | Scalisi |
| D739,864 S | 9/2015 | Kang |
| D740,300 S | 10/2015 | Lee et al. |
| 9,158,974 B1 | 10/2015 | Laska et al. |
| 9,170,707 B1 | 10/2015 | Laska et al. |
| D745,527 S | 12/2015 | Wang |
| D746,828 S | 1/2016 | Arai et al. |
| D746,849 S | 1/2016 | Anzures et al. |
| D747,333 S | 1/2016 | Supino et al. |
| D748,666 S | 2/2016 | Heeter et al. |
| D749,620 S | 2/2016 | Jones |
| D751,090 S | 3/2016 | Hu et al. |
| D752,061 S | 3/2016 | Ahn et al. |
| D752,072 S | 3/2016 | Song |
| D753,132 S | 4/2016 | Cuthbert et al. |
| D753,151 S | 4/2016 | Lee et al. |
| D753,703 S | 4/2016 | Villamor et al. |
| D753,708 S | 4/2016 | Yang et al. |
| D754,713 S | 4/2016 | Zhang et al. |
| D754,714 S | 4/2016 | Zhang et al. |
| D755,193 S | 5/2016 | Sun et al. |
| D756,379 S | 5/2016 | Apodaca et al. |
| D756,401 S | 5/2016 | Soldner et al. |
| D757,090 S | 5/2016 | Myung |
| D757,746 S | 5/2016 | Lee |
| D757,747 S | 5/2016 | Butcher et al. |
| D757,784 S | 5/2016 | Lee et al. |
| D758,386 S | 6/2016 | Zhang |
| D758,422 S | 6/2016 | Zhao |
| D759,688 S | 6/2016 | Wu |
| D761,277 S | 6/2016 | Harvell |
| 9,361,011 B1 | 6/2016 | Burns et al. |
| D760,769 S | 7/2016 | Ishii et al. |
| D760,792 S | 7/2016 | Liu et al. |
| 9,386,230 B1 | 7/2016 | Duran et al. |
| D762,655 S | 8/2016 | Kai |
| D763,271 S | 8/2016 | Everette et al. |
| D763,306 S | 8/2016 | Lee et al. |
| D763,308 S | 8/2016 | Wang et al. |
| D763,869 S | 8/2016 | Wang et al. |
| D763,888 S | 8/2016 | Patel |
| D763,895 S | 8/2016 | Chaudhri et al. |
| 9,417,637 B2 | 8/2016 | Matsuoka et al. |
| D765,674 S | 9/2016 | Kim |
| D765,678 S | 9/2016 | Goux |
| D766,958 S | 9/2016 | Salazar Cardozo et al. |
| 9,454,820 B1 | 9/2016 | Kirmani |
| D768,687 S | 10/2016 | Bae et al. |
| D769,897 S | 10/2016 | Li |
| D769,930 S | 10/2016 | Agrawal |
| 9,471,452 B2 | 10/2016 | McElhinney et al. |
| D770,517 S | 11/2016 | Peng et al. |
| D771,645 S | 11/2016 | Jewitt et al. |
| D772,257 S | 11/2016 | Furutani et al. |
| D772,894 S | 11/2016 | Zhao et al. |
| D773,531 S | 12/2016 | Toth et al. |
| D775,165 S | 12/2016 | Sun et al. |
| 9,513,642 B2 | 12/2016 | Rogers et al. |
| D775,658 S | 1/2017 | Luo et al. |
| D776,126 S | 1/2017 | Lai et al. |
| D776,130 S | 1/2017 | Contreras et al. |
| D776,680 S | 1/2017 | Bae et al. |
| D776,690 S | 1/2017 | Tsujimoto et al. |
| D776,702 S | 1/2017 | Huang et al. |
| D777,744 S | 1/2017 | Wang et al. |
| D779,504 S | 2/2017 | Cabrera, Jr. et al. |
| D779,533 S | 2/2017 | Liu |
| D781,299 S | 3/2017 | Yun et al. |
| D783,641 S | 4/2017 | Elston et al. |
| D783,652 S | 4/2017 | Guan et al. |
| D784,363 S | 4/2017 | Fleming et al. |
| D784,400 S | 4/2017 | Joi |
| 9,619,984 B2 | 4/2017 | Donovan et al. |
| D786,932 S | 5/2017 | Kim et al. |

(56) References Cited

U.S. PATENT DOCUMENTS

| | | |
|---|---|---|
| D795,927 S | 5/2017 | Bischoff et al. |
| D790,581 S | 6/2017 | Chaudhri et al. |
| D791,806 S | 7/2017 | Brewington et al. |
| D794,047 S | 8/2017 | Gandhi et al. |
| D795,292 S | 8/2017 | Loosli et al. |
| D795,919 S | 8/2017 | Bischoff et al. |
| D797,131 S | 9/2017 | Mizono et al. |
| D797,772 S | 9/2017 | Mizono et al. |
| D800,747 S | 10/2017 | Lee et al. |
| D800,752 S | 10/2017 | Hersh et al. |
| 9,778,830 B1 | 10/2017 | Dubin |
| D803,233 S | 11/2017 | Wilberding |
| D803,241 S | 11/2017 | Mizono et al. |
| D803,242 S | 11/2017 | Mizono et al. |
| D805,548 S | 12/2017 | King et al. |
| D806,114 S | 12/2017 | Kim et al. |
| 9,838,602 B2 | 12/2017 | Duran et al. |
| D807,376 S | 1/2018 | Mizono et al. |
| D809,522 S | 2/2018 | Mizono et al. |
| 9,898,175 B2 | 2/2018 | Fiedler |
| D815,144 S | 4/2018 | Feng et al. |
| D817,337 S | 5/2018 | Wei |
| D818,000 S | 5/2018 | Lee et al. |
| D819,075 S | 5/2018 | Tsuji et al. |
| 9,979,862 B1 | 5/2018 | Xiong et al. |
| D821,407 S | 6/2018 | Wilberding |
| D821,410 S | 6/2018 | Vinna et al. |
| D821,441 S | 6/2018 | Wilberding et al. |
| D821,443 S | 6/2018 | Jang et al. |
| D823,867 S | 7/2018 | Berlow |
| D823,891 S | 7/2018 | Lupei et al. |
| D824,416 S | 7/2018 | Memmelaar, Jr. et al. |
| D824,926 S | 8/2018 | De La Garza |
| 2002/0116120 A1 | 8/2002 | Ruiz et al. |
| 2004/0113770 A1 | 6/2004 | Falk et al. |
| 2004/0177149 A1 | 9/2004 | Zullo et al. |
| 2004/0260427 A1 | 12/2004 | Wimsatt |
| 2005/0046723 A1 | 3/2005 | Bean et al. |
| 2005/0104958 A1 | 5/2005 | Egnal et al. |
| 2005/0289615 A1 | 12/2005 | Nishitani |
| 2006/0288392 A1 | 12/2006 | Fleming |
| 2007/0024706 A1 | 2/2007 | Brannon |
| 2007/0025688 A1 | 2/2007 | Pejhan |
| 2007/0033632 A1 | 2/2007 | Baynger et al. |
| 2008/0174570 A1 | 7/2008 | Jobs et al. |
| 2008/0181498 A1 | 7/2008 | Swenson et al. |
| 2008/0263468 A1 | 10/2008 | Cappione et al. |
| 2009/0002157 A1 | 1/2009 | Donovan et al. |
| 2009/0002492 A1 | 1/2009 | Velipasalar et al. |
| 2009/0021583 A1 | 1/2009 | Salgar et al. |
| 2009/0075694 A1 | 3/2009 | Kim et al. |
| 2009/0164439 A1 | 6/2009 | Nevins |
| 2009/0178007 A1 | 7/2009 | Matas et al. |
| 2009/0220206 A1 | 9/2009 | Kisliakov |
| 2009/0284601 A1 | 11/2009 | Eledath |
| 2009/0288011 A1 | 11/2009 | Piran et al. |
| 2010/0061446 A1 | 3/2010 | Hands et al. |
| 2010/0131457 A1 | 5/2010 | Heimendinger |
| 2010/0321183 A1 | 12/2010 | Donovan et al. |
| 2011/0040760 A1 | 2/2011 | Fleishman et al. |
| 2011/0185269 A1 | 7/2011 | Finkelstein et al. |
| 2011/0316697 A1 | 12/2011 | Krahnstoever et al. |
| 2012/0066608 A1 | 3/2012 | Sundermeyer et al. |
| 2012/0130513 A1 | 5/2012 | Hao et al. |
| 2012/0317299 A1 | 12/2012 | Sathianathan et al. |
| 2012/0323930 A1 | 12/2012 | Kennberg et al. |
| 2013/0016122 A1 | 1/2013 | Bhatt et al. |
| 2013/0067365 A1 | 3/2013 | Shrufi et al. |
| 2013/0072308 A1 | 3/2013 | Peck et al. |
| 2013/0090767 A1 | 4/2013 | Bruck et al. |
| 2013/0091432 A1 | 4/2013 | Shet et al. |
| 2013/0129307 A1 | 5/2013 | Choe et al. |
| 2013/0132908 A1 | 5/2013 | Lee et al. |
| 2013/0145270 A1 | 6/2013 | Piran et al. |
| 2013/0173064 A1 | 7/2013 | Fadell et al. |
| 2013/0179836 A1 | 7/2013 | Han et al. |
| 2013/0185150 A1 | 7/2013 | Crum |
| 2013/0211783 A1 | 8/2013 | Fisher et al. |
| 2013/0251150 A1 | 9/2013 | Chassagne |
| 2013/0263034 A1 | 10/2013 | Bruck et al. |
| 2013/0268129 A1 | 10/2013 | Fadell et al. |
| 2013/0282421 A1 | 10/2013 | Graff et al. |
| 2013/0311909 A1 | 11/2013 | Howard et al. |
| 2013/0325332 A1 | 12/2013 | Rhee et al. |
| 2013/0328997 A1 | 12/2013 | Desai |
| 2013/0332886 A1 | 12/2013 | Cranfill et al. |
| 2014/0012574 A1 | 1/2014 | Pasupalak et al. |
| 2014/0013243 A1 | 1/2014 | Flynn, III et al. |
| 2014/0026061 A1 | 1/2014 | Kim et al. |
| 2014/0033071 A1 | 1/2014 | Gruber et al. |
| 2014/0043485 A1 | 2/2014 | Bateman et al. |
| 2014/0050455 A1 | 2/2014 | Ni et al. |
| 2014/0064738 A1 | 3/2014 | Chen et al. |
| 2014/0098247 A1* | 4/2014 | Rao .............. H04W 4/20 348/207.1 |
| 2014/0189518 A1 | 7/2014 | Kim et al. |
| 2014/0189586 A1 | 7/2014 | Waldman et al. |
| 2014/0218517 A1* | 8/2014 | Kim ............... H04L 12/2818 348/143 |
| 2014/0222424 A1 | 8/2014 | Hartford et al. |
| 2014/0232873 A1 | 8/2014 | Meganathan |
| 2014/0277795 A1* | 9/2014 | Matsuoka ........ G06Q 30/0202 700/291 |
| 2014/0313377 A1 | 10/2014 | Hampton |
| 2014/0365019 A1 | 12/2014 | Gourlay et al. |
| 2014/0375819 A1 | 12/2014 | Larsen et al. |
| 2015/0023650 A1 | 1/2015 | Austin et al. |
| 2015/0058709 A1 | 2/2015 | Zaletel |
| 2015/0058730 A1 | 2/2015 | Dubin et al. |
| 2015/0097689 A1 | 4/2015 | Logue et al. |
| 2015/0113432 A1 | 4/2015 | Jung et al. |
| 2015/0113461 A1 | 4/2015 | Kasten et al. |
| 2015/0117513 A1 | 4/2015 | Sarafa et al. |
| 2015/0143239 A1 | 5/2015 | Birkbeck et al. |
| 2015/0173846 A1 | 6/2015 | Schneider et al. |
| 2015/0193127 A1 | 7/2015 | Chai et al. |
| 2015/0208205 A1 | 7/2015 | Chan et al. |
| 2015/0227196 A1 | 8/2015 | Fuji et al. |
| 2015/0242404 A1 | 8/2015 | Underwood, IV et al. |
| 2015/0248270 A1 | 9/2015 | Lang |
| 2015/0248275 A1 | 9/2015 | Gallo et al. |
| 2015/0269643 A1 | 9/2015 | Riley et al. |
| 2015/0287310 A1 | 10/2015 | Deliuliis et al. |
| 2015/0310280 A1 | 10/2015 | Bentley et al. |
| 2015/0350265 A1 | 12/2015 | O'Brien |
| 2016/0004390 A1 | 1/2016 | Laska et al. |
| 2016/0026329 A1 | 1/2016 | Fadell et al. |
| 2016/0034574 A1 | 2/2016 | Kang |
| 2016/0041724 A1 | 2/2016 | Kirkby et al. |
| 2016/0043905 A1 | 2/2016 | Fiedler |
| 2016/0086038 A1 | 3/2016 | Scanlon et al. |
| 2016/0088326 A1 | 3/2016 | Solomon et al. |
| 2016/0105847 A1 | 4/2016 | Smith et al. |
| 2016/0110064 A1 | 4/2016 | Shapira |
| 2016/0139671 A1 | 5/2016 | Jun et al. |
| 2016/0139747 A1 | 5/2016 | Kocienda et al. |
| 2016/0147406 A1 | 5/2016 | Yi |
| 2016/0155315 A1 | 6/2016 | McElhinney et al. |
| 2016/0220743 A1 | 8/2016 | Guthrie et al. |
| 2016/0260414 A1 | 9/2016 | Yang |
| 2016/0335139 A1 | 11/2016 | Hurley et al. |
| 2016/0358436 A1 | 12/2016 | Wautier et al. |
| 2016/0364114 A1* | 12/2016 | Von Dehsen ....... H04L 12/2807 715/835 |
| 2017/0003720 A1 | 1/2017 | Robinson et al. |
| 2017/0010790 A1 | 1/2017 | Glover et al. |
| 2017/0017376 A1 | 1/2017 | Han et al. |
| 2017/0017384 A1 | 1/2017 | Lee |
| 2017/0017392 A1 | 1/2017 | Castaneda et al. |
| 2017/0034430 A1 | 2/2017 | Fu et al. |
| 2017/0060399 A1 | 3/2017 | Hough et al. |
| 2017/0089739 A1 | 3/2017 | Gallo et al. |
| 2017/0126975 A1 | 5/2017 | Duran et al. |
| 2017/0186079 A1 | 6/2017 | Kim et al. |

(56) References Cited

U.S. PATENT DOCUMENTS

| | | | |
|---|---|---|---|
| 2017/0201850 A1 | 7/2017 | Raleigh et al. | |
| 2017/0207949 A1 | 7/2017 | Donovan et al. | |
| 2017/0286913 A1 | 10/2017 | Liu et al. | |
| 2017/0308390 A1 | 10/2017 | Venis et al. | |
| 2017/0329511 A1 | 11/2017 | Ueno et al. | |
| 2017/0336920 A1 | 11/2017 | Chan et al. | |
| 2017/0357439 A1 | 12/2017 | Lemay et al. | |
| 2018/0018081 A1 | 1/2018 | Dattilo-Green et al. | |
| 2018/0019889 A1 | 1/2018 | Burns et al. | |
| 2018/0048819 A1 | 2/2018 | Duran et al. | |
| 2018/0101297 A1 | 4/2018 | Yang et al. | |
| 2018/0129380 A1 | 5/2018 | Suh et al. | |
| 2018/0136819 A1 | 5/2018 | Lee | |
| 2018/0144615 A1* | 5/2018 | Kinney | G06K 9/00362 |
| 2018/0187954 A1 | 7/2018 | Yang et al. | |

OTHER PUBLICATIONS

"Foto de archivo", posted at es.123rf.com, Apr. 23, 2015, [site visited Jan. 17, 2017]. Available from Internet: <http://es.123rf.com/photo_37507296_diseno-transparente-plantilla-de-interfaz-de-usuario-movil-disposicion-para-el-movil-o-pagina-web-il.html>.

Hoang, Le, "YouTube: How to Find Previously Watched Videos", posted at tech-recipes.com, Feb. 15, 2011, [site visited Jan. 17, 2017]. Available from Internet: <http://www.tech-recipes.com/rx/11104/youtube-how-to-find-all-the-previously-watched-videos>.

"Wireframe toolkit for Keynote and Powerpoint", posted at raizlabs.com, Jun. 29, 2011, [site visited Jan. 17, 2017]. Available from Internet: <https://www.raizlabs.com/blog/2011/06/wireframe-toolkit-for-keynote-and-powerpoint>.

Vector Video Player, posted at shutterstock.com, Aug. 21, 2014, [site visited Mar. 17, 2017]. Available from Internet: <https://www.shutterstock.com/fr/image-vector/vector-audio-video-player-web-101573365>.

"Mini UI toolkit PSD Download", posted at freepsds123.com, Jun. 21, 2014, [site visited Mar. 17, 2017]. Available from Internet: <http://www.freepsds123.com/2014/06/21/mini-u i-toolkit-psd-down load>.

"Octopussy (1983)—Cancelled" posted at mi6-hq.com, Oct. 2, 2014, [site visited Mar. 17, 2017]. Available from Internet: <https://www.mi6-hq.com/sections/games/octopussy_1 983>.

Features > Button Bars, posted at webbookbinder.com, May 8, 2011, [site visited Sep. 13, 2016]. Available from Internet: <http://www.webbookbinder.com/Website/020New/buttonbars.asp>.

Stock Vector—Web Site Interface Icons // Button Bar Series, posted at alamy.com, Aug. 2, 2010, [site visited Sep. 13, 2016]. Available from Internet: <http://www.alamy.com/stock-photo-web-site-interface-icons-button-bar-series-64003090.html>.

Visavadia, Jay, "i0S7 Wireframe", posted at dribbble.com, Dec. 19, 2013, [site visited Sep. 14, 2016]. Available from Internet: <https://dribbble.com/shots/1352315-i057-Wireframe>.

Holly, Russell, "Nest Aware, and why the Nest Cam subscription makes sense", posted at androidcentral.com, Jul. 3, 2015, [site visited Sep. 30, 2016]. Available from Internet: <http://www.androidcentral.com/nest-aware-and-why-nest-cam-subscription-makes-sense>.

Ahmed, Nafees, "5 Best Video Editing Apps for Android Devices", posted at techbuzzes.com, Mar. 23, 2013, (site visited Jun. 3, 2016), Available from Internet: http://techbuzzes.com/2013/03/best-video-editing-apps-for-android.

Blatner, WiCam: Wireless iPhone Camera, Rochester Institute of Technology, Spring 2010, 1 pg, www.ce/rit/edu/research/projects/2010_spring/WICam/index.html.

TechBitar, Bluetooth-conrolled Pan/Tilt Servo Platform Using Android as Remote, downloaded Jul. 15, 2015, 9 pgs, www.techbitar.com/bluetooth-controlled-pan-tilt-servo.html.

EyeSpyFX, Viewer For D-Link Cams, IOS Version 3.1.2, 2013, 19 pgs, www.eyespyfx.com/dlink.php.

Netgear, Home Security Systems / Security Cameras / Arlo, downloaded Jul. 15, 2015, 6 pgs, arlo.com/en-us.

CNET, Netgear Arlo Smart Home Security review, downloaded Jul. 15, 2015, 5 pgs, www.cnet.com/products/netgear-arlo-smart-home-security-kit.

Arlo on the App Store on iTunes, downloaded Jul. 15, 2015, 2 pgs, itunes.apple.com/us/app/arlo/id925911312?mt=8.

AppCrawlr, ipCam FC—IP camera surveillance (ios), downloaded Jul. 15, 2015, 2 pgs, appcrawlr.com/ios/ipcam-fc-ip-camera-surveillance.

Siml, ipCamFC—IP camera surveillance, downloaded Jul. 15, 2015, 2 pgs, itunes.apple.com/us/app/ipcam-fc-ip-camera-surveillance/id548480721?mt=8.

D-Link Corporation, mydlink Lite, downloaded Jul. 15, 2015, 2 pgs, itunes.apple.com/us/app/mydlink-lite/id372571229?mt=8.

D-Link Corporation, mydlink+, downloaded Jul. 15, 2015, 2 pgs, itunes.apple.com/us/app/mydlink/id479832296?mt=8.

D-Link Corporation, mydlink App, downloaded Jul. 15, 2015, 4 pgs, www.mydlink.com/apps.

Wollerton, Turn your old iPod into a security camera for free, CNET, Dec. 17, 2014, 5 pgs, www.cnet.com/how-to/turn-your-old-ipod-into-a-security-camera-for-free.

Nunal, Paul, "Best Android apps for videographers and video editors", posted at androidauthority.com, May 3, 2012, (site visited Jun. 3, 2016), Available from Internet: http://www.androidauthority.com/best-android-apps-videograhers-video-videography-80338.

Fitzer, Michael, "Editing Effects Software to Make Your Video Sing", posted at videomaker.com, May 3, 2012, (site visited Jun. 3, 2016) Available from Internet: https://www.videomaker.com/article/c3/15366-editing-effects-software-to-make-your-video-sing).

U. A. Lipton, H. Fujiyoshi, and R. S. Patil, "Moving Target Classification and Tracking from Real-Time Video," Proc. IEEE WACV '98, Princeton, N.J., 1998, pp. 8-14 (Year: 1998).

Google, LLC, ISR/WO, PCT/US2018/020919, dated Jun. 11, 2018, 26 pgs.

Tenon, Biff. "Abstract background with animation . . ." shutterstock.conn. Date not available, Accessed Sep. 1, 2018. Available online at URL: <https://www.shutterstock.conn/video/clip-24321839-stock-footage-abstract-background-with-aninnation-of-flicker-and-nnoving-patterns-fronn-clear-colorful-circles.htnnl>.

Metal fence on a dark background, [online], uploaded on Feb. 28, 2013, retrieved on Aug. 8, 2018. Retrieved from, <URL: https://stockfresh.conn/innage/2626471/nnetal-fence-on-a-dark-background>, 1 page.

Google image search of Nest Icon, [online], images uploaded before Jul. 12, 2016, retrieved on Aug. 8, 2018. Retrieved from, <URL: https://www.google.conn/search?q=nest+icon&rlz=1C1GCEB en US799US799&biw=1920&bih=1109&source=Int&tbs=cdr%3A1% 2Ccd nnin%3A%2Ccd nnax%3A7%2>, 2 pages.

* cited by examiner

METHODS AND DEVICES FOR ESTABLISHING CONNECTIONS WITH REMOTE CAMERAS

RELATED APPLICATIONS

This application is related to U.S. patent application Ser. No. 15/208,578, filed Jul. 12, 2016, entitled "Methods and Systems for Presenting Smart Home Information in a User Interface," U.S. Design patent application No. 29/570,874, filed Jul. 12, 2016, entitled "User Interface For Monitoring and Controlling Devices," U.S. Design patent application No. 29/570,872, filed Jul. 12, 2016, entitled "User Interface For Monitoring and Controlling Devices," and U.S. patent application Ser. No. 14/738,930, filed Jun. 14, 2015, entitled "Methods and Systems for Presenting Multiple Live Video Feeds in a User Interface," now U.S. Pat. No. 9,361,011, each of which is hereby incorporated by reference in its entirety.

TECHNICAL FIELD

The disclosed implementations relate generally to user interfaces, including, but not limited, to presenting smart home information in a user interface.

BACKGROUND

The advancement of internet and mobile technologies has enabled the adoption of smart home environments by users. Users can now monitor a smart home area using a website or a mobile application. Such websites or mobile apps typically allow a user to view live video and/or saved video recordings, but otherwise provide little or no additional information regarding the videos. Furthermore, the user interfaces for viewing smart home information, including live videos or saved video recordings, have a user control flow that is poor at maintaining context for the user. Thus, more efficient, informative, and user-friendly presentations of smart home information are needed.

SUMMARY

Accordingly, there is a need for presentations of smart home information, such as live and/or saved video, with a more efficient user control flow and more useful information. Such methods optionally complement or replace conventional methods for presenting smart home information.

In one aspect, some implementations include a method performed in an application executing at a client device having a display, one or more processors, and memory storing one or more programs for execution by the one or more processors. The method includes: (1) determining that a first set of smart devices of the plurality of smart devices correspond to a first space of a plurality of spaces of a dwelling; (2) displaying a first user interface including: (a) displaying a first interface section corresponding to the first space; and (b) displaying, within the first interface section, a plurality of user interface objects corresponding to the first set of smart devices, where each user interface object of the plurality of user interface objects corresponds to a respective smart device of the first set of smart devices; (3) detecting a user selection of a particular user interface object of the plurality of user interface objects; and (4) in response to detecting the user selection of the particular user interface object, displaying a second user interface that includes additional information regarding the respective smart device for the particular user interface object.

In another aspect, some implementations include a method performed at a client device having a display, one or more processors, and memory storing one or more programs for execution by the one or more processors. The method includes: (1) receiving a request to execute an application for communicating with a plurality of smart devices, the plurality of smart devices including a plurality of cameras; (2) in response to receiving the request to execute the application, establishing a preliminary connection for each of at least a subset of the plurality of cameras; (3) identifying a user interface for display to a user via the display, the user interface including a video feed from a particular camera of the plurality of cameras; (4) after identifying the user interface for display, determining whether a preliminary connection has been established for the particular camera; (5) in accordance with a determination that the preliminary connection has been established for the particular camera, requesting, via the preliminary connection, the video feed for the particular camera; and (6) displaying the user interface with the video feed for the particular camera.

In yet another aspect, some implementations include a client device including one or more processors and memory coupled to the one or more processors, the memory storing one or more programs configured to be executed by the one or more processors, the one or more programs including instructions for performing any of the methods described herein.

In yet another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a storage device, the one or more programs including instructions for performing any of the methods described herein.

In accordance with some implementations, a system includes a plurality of electronic devices, where at least one device of the plurality of electronic devices has one or more processors and memory storing one or more programs for execution by the processor, the one or more programs including instructions for performing the operations of the methods described above.

Thus, computing systems and devices are provided with more efficient methods for presenting smart home information, thereby increasing the effectiveness, efficiency, and user satisfaction with such systems and devices. Such methods may complement or replace conventional methods for presenting smart home information.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
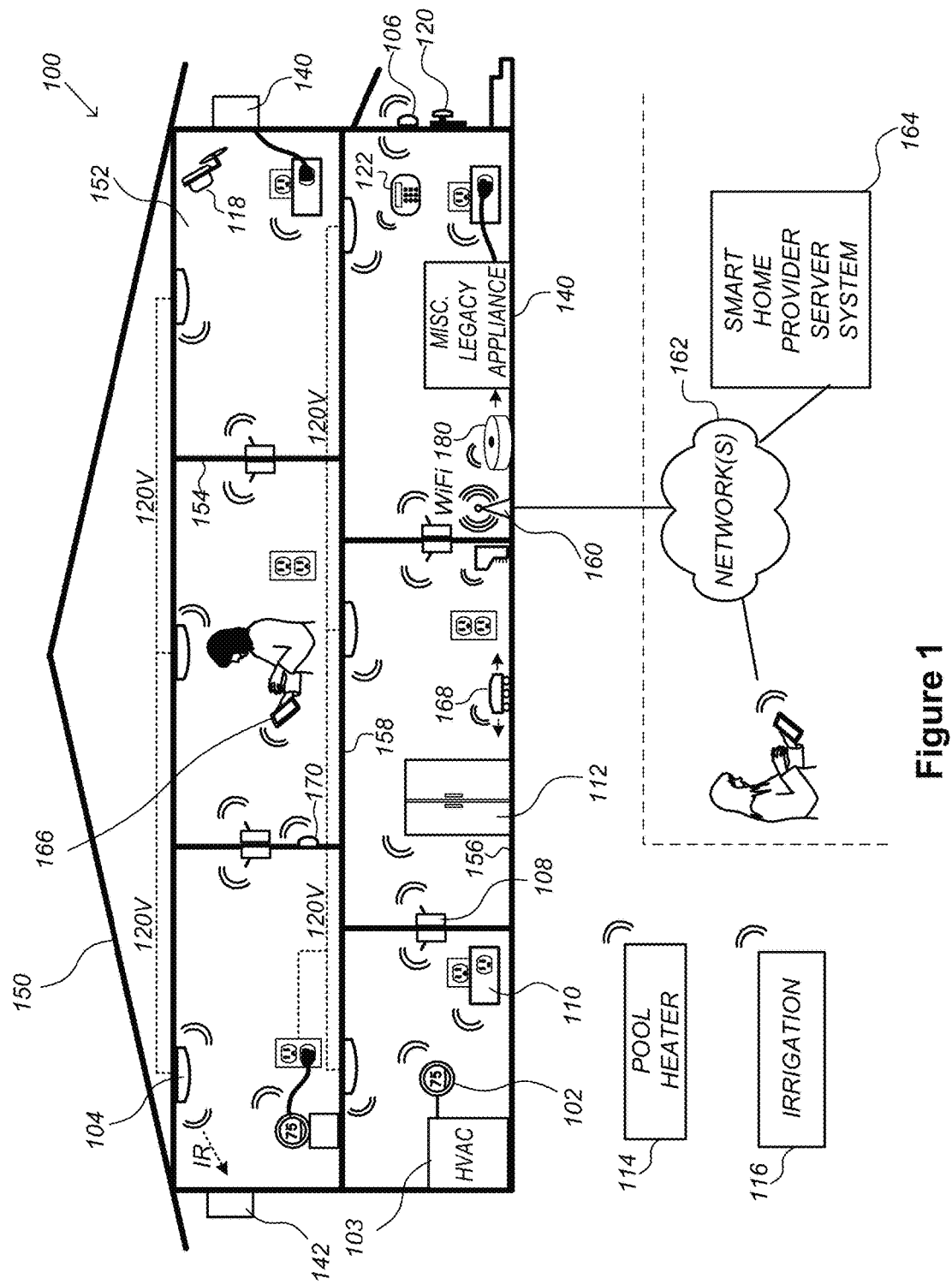
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that a "space" in a smart home environment, or a dwelling, may refer to a room, area, yard, floor, or other section. In some implementations, a space is bounded by physical objects, such as walls. In some implementations, a space comprises a particular subsection of a physically bounded area, such as half (e.g., the left half) of a yard or room. In some implementations, a space encompasses more than one bounded area. For example, a space denoted as "Front Door" may include two cameras directed at the front door, a first camera located inside the front door and a second camera located outside the front door. In some implementations, the spaces in a smart home environment are user-defined. In some implementations, a user assigns a space to a smart device (e.g., during installation). In some implementations, a smart device assigns itself to a particular space. For example, determines an appropriate space based on the smart device's relative or absolute location within the smart home environment. In some implementations, another smart device, server, or network device assigns a particular space to the smart device. For example, hub device 180 (FIG. 2) determines an appropriate space for the smart device based on its location and assigns the appropriate space to the smart device. In some implementations, assigning a space to a device comprises updating metadata for the device. For example metadata stored at the device, metadata stored at another device (e.g., a hub device), and/or metadata stored a server system, such as hub device server system 508. In some implementations, assigning a space to a device comprises updating a device location table, such as Table 1 below. In some implementations, a device is assigned to multiple spaces. For example, a camera in a living room with a field of view encompassing a front door is optionally included in a first space denoted as "Living Room" and a second space denoted as "Front Door."

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, one or more devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. In some implementations, cameras 118 also capture video when other conditions or hazards are detected, in order to provide visual monitoring of the smart home environment 100 when those conditions or hazards occur. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). For example, cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may include one or more sound and/or vibration sensors for detecting abnormal sounds and/or vibrations. These sensors may be integrated with any of the devices described above. The sound sensors detect sound above a decibel threshold. The vibration sensors detect vibration above a threshold directed at a particular area (e.g., vibration on a particular window when a force is applied to break the window).

Conditions detected by the devices described above (e.g., motion, sound, vibrations, hazards) may be referred to collectively as alert events.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, the local storage device is communicatively coupled to one or more smart devices via a smart home network (e.g., smart home network 202, FIG. 2). In some implementations, the local storage device is selectively coupled to one or more smart devices via a wired and/or wireless communication network. In some implementations, the local storage device is used to store video data when external network conditions are poor. For example, the local storage device is used when an encoding bitrate of camera 118 exceeds the available bandwidth of the external network (e.g., network(s) 162). In some implementations, the local storage device temporarily stores video data from one or more cameras (e.g., camera 118) prior to transferring the video data to a server system (e.g., server system 508, FIG. 5). In some implementations, the local storage device is a component of a camera device. In some implementations, each camera device includes a local storage.

Figure 2:
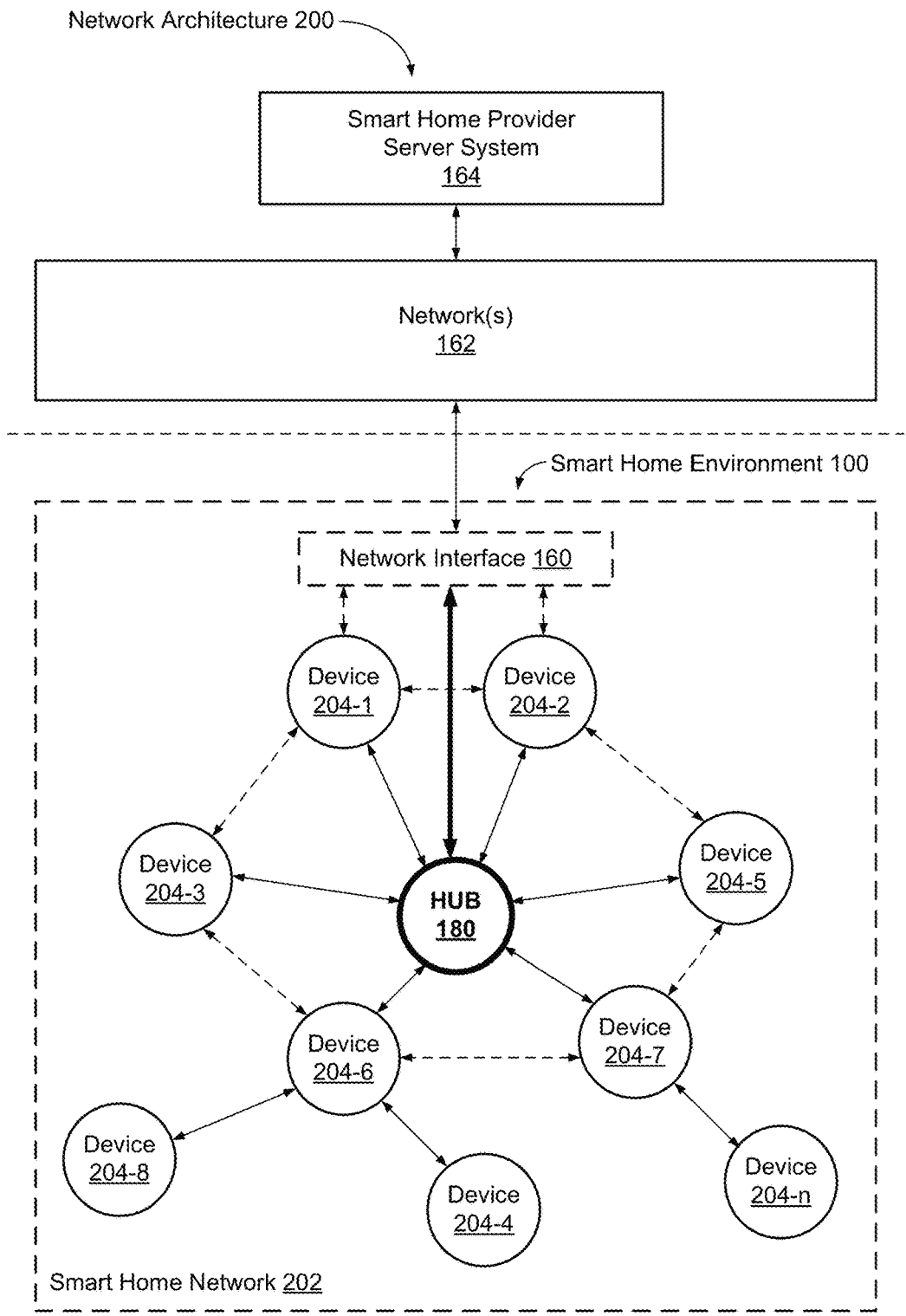
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
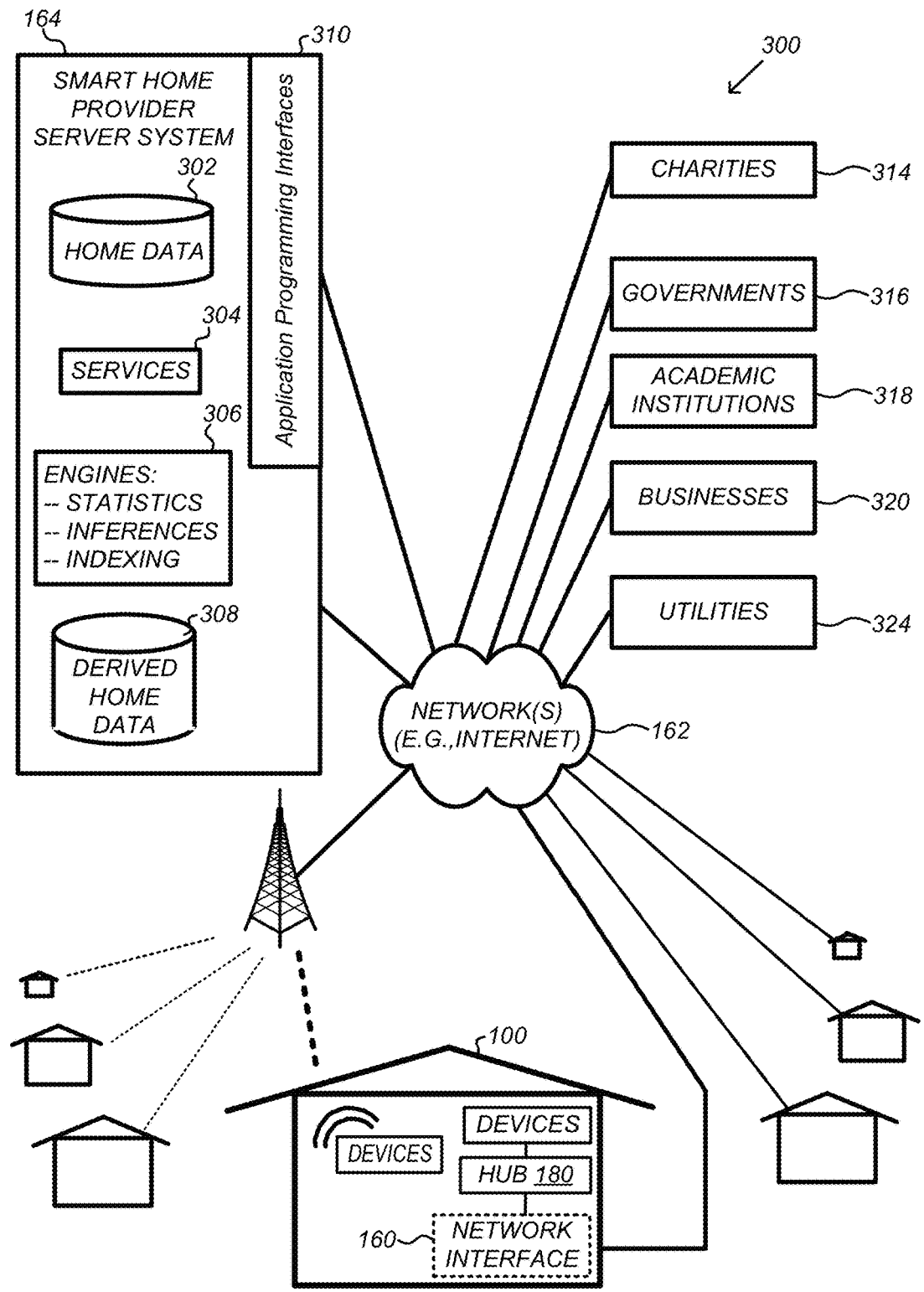
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
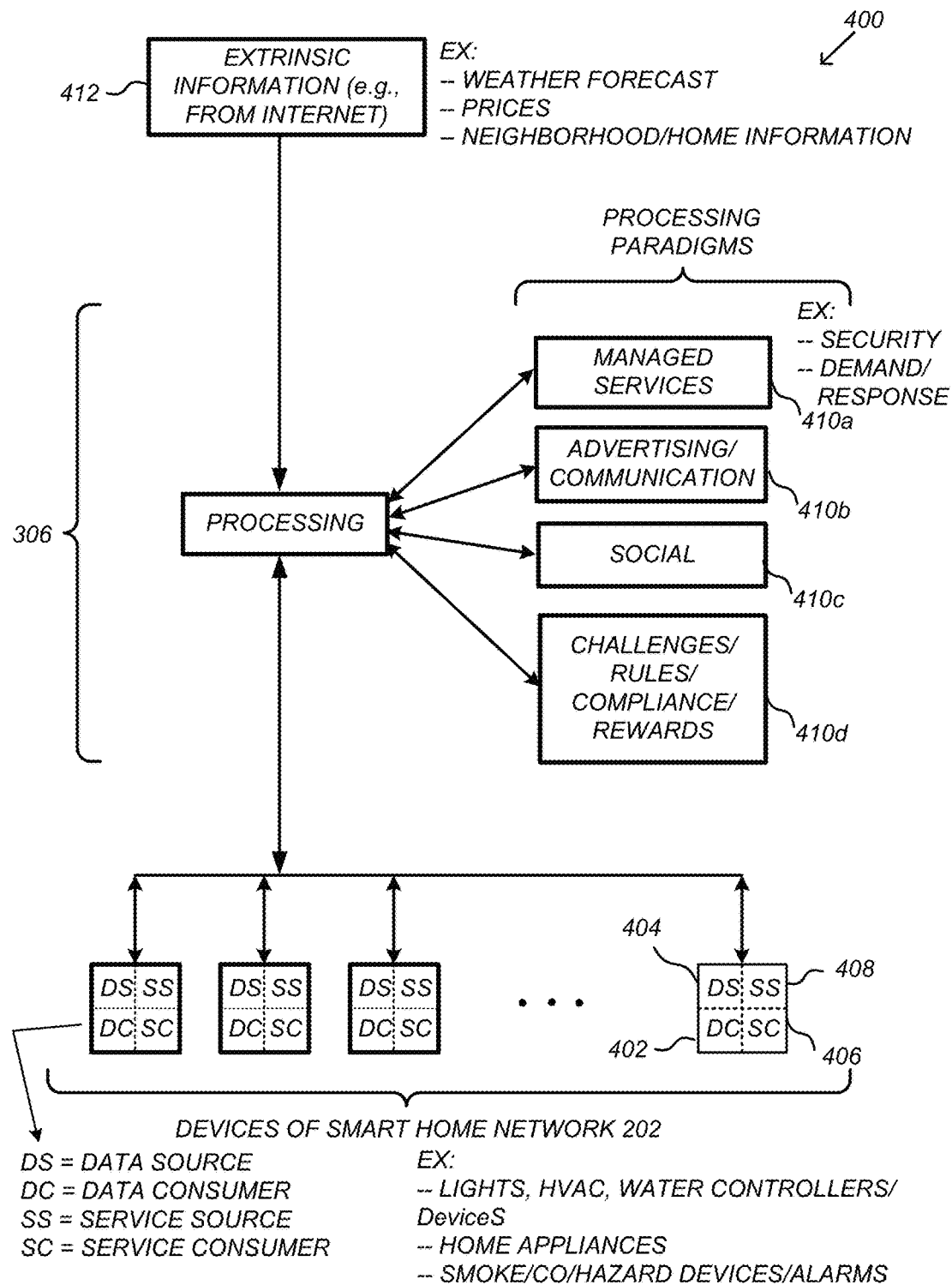
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5A:
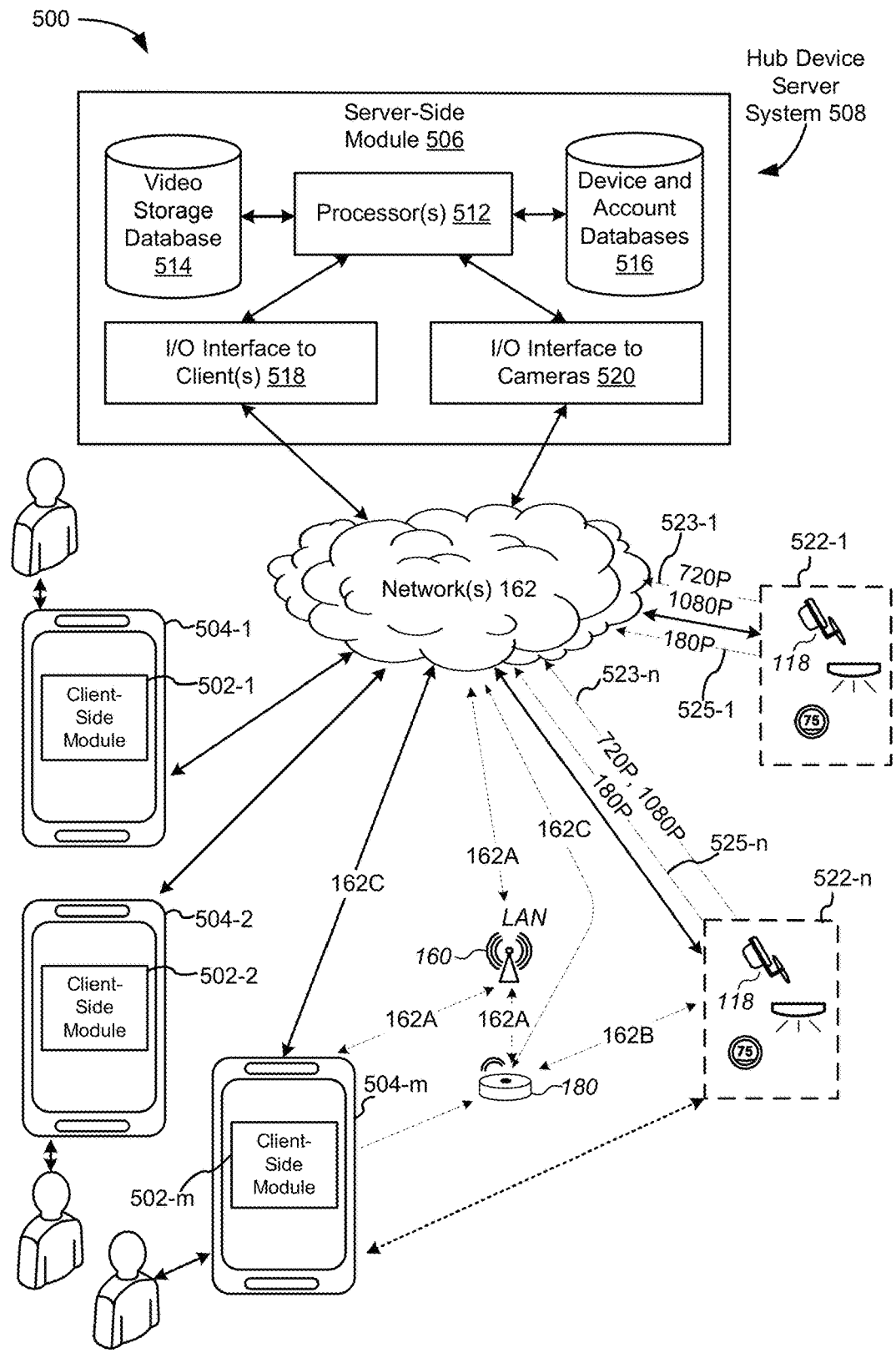
FIG. 5A is a representative operating environment in which a hub device server system interacts with client devices and hub devices communicatively coupled to local smart devices, in accordance with some implementations.

FIG. 5A illustrates a representative operating environment 500 in which a hub device server system 508 provides data processing for monitoring and facilitating review of alert events (e.g., motion events) in video streams captured by video cameras 118. As shown in FIG. 5A, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the hub device server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub device server system 508; the hub device server system 508 is a part or component of the smart home provider server system 164. In some implementations, the hub device server system 508 is a dedicated video processing server that provides video processing services to video sources and client devices 504 independent of other services provided by the hub device server system 508. An example of a video processing server is described below with reference to FIG. 5B.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

In some implementations, a camera 118 of a video source 522 captures video at a first resolution (e.g., 720P and/or 1080P) and/or a first frame rate (24 frames per second), and sends the captured video to the hub device server system 508 at both the first resolution (e.g., the original capture resolution(s), the high-quality resolution(s) such as 1080P and/or 720P) and the first frame rate, and at a second, different resolution (e.g., 180P) and/or a second frame rate (e.g., 5 frames per second or 10 frames per second). For example, the camera 118 captures a video 523-1 at 720P and/or 1080P resolution (the camera 118 may capture a video at 1080P and create a downscaled 720P version, or capture at both 720P and 1080P). The video source 522 creates a second (or third), rescaled (and optionally at a different frame rate than the version 523-1) version 525-1 of the captured video at 180P resolution, and transmits both the original captured version 523-1 (i.e., 1080P and/or 720P) and the rescaled version 525-1 (i.e., the 180P version) to the hub device server system 508 for storage. In some implementations, the rescaled version has a lower resolution, and optionally a lower frame rate, than the original captured video. The hub device server system 508 transmits the original captured version or the rescaled version to a client 504, depending on the context. For example, the hub device server system 508 transmits the rescaled version when transmitting multiple videos to the same client device 504 for concurrent monitoring by the user, and transmits the original captured version in other contexts. In some implementations, the hub device server system 508 downscales the original captured version to a lower resolution, and transmits the downscaled version.

In some other implementations, a camera 118 of a video source 522 captures video at a first resolution (e.g., 720P and/or 1080P) and/or a first frame rate, and sends the captured video to the hub device server system 508 at the first resolution (e.g., the original capture resolution(s); the high-quality resolution(s) such as 1080P and/or 720P) and first frame rate for storage. When the hub device server system 508 transmits the video to a client device, the hub device server system 508 may downscale the video to a second, lower resolution (e.g., 180P) and/or second, lower frame rate for the transmission, depending on the context. For example, the hub device server system 508 transmits the downscaled version when transmitting multiple videos to the same client device 504 for concurrent monitoring by the user, and transmits the original captured version in other contexts.

As shown in FIG. 5A, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. In some implementations, the I/O interface to clients 518 or a transcoding proxy computer (not shown) rescales (e.g., downscales) and/or changes the frame rate of video for transmission to a client 504. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

In some implementations, the server-side module 506 receives information regarding alert events detected by other smart devices 204 (e.g., hazards, sound, vibration, motion). In accordance with the alert event information, the server-side module 506 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers.

In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 5A includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 with no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

In some implementations, the hub device 180 is omitted, and the functionality of the hub device 180 is performed by the hub device server system 508, video server system 552, or smart home provider server system 164.

Figure 5B:
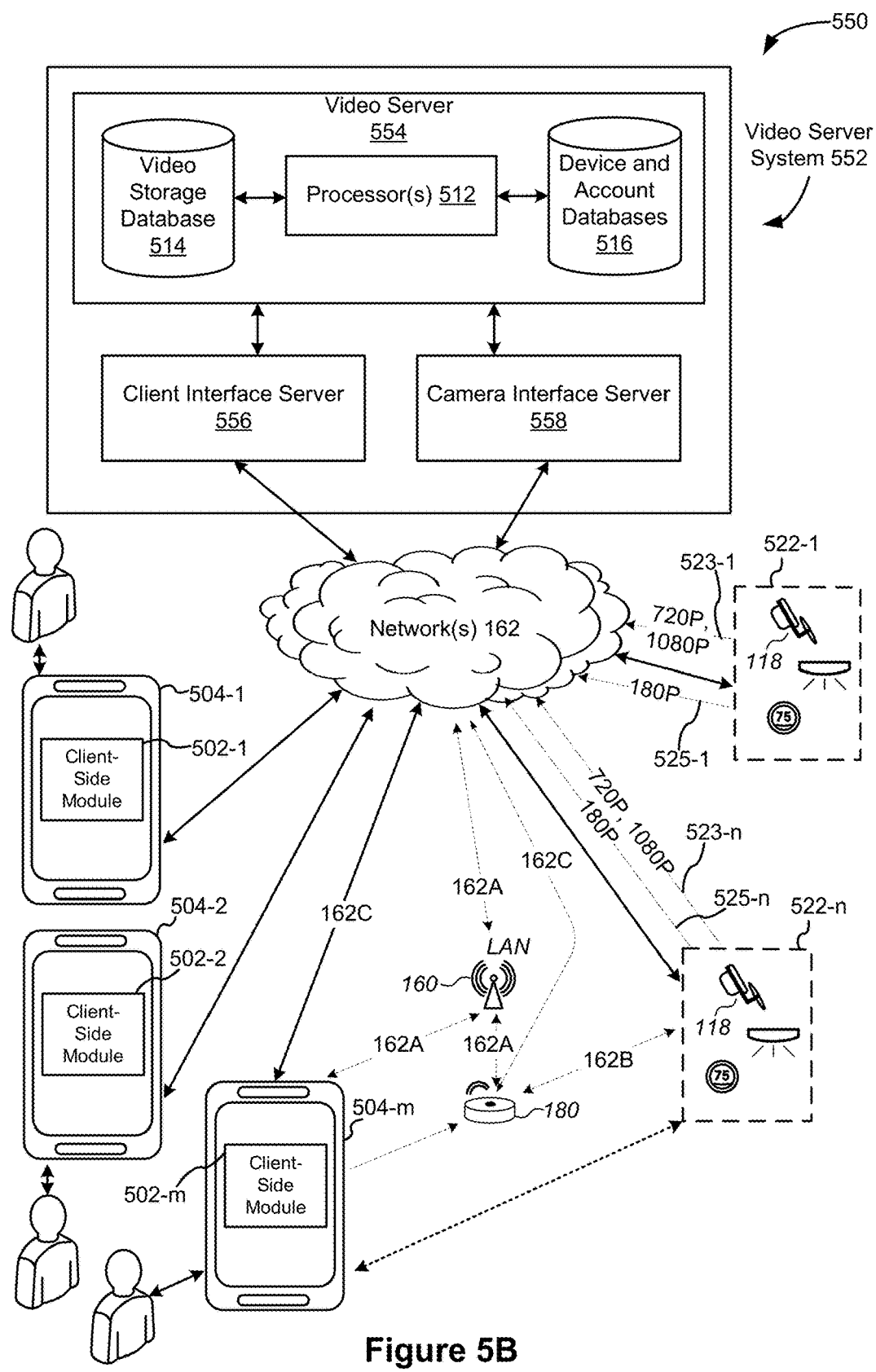
FIG. 5B is a representative operating environment in which a video server system interacts with client devices and hub devices communicatively coupled to local smart devices, in accordance with some implementations.

In some implementations, the hub device server system 508 is, or includes, a dedicated video processing server. FIG. 5B illustrates a representative operating environment 550 in which a video server system 552 serves as a dedicated video processing server and provides data processing for monitoring and facilitating review of alert events (e.g., motion events) in video streams captured by video cameras 118. As shown in FIG. 5B, the video server system 552 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the video server system 552 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 552; the video server system 552 is a part or component of the smart home provider server system 164. In some implementations, the video server system 552 is separate from the smart home provider server system 164, and provides video processing services to video sources 522 and client devices 504 independent of other services provided by the smart home provider server system 164. In some implementations, the smart home provider server system 164 and the video server system 552 are separate but communicate information with each other to provide functionality to users. For example, a detection of a hazard may be communicated by the smart home provider server system 164 to the video server system 552, and the video server system 552, in accordance with the communication regarding the detection of the hazard, records, processes, and/or provides video associated with the detected hazard.

In some implementations, each of the video sources 522 includes one or more video cameras 118 that capture video and send the captured video to the video server system 552 substantially in real-time. In some implementations, each of the video sources 522 optionally includes a controller device (not shown) that serves as an intermediary between the one or more cameras 118 and the video server system 552. The controller device receives the video data from the one or more cameras 118, optionally, performs some preliminary processing on the video data, and sends the video data to the video server system 552 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 552.

In some implementations, a camera 118 of a video source 522 captures video at a first resolution (e.g., 720P and/or 1080P) and/or a first frame rate (24 frames per second), and sends the captured video to the video server system 552 at both the first resolution (e.g., the original capture resolution(s), the high-quality resolution(s)) and the first frame rate, and a second, different resolution (e.g., 180P) and/or a second frame rate (e.g., 5 frames per second or 10 frames per second). For example, the camera 118 captures a video 523-1 at 720P and/or 1080P resolution (the camera 118 may capture a video at 1080P and create a downscaled 720P version, or capture at both 720P and 1080P). The video source 522 creates a second (or third), rescaled (and optionally at a different frame rate than the version 523-1) version 525-1 of the captured video at 180P resolution, and transmits both the original captured version 523-1 (i.e., 1080P and/or 720P) and the rescaled version 525-1 (i.e., the 180P version) to the video server system 552 for storage. In some implementations, the rescaled version has a lower resolution, and optionally a lower frame rate, than the original captured video. The video server system 552 transmits the original captured version or the rescaled version to a client 504, depending on the context. For example, the video server system 552 transmits the rescaled version when transmitting multiple videos to the same client device 504 for concurrent monitoring by the user, and transmits the original captured version in other contexts. In some implementations, the video server system 552 downscales the original captured version to a lower resolution, and transmits the downscaled version.

In some other implementations, a camera 118 of a video source 522 captures video at a first resolution (e.g., 720P and/or 1080P)) and/or a first frame rate, and sends the captured video to the video server system 552 at the first resolution (e.g., the original capture resolution(s), the high-quality resolution(s) such as 1080P and/or 720P) and the first fame rate for storage. When the video server system 552 transmits the video to a client device, the video server system 552 may downscale the video to a second, lower resolution (e.g., 180P) and/or second, lower frame rate for the transmission, depending on the context. For example, the video server system 552 transmits the downscaled version when transmitting multiple videos to the same client device 504 for concurrent monitoring by the user, and transmits the original captured version in other contexts.

As shown in FIG. 5B, in accordance with some implementations, each of the client devices 504 includes a client-side module 502. The client-side module 502 communicates with the video server system 552 through the one or more networks 162. In some implementations, the video server system 552 includes a video server 552, a client interface server 556, and a camera interface server 558. In some implementations, the video server 552 includes the server-side module 506 and its components and modules (FIG. 5A) or one or more respective components and/or modules of the server-side module 506. The client-side module 502 provides client-side functionalities for the event monitoring and review processing and communications with the video server system 552. The video server system 552 provides server-side functionalities for event monitoring and review processing for any number of client-side modules 502 each residing on a respective client device 504. The video server system 556 also provides server-side functionalities for video processing and camera control for any number of the video sources 522, including any number of control devices and the cameras 118.

In some implementations, the video server 554 includes one or more processors 512, a video storage database 514, and device and account databases 516. In some implementations, the video server system 552 also includes a client interface server 556 and a camera interface server 558. The client interface server 556 provides an I/O interface to one or more client devices 504, and the camera interface server 558 provides an I/O interface to one or more video sources 520. The client interface server 556 facilitates the client-facing input and output processing for the video server system 552. For example, the client interface server 556 generates web pages for reviewing and monitoring video captured by the video sources 522 in a web browser application at a client 504. In some implementations, the client interface server 556 or a transcoding proxy computer rescales (e.g., downscales) and/or changes the frame rate of video for transmission to a client 504. In some implementations, the client interface server 504 also serves as the transcoding proxy. The databases 516 store a plurality of profiles for reviewer accounts registered with the video processing server, where a respective user profile includes account credentials for a respective reviewer account, and one or more video sources linked to the respective reviewer account. The camera interface server 558 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, event masks, alert events, and camera histories, for use in data processing for event monitoring and review for each reviewer account.

In some implementations, the video server system 552 receives information regarding alert events detected by other smart devices 204 (e.g., hazards, sound, vibration, motion. In accordance with the alert event information, the video server system 552 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 552 is implemented on one or more standalone data processing apparatuses or a distributed network of computers. In some implementations, the video server 554, the client interface server 556, and the camera interface server 558 are each respectively implemented on one or more standalone data processing apparatuses or a distributed network of computers. In some implementations, the video server system 552 also employs various virtual devices and/or services of third party service providers (e.g., third-party cloud service providers) to provide the underlying computing resources and/or infrastructure resources of the video server system 552. In some implementations, the video server system 552 includes, but is not limited to, a handheld computer, a tablet computer, a laptop computer, a desktop computer, or a combination of any two or more of these data processing devices or other data processing devices.

The server-client environment 550 shown in FIG. 5B includes both a client-side portion (e.g., the client-side module 502) and a server-side portion (e.g., the components and modules in the video server system 552). The division of functionalities between the client and server portions of operating environment 550 can vary in different implementations. Similarly, the division of functionalities between the video source 522 and the video server system 552 can vary in different implementations. For example, in some implementations, client-side module 502 is a thin-client that provides only user-facing input and output processing functions, and delegates all other data processing functionalities to a backend server (e.g., the video server system 552). Similarly, in some implementations, a respective one of the video sources 522 is a simple video capturing device that continuously captures and streams video data to the video server system 552 with no or limited local preliminary processing on the video data. Although many aspects of the present technology are described from the perspective of the video server system 552, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 552, the client device 504, and the video sources 522 cooperatively.

It should be understood that operating environment 550 that involves the video server system 552, the video sources 522 and the video cameras 118 is merely an example. Many aspects of operating environment 550 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

In some implementations, a video source 522 may be private (e.g., its captured videos and history are accessible only to the associated user/account), public (e.g., its captured videos and history are accessible by anyone), or shared (e.g., its captured videos and history are accessible only to the associated user/account and other specific users/accounts with whom the associated user has authorized access (e.g., by sharing with the other specific users)). Whether a video source 522 is private, public, or shared is configurable by the associated user.

In some implementations, the camera 118 also performs preliminary motion detection on video captured by the camera 118. For example, the camera 118 analyzes the captured video for significant changes in pixels. When motion is detected by the preliminary motion detection, the camera 118 transmits information to the hub device server system 508 or video server system 552 informing the server system of the preliminary detected motion. The hub device server system 508 or video server system 552, in accordance with the information of the detected motion, may activate sending of a motion detection notification to a client device 504, log the preliminary detected motion as an alert event, and/or perform additional analysis of the captured video to confirm and/or classify the preliminary detected motion.

Figure 6:
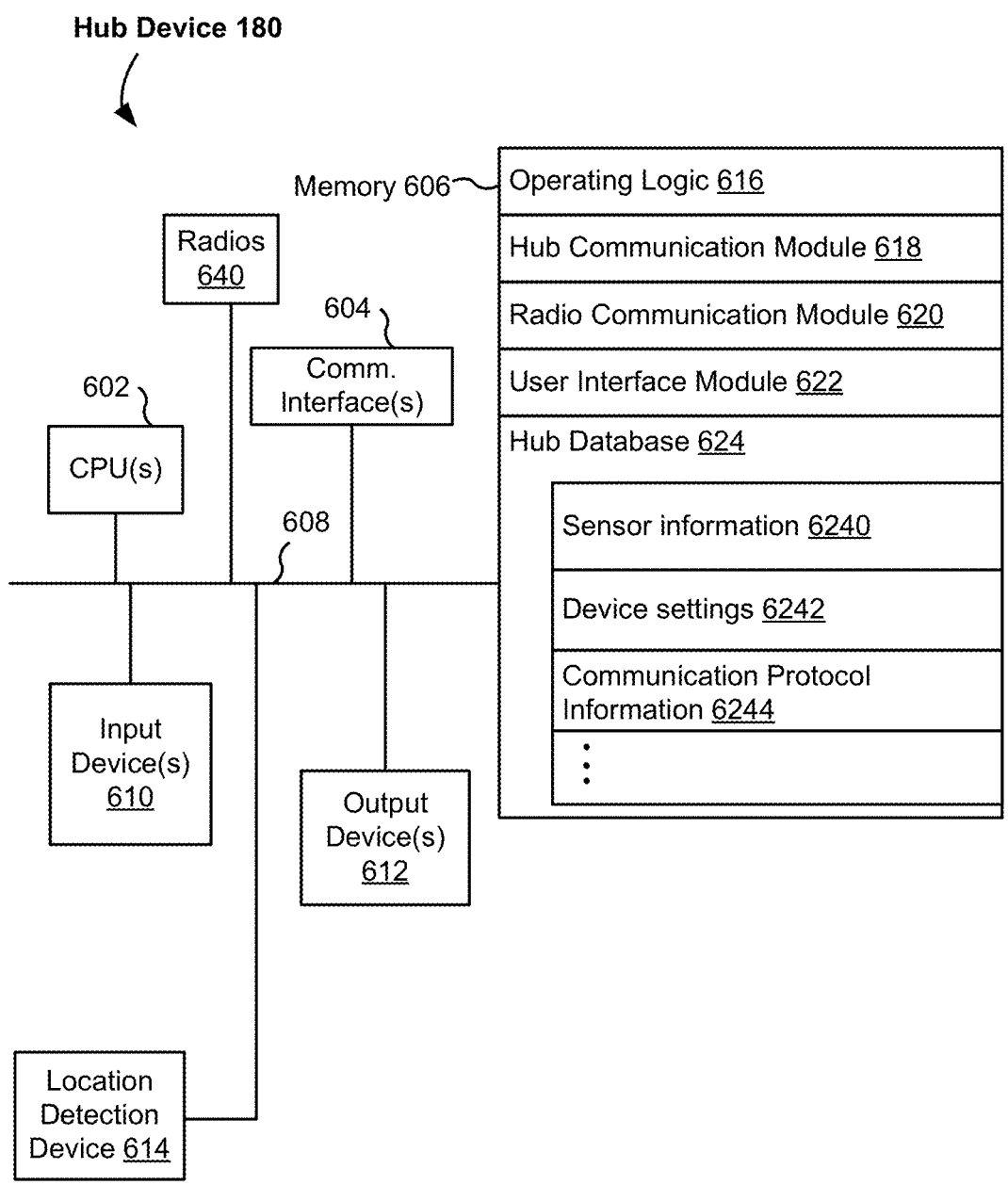
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 620 for connecting the hub device 180 to other devices (e.g., controller devices, smart devices 204 in smart home environment 100, client devices 504) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed; and
- Hub device database 624, including but not limited to:
    - Sensor information 6240 for storing and managing data received, detected, and/or transmitted by one or more sensors of the hub device 180 and/or one or more other devices (e.g., smart devices 204 in smart home environment 100);

Device settings 6242 for storing operational settings for one or more devices (e.g., coupled smart devices 204 in smart home environment 100); and Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7A:
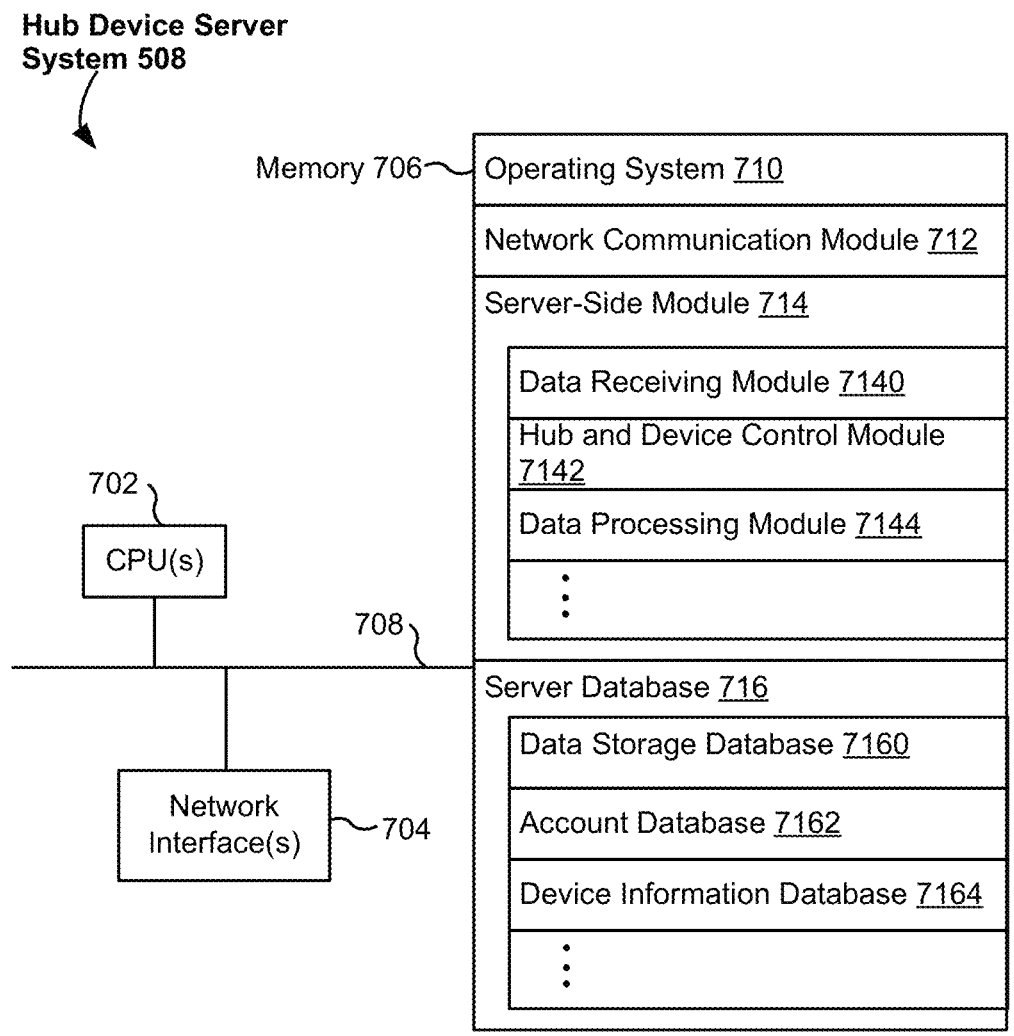
FIG. 7A is a block diagram illustrating a representative hub device server system, in accordance with some implementations.

FIG. 7A is a block diagram illustrating the hub device server system 508 in accordance with some implementations. The hub device server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 710 including procedures for handling various basic system services and for performing hardware dependent tasks;

Network communication module 712 for connecting the hub device server system 508 to other systems and devices (e.g., client devices, electronic devices, and systems connected to one or more networks 162, FIGS. 1-5B) via one or more network interfaces 704 (wired or wireless);

Server-side module 714, which provides server-side functionalities for device control, data processing and data review, including but not limited to:

Data receiving module 7140 for receiving data from electronic devices (e.g., video data from a camera 118, FIG. 1) via the hub device 180, and preparing the received data for further processing and storage in the data storage database 7160;

Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 7144 for processing the data provided by the electronic devices, and/or preparing and sending processed data to a device for review (e.g., client devices 504 for review by a user); and Server database 716, including but not limited to:

Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 7B:
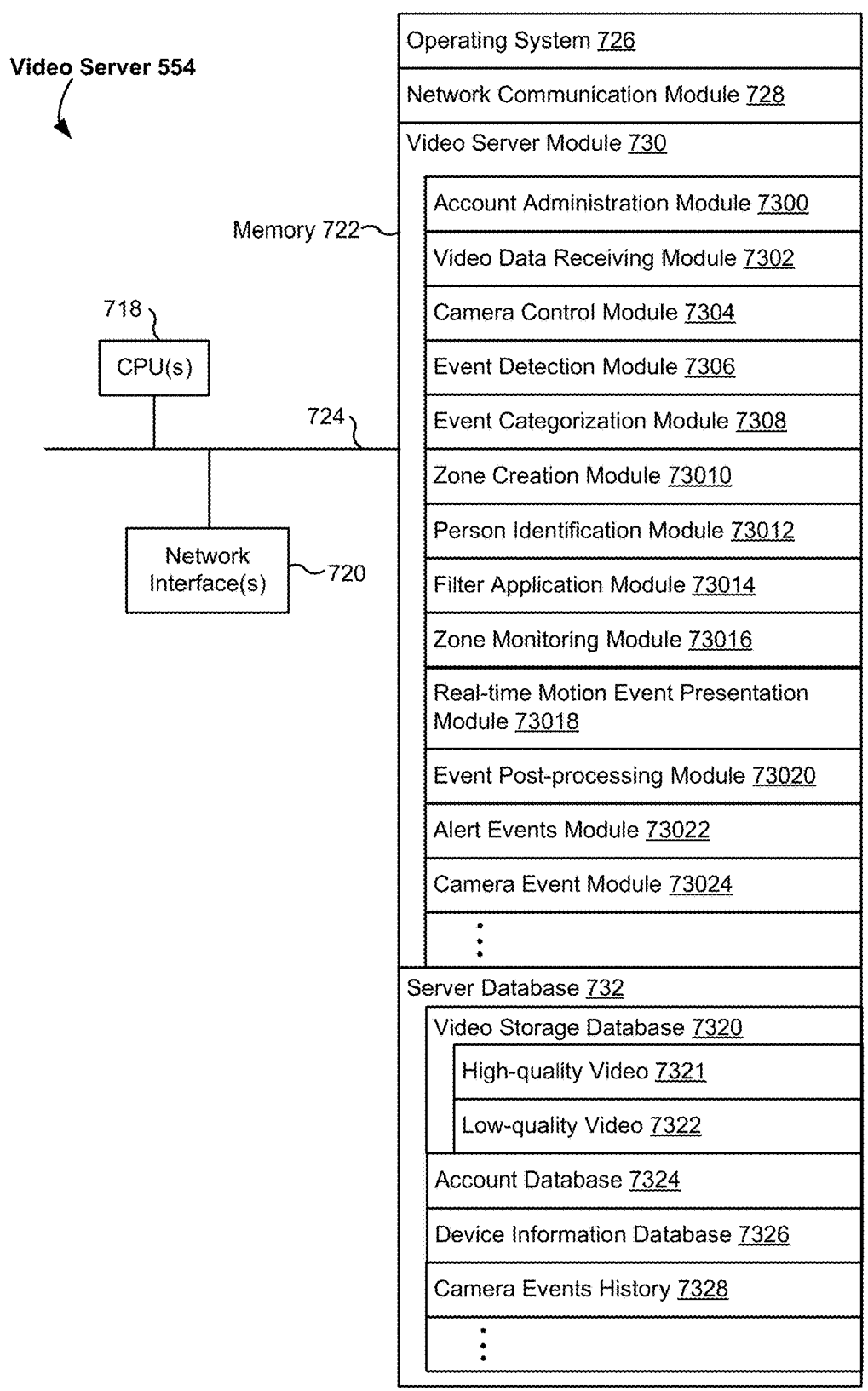
FIG. 7B is a block diagram illustrating a representative video server system, in accordance with some implementations.

FIG. 7B is a block diagram illustrating the video server 554 in accordance with some implementations. The video server 554, typically, includes one or more processing units (CPUs) 718, one or more network interfaces 720, memory 722, and one or more communication buses 724 for interconnecting these components (sometimes called a chipset). Memory 722 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 722, optionally, includes one or more storage devices remotely located from one or more processing units 718. Memory 722, or alternatively the non-volatile memory within memory 722, includes a non-transitory computer readable storage medium. In some implementations, memory 722, or the non-transitory computer readable storage medium of memory 722, stores the following programs, modules, and data structures, or a subset or superset thereof:

- Operating system 726 including procedures for handling various basic system services and for performing hardware dependent tasks;
- Network communication module 728 for connecting the video server 554 to other systems and devices (e.g., client devices, electronic devices, and systems connected to one or more networks 162, FIGS. 1-5B) via one or more network interfaces 720 (wired or wireless);
- Video server module 730, which provides server-side data processing and functionalities for video and event monitoring and review, including but not limited to:
    - Account administration module 7300 for creating reviewer accounts, performing camera registration processing to establish associations between video sources to their respective reviewer accounts, and providing account login-services to the client devices 504;
    - Video data receiving module 7302 for receiving raw video data from the video sources 522, and preparing the received video data for event processing and long-term storage in the video storage database 514;
    - Camera control module 7304 for generating and sending server-initiated control commands to modify the operation modes of the video sources, and/or receiving and forwarding user-initiated control commands to modify the operation modes of the video sources 522;
    - Event detection module 7306 for detecting motion event candidates in video streams from each of the video sources 522, including motion track identification, false positive suppression, and event mask generation and caching;
    - Event categorization module 7308 for categorizing motion events detected in received video streams;
    - Zone creation module 73010 for generating zones of interest in accordance with user input;
    - Person identification module 73012 for identifying characteristics associated with presence of humans in the received video streams;
    - Filter application module 73014 for selecting event filters (e.g., event categories, zones of interest, a human filter, etc.) and applying the selected event filter to past and new motion events detected in the video streams;
    - Zone monitoring module 73016 for monitoring motions within selected zones of interest and generating notifications for new motion events detected within the selected zones of interest, where the zone monitoring takes into account changes in surrounding context of the zones and is not confined within the selected zones of interest;
    - Real-time motion event presentation module 73018 for dynamically changing characteristics of event indicators displayed in user interfaces as new event filters, such as new event categories or new zones of interest, are created, and for providing real-time notifications as new motion events are detected in the video streams; and
    - Event post-processing module 3020 for providing summary time-lapse for past motion events detected in video streams, and providing event and category editing functions to user for revising past event categorization results;
    - Alert events module 73022 for receiving information on alert events (e.g., detected hazards, detected sounds, etc.), instructing cameras 118 to capture video in accordance with alert event information, and determining chronologies of alert events; and
    - Camera events module 73024 for associating captured video with alert events, from the same smart home environment 100, that are proximate or contemporaneous in time, and logging camera histories of camera events; and
- Server database 732, including but not limited to:
    - Video storage database 7320 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, etc.) associated with the motion events;
    - Account database 7324 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
    - Device Information Database 7326 for storing device information related to one or more hub devices, e.g., device identifiers and hub device specific secrets, independently of whether the corresponding hub devices have been associated with any user account; and
    - Camera events history 7328 for storing per-camera histories of camera events, including alert events, chronologies of alert events, and references to associated videos in the video storage database 7320.

Video data stored in the video storage database 7320 includes high-quality versions 7321 and low-quality versions 7322 of videos associated with each of the video sources 522. High-quality video 7321 includes video in relatively high resolutions (e.g., 720P and/or 1080P) and relatively high frame rates (e.g., 24 frames per second). Low-quality video 7322 includes video in relatively low resolutions (e.g., 180P) and relatively low frame rates (e.g., 5 frames per second, 10 frames per second).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 722, optionally, stores a subset of the modules and data structures identified above. Furthermore, memory 722, optionally, stores additional modules and data structures not described above.

Figure 7C:
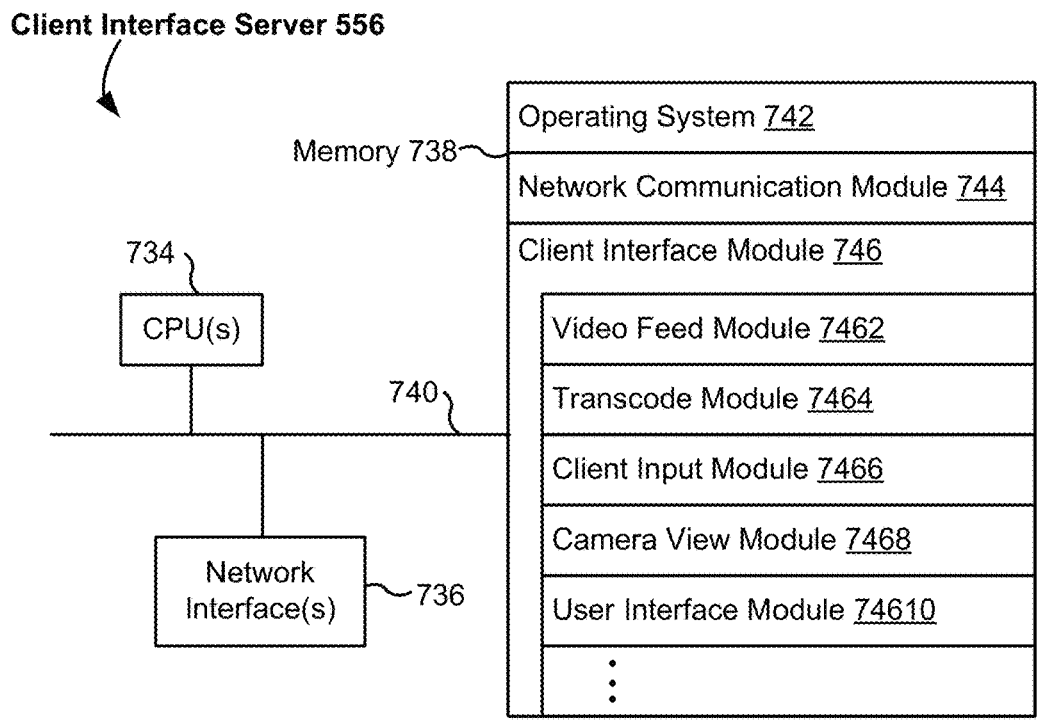
FIG. 7C is a block diagram illustrating a representative client interface server, in accordance with some implementations.

FIG. 7C is a block diagram illustrating the client interface server 556 in accordance with some implementations. The client interface server 556, typically, includes one or more processing units (CPUs) 734, one or more network interfaces 736, memory 738, and one or more communication buses 740 for interconnecting these components (sometimes called a chipset). Memory 738 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 738, optionally, includes one or more storage devices remotely located from one or more processing units 734. Memory 738, or alternatively the non-volatile memory within memory 738, includes a non-transitory computer readable storage medium. In some implementations, memory 738, or the non-transitory computer readable storage medium of memory 738, stores the following programs, modules, and data structures, or a subset or superset thereof:

Operating system 742 including procedures for handling various basic system services and for performing hardware dependent tasks;

Network communication module 744 for connecting the client interface server 556 to other systems and devices (e.g., client devices, video server 554, and systems connected to one or more networks 162, FIGS. 1-5B) via one or more network interfaces 740 (wired or wireless);

Client interface module 746, which provides an I/O interface between client devices 504 and the video server 554, including but not limited to:

Video feed module 7462 for transmitting videos from the video server system, or images extracted from same videos, to client devices as video streams or periodically refreshed images, and optionally transmitting particular views of videos or images from videos;

Transcode module 7464 for rescaling (e.g., downscaling from 720P to 180P) video for transmission to client devices 504;

Client input module 7466 for receiving and processing input commands from client devices (e.g., client device 504) 504 to change the video view being transmitted or controlling a video source 522;

Camera view module 7468 for determining which views of videos or images from videos are to be transmitted to client devices; and User interface module 74610 for generating user interfaces (e.g., web pages), transmitted to client devices 504, for viewing video feeds and corresponding event histories.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 738, optionally, stores a subset of the modules and data structures identified above. Furthermore, memory 738, optionally, stores additional modules and data structures not described above.

Figure 7D:
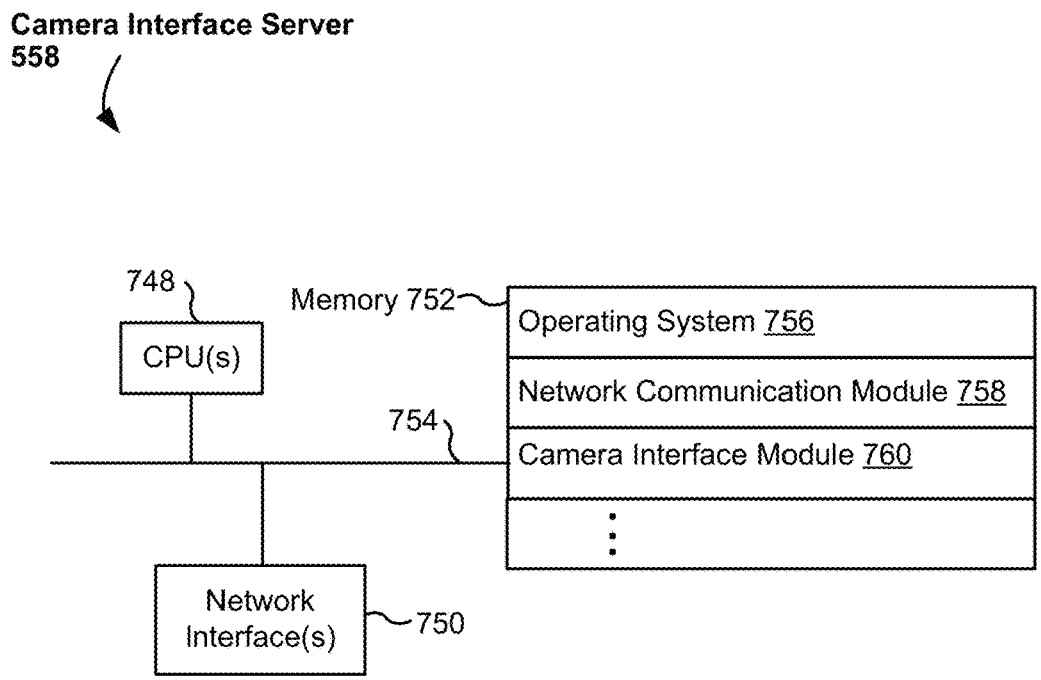
FIG. 7D is a block diagram illustrating a representative camera interface server, in accordance with some implementations.

FIG. 7D is a block diagram illustrating the camera interface server 558 in accordance with some implementations. The camera interface server 558, typically, includes one or more processing units (CPUs) 748, one or more network interfaces 750, memory 752, and one or more communication buses 754 for interconnecting these components (sometimes called a chipset). Memory 752 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 752, optionally, includes one or more storage devices remotely located from one or more processing units 748. Memory 752, or alternatively the non-volatile memory within memory 752, includes a non-transitory computer readable storage medium. In some implementations, memory 752, or the non-transitory computer readable storage medium of memory 752, stores the following programs, modules, and data structures, or a subset or superset thereof:

Operating system 756 including procedures for handling various basic system services and for performing hardware dependent tasks;

Network communication module 758 for connecting the camera interface server 558 to other systems and devices (e.g., client devices, video server 554, and systems connected to one or more networks 162, FIGS. 1-5B) via one or more network interfaces 754 (wired or wireless); and Camera interface module 760 for providing an I/O interface between video sources 522 and the video server 554.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 752, optionally, stores a subset of the modules and data structures identified above. Furthermore, memory 752, optionally, stores additional modules and data structures not described above.

In some implementations, at least some of the functions of the video server 554, client interface server 556, and camera interface server 558 are performed by the hub device server system 508, and the corresponding modules and sub-modules of these functions may be included in the hub device server system 508. In some implementations, at least some of the functions of the hub device server system 508 are performed by the video server 554, client interface server 556, and/or camera interface server 558, and the corresponding modules and sub-modules of these functions may be included in the video server 554, client interface server 556, and/or camera interface server 558.

Figure 8A:
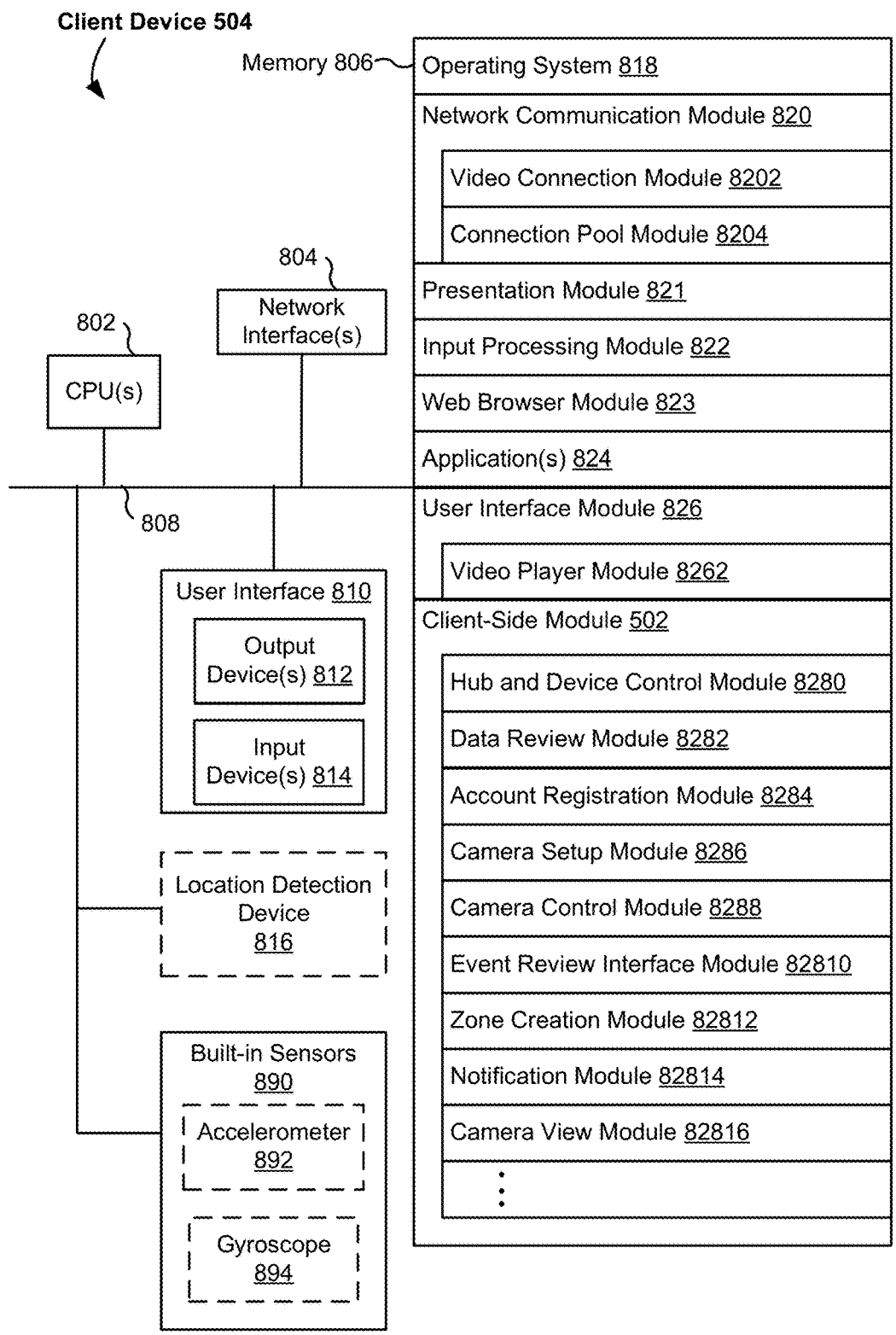
FIG. 8A-8B are block diagrams illustrating a representative client device associated with a user account, in accordance with some implementations.
Figure 8B:
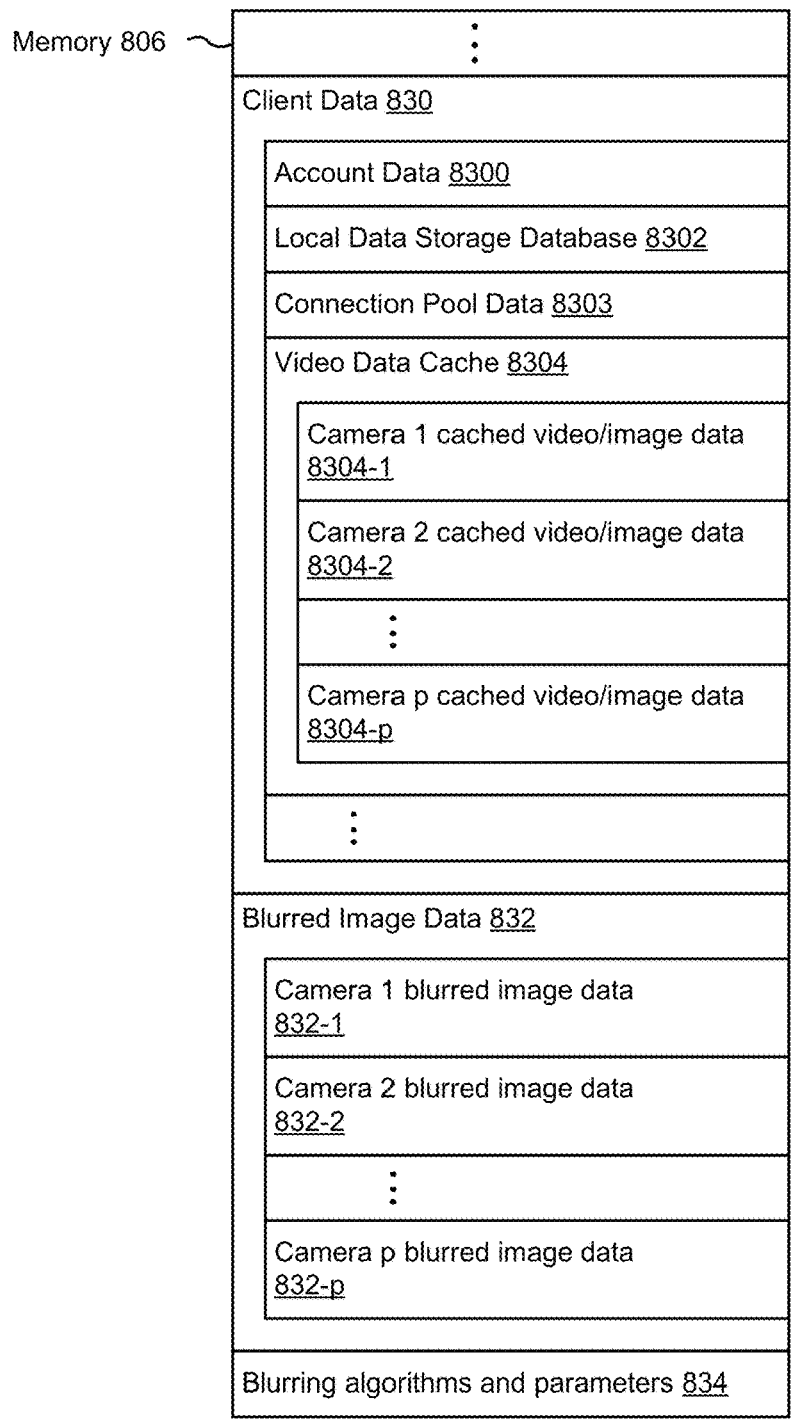

FIGS. 8A-8B are block diagrams illustrating a representative client device 504 associated with a user (e.g., reviewer) account in accordance with some implementations. The client device 504, typically, includes one or more processing units (CPUs) 802, one or more network interfaces 804, memory 806, and one or more communication buses 808 for interconnecting these components (sometimes called a chipset). The client device also includes a user interface 810 and one or more built-in sensors 890 (e.g., accelerometer 892 and gyroscope 894). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. Further, the client device 504 optionally uses the accelerometer to detect changes in the orientation of the client device 504, and in particular applications and contexts interpret the change in orientation detected by the accelerometer as user input. In some implementations, the client device 504 includes one or more cameras, scanners, or photo sensor units for capturing images (not shown). In some implementations, the client device 504 optionally includes a location detection device 816, such as a GPS (global positioning satellite) or other geo-location receiver, for determining the location of the client device 504.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- Operating system 818 including procedures for handling various basic system services and for performing hardware dependent tasks;
- Network communication module 820 for connecting the client device 504 to other systems and devices (e.g., hub device server system 508, video server system 552, video sources 522) connected to one or more networks 162 via one or more network interfaces 804 (wired or wireless);
- Presentation module 821 for enabling presentation of information (e.g., user interfaces for application(s) 824 and web browser module 823 or the client-side module 502, widgets, websites and web pages thereof, and/or games, audio and/or video content, text, etc.) at the client device 504 via the one or more output devices 812 (e.g., displays, speakers, etc.) associated with the user interface 810;
- Input processing module 822 for detecting one or more user inputs or interactions from one of the one or more input devices 814 and optionally the accelerometer 892 and interpreting the detected input or interaction;
- Web browser module 823 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;
- One or more applications 824 for execution by the client device 504, such as smart home applications, video applications, games, social network applications, and/or other web or non-web based applications, for controlling devices (e.g., sending commands, configuring settings, etc. to hub devices and/or other client or electronic devices), and for reviewing data captured by the devices (e.g., device status and settings, captured data, or other information regarding the hub device or other connected devices);
- User interface module 826 for providing and displaying a user interface in which settings, captured data, and/or other data for one or more devices (e.g., smart devices 204 in smart home environment 100) can be configured and/or viewed, including but not limited to:
  - Video player module 826 for managing video players in a user interface (e.g., for use with displaying video feeds);
- Client-side module 502, which provides client-side data processing and functionalities for device control, data processing, data review, and monitoring and reviewing videos from one or more video sources and camera events, including but not limited to:
  - Hub device and device control module 8280 for generating control commands for modifying an operating mode of the hub device or the electronic devices in accordance with user inputs; and
  - Data review module 8282 for providing user interfaces for reviewing data processed by the hub device server system 508 or video server system 552;
  - Account registration module 8284 for establishing a reviewer account and registering one or more video sources with the hub device server system 508 or video server system 552;
  - Camera setup module 8286 for setting up one or more video sources within a local area network, and enabling the one or more video sources to access the hub device server system 508 or video server system 552 on the Internet through the local area network;
  - Camera control module 8288 for generating control commands for modifying an operating mode of the one or more video sources in accordance with user input;
  - Event review interface module 82810 for providing user interfaces for reviewing event timelines, camera histories with camera events, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;
  - Zone creation module 82814 for providing a user interface for creating zones of interest for each video stream in accordance with user input, and sending the definitions of the zones of interest to the hub device server system 508 or video server system 552;
  - Notification module 82814 for generating real-time notifications for all or selected alert events or motion events on the client device 504 outside of the event review user interface; and Camera view module 82816 for generating control commands for modifying a view of a video transmitted to the client device 504 in accordance with user input; and Client data 830 storing data associated with the user account, electronic devices, and video sources 522, including, but is not limited to:

Account data 8300 storing information related to both user accounts loaded on the client device 504 and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;

Local data storage database 8302 for selectively storing raw or processed data associated with electronic devices (e.g., of the video sources 522, such as a camera 118);

connection pool data 8303 storing information related to video connections (e.g., established connections) at the client device; and Video data cache 8304 for caching video and image data from video feeds;

Blurred image data 832; and

Blurring algorithms and parameters 834; for generating blurred image data 832 from video/image data in video data cache 8304.

In some implementations, network communication module 820 includes video connection module 8202 for establishing video connections with one or more video servers. In some implementations, video connection module 8202 is utilized to establish one or more preliminary connections corresponding to one or more video feeds to be displayed in a user interface on the client device. In some implementations, video connection module 8202 is utilized to establish a connection for a video feed then request/receive the video feed via the connection.

In some implementations, network communication module 820 includes connection pool module 8204 for maintaining a pool of video connections to be utilized in a user interface on the client device. In some implementations, connection pool module 8204 is used in conjunction with video connection module 8202 to establish and maintain a plurality of video connections. In some implementations, at a given time, each video connection of the plurality of video connections is either passive or active. Active video connections are connections that are transmitting a video feed at the given time. Passive video connections are connections that have been established and are being maintained, but are not transmitting a video feed at the given time. In some implementations, connection pool module 8204 is configured to maintain no more than a predetermined amount of video connections. Therefore, in accordance with a determination that the client device is maintaining the predetermined amount of video connections, prior to establishing a new video connection, connection pool module 8204 terminates an established video connection (e.g., a passive video connection).

Video data cache 8304 includes cached video/image data for respective cameras associated with a user of the client device 804. For example, as shown in FIG. 8B, the video data cache 8304 includes cached video/image data 8304-1 for a first camera, cached video/image data 8304-2 for a second camera, up to cached video/image data 8304-$p$ for a p-th camera. At a given moment, video data cache 8304 may not have cached video/image data for a given camera (e.g., due to the camera being newly associated with the user, due to the cache being cleared, due to the cached video/image data being expired and removed from the cache).

Blurred image data 832 includes sets of progressively blurred images for respective cameras. For example, as shown in FIG. 8B, the blurred image data 832 includes blurred image data (e.g., a set of progressively blurred images) 832-1 for the first camera, blurred image data 832-2 for the second camera, up to blurred image data 832-$p$ for the p-th camera.

In some implementations, the client device 504 caches camera history as well as video data 8304. For example, whenever the client device 504 receives camera events history 7328 data from the video server 554, the most recent camera events history (e.g., history from the past two hours, the most recent 20 events) is cached at the client device (e.g., in client data 830). This cached history data may be accessed for quick display of camera history information (e.g., in user interface 1304 (FIG. 13A)).

In some implementations, the client-side module 502 and user interface module 826 are parts, modules, or components of a particular application 824 (e.g., a smart home management application).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the hub device server system 508 or the video server system 552 are performed by the client device 504, and the corresponding sub-modules of these functions may be located within the client device 504 rather than the hub device server system 508 or video server system 552. In some implementations, at least some of the functions of the client device 504 are performed by the hub device server system 508 or video server system 552, and the corresponding sub-modules of these functions may be located within the hub device server system 508 or video server system 552 rather than the client device 504. The client device 504 and the hub device server system 508 or video server system 552 shown in FIGS. 7A-8, respectively, are merely illustrative, and different configurations of the modules for implementing the functions described herein are possible in various implementations.

Figure 9A:
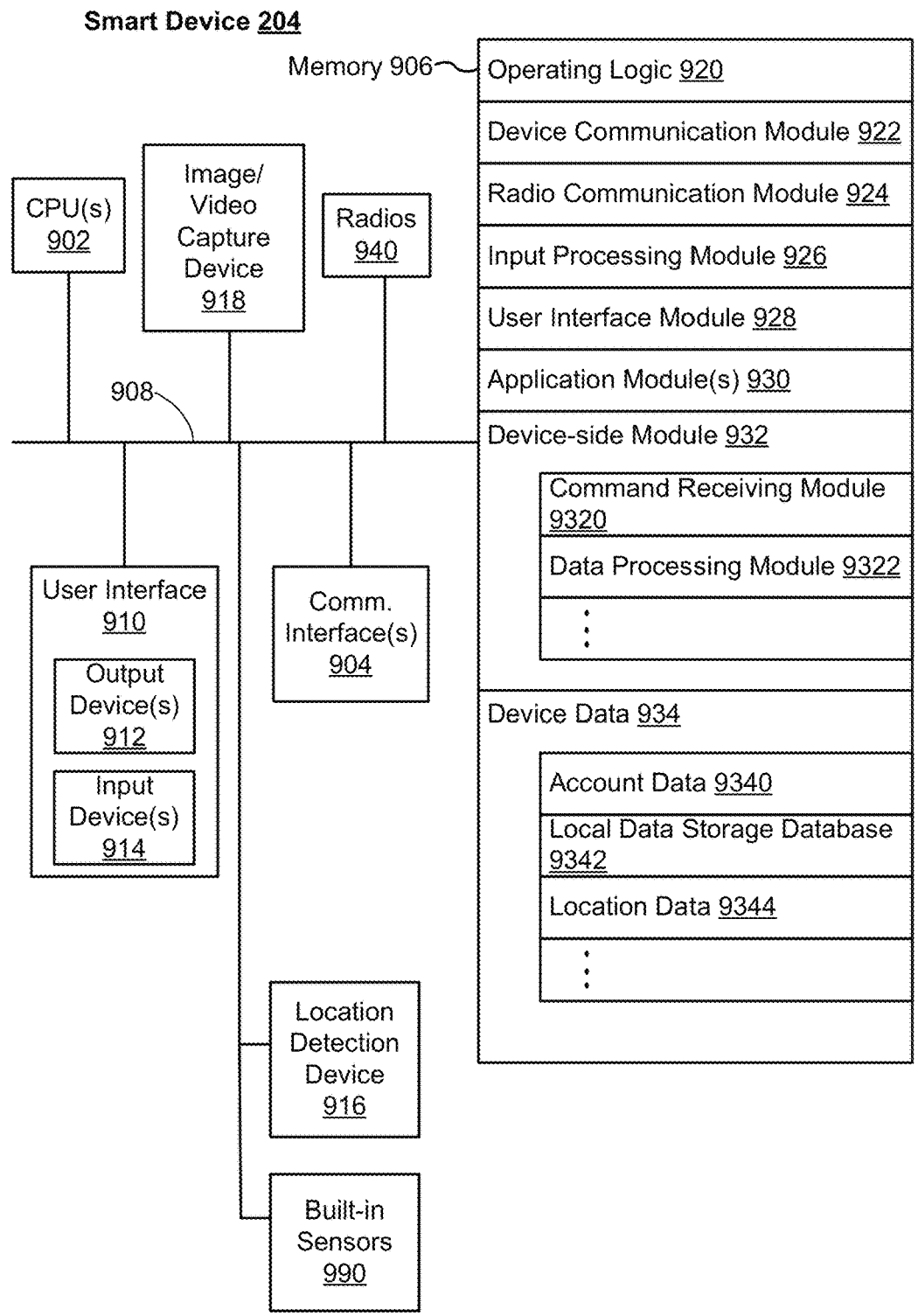
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- Operating logic 920 including procedures for handling various basic system services and for performing hardware dependent tasks;
- Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);
- Radio Communication Module 924 for connecting the smart device 204 to other devices (e.g., controller devices, smart devices 204 in smart home environment 100, client devices 504) via one or more radio communication devices (e.g., radios 940)
- Input processing module 926 for detecting one or more user inputs or interactions from the one or more input devices 914 and interpreting the detected inputs or interactions;
- User interface module 928 for providing and displaying a user interface in which settings, captured data, and/or other data for one or more devices (e.g., the smart device 204, and/or other devices in smart home environment 100) can be configured and/or viewed;
- One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- Device-side module 932, which provides device-side functionalities for device control, data processing and data review, including but not limited to:
  - Command receiving module 9320 for receiving, forwarding, and/or executing instructions and control commands (e.g., from a client device 504, from a smart home provider server system 164, from user inputs detected on the user interface 910, etc.) for operating the smart device 204;
  - Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and
- Device data 934 storing data associated with devices (e.g., the smart device 204), including, but is not limited to:
  - Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and
  - Local data storage database 9342 for selectively storing raw or processed data associated with the smart device 204 (e.g., video surveillance footage captured by a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 9B:
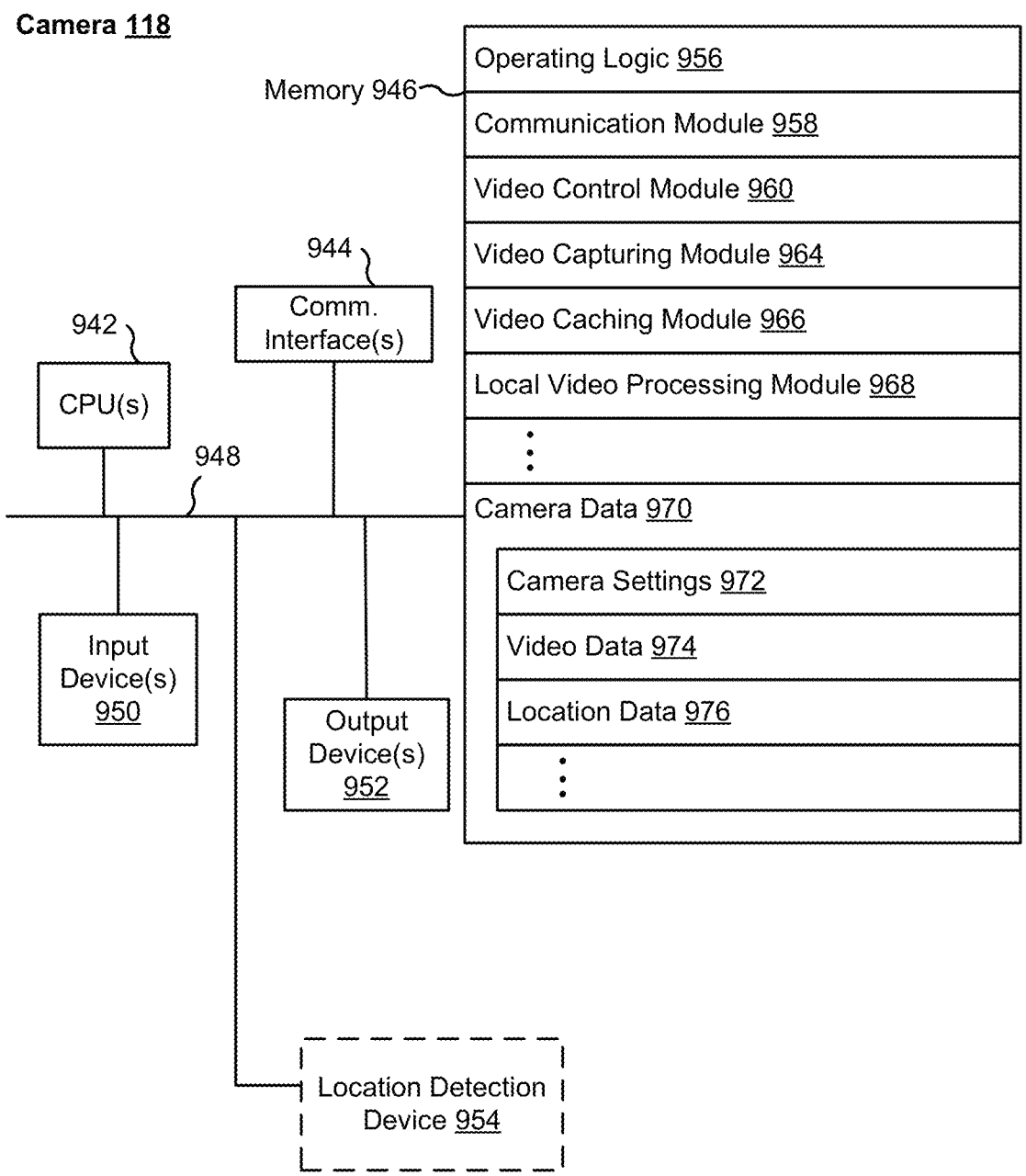
FIG. 9B is a block diagram illustrating a representative video capturing device (e.g., a camera) in accordance with some implementations.

FIG. 9B is a block diagram illustrating a representative camera 118 in accordance with some implementations. In some implementations, the camera 118 includes one or more processing units (e.g., CPUs, ASICs, FPGAs, microprocessors, and the like) 942, one or more communication interfaces 944, memory 946, and one or more communication buses 948 for interconnecting these components (sometimes called a chipset). In some implementations, the camera 118 includes one or more input devices 950 such as one or more buttons for receiving input and one or more microphones. In some implementations, the camera 118 includes one or more output devices 952 such as one or more indicator lights, a sound card, a speaker, a small display for displaying textual information and error codes, playing audio, etc. In some implementations, the camera 118 optionally includes a location detection device 954, such as a GPS (global positioning satellite) or other geo-location receiver, for determining the location of the camera 118.

Communication interfaces 944 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 946 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 946, or alternatively the non-volatile memory within memory 946, includes a non-transitory computer readable storage medium. In some implementations, memory 946, or the non-transitory computer readable storage medium of memory 946, stores the following programs, modules, and data structures, or a subset or superset thereof:

- Operating system 956 including procedures for handling various basic system services and for performing hardware dependent tasks;
- Network communication module 958 for connecting the camera 118 to other computing devices (e.g., hub device server system 508, video server system 552, the client device 504, network routing devices, one or more controller devices, and networked storage devices) connected to the one or more networks 162 via the one or more communication interfaces 944 (wired or wireless);
- Video control module 960 for modifying the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and/or the like;
- Video capturing module 964 for capturing and generating a video stream and sending the video stream to the hub device server system 508 or video server system 552 as a continuous feed or in short bursts, and optionally generating a rescaled version of the video stream and sending the video stream at the original captured resolution and the rescaled resolution;
- Video caching module 966 for storing some or all captured video data locally at one or more local storage devices (e.g., memory, flash drives, internal hard disks, portable disks, etc.);
- Local video processing module 968 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and
- Camera data 970 storing data, including but not limited to:
  - Camera settings 972, including network settings, camera operation settings, camera storage settings, etc.; and
  - Video data 974, including video segments and motion vectors for detected motion event candidates to be sent to the hub device server system 508 or video server system 552.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 946, optionally, stores a subset of the modules and data structures identified above. Furthermore, memory 946, optionally, stores additional modules and data structures not described above. Additionally, camera 118, being an example of a smart device 204, optionally includes components and modules included in smart device 204 as shown in FIG. 9A that are not shown in FIG. 9B.

Figure 10:
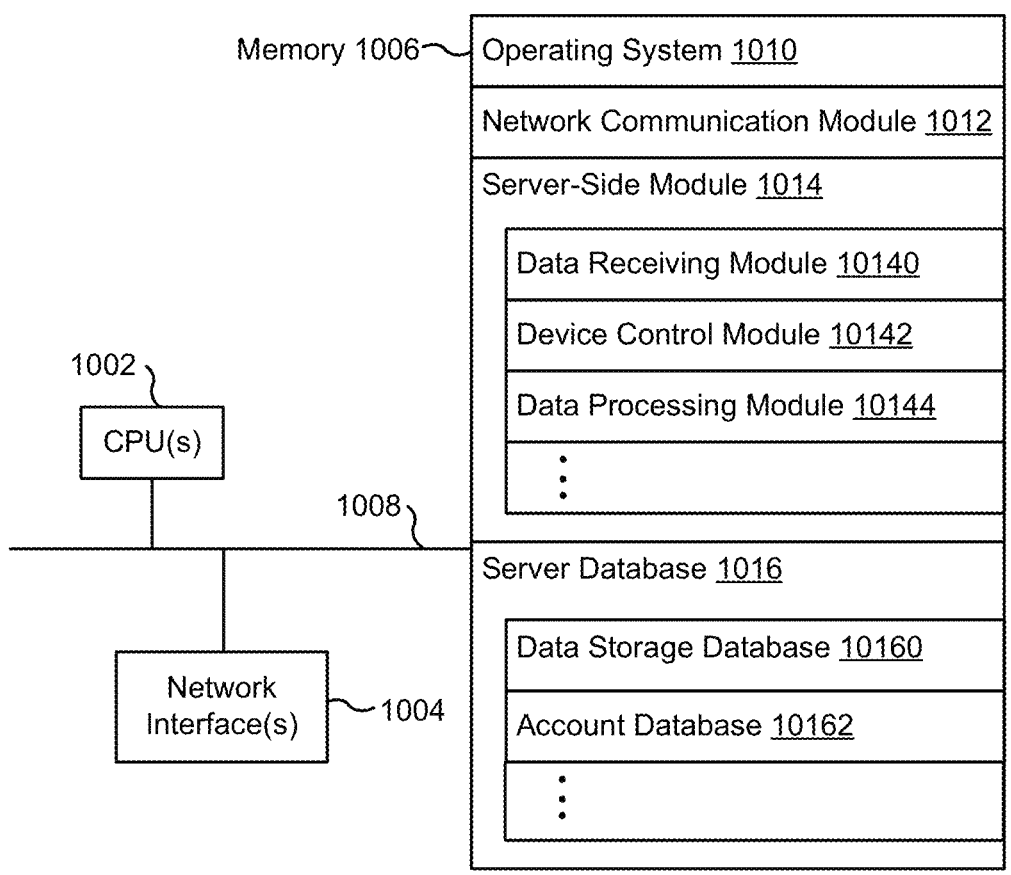
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

- Operating system 1010 including procedures for handling various basic system services and for performing hardware dependent tasks;
- Network communication module 1012 for connecting the smart home provider server system 164 to other systems and devices (e.g., client devices, electronic devices, hub device server system 508, video server system 552, and systems connected to one or more networks 162, FIGS. 1-5B) via one or more network interfaces 1004 (wired or wireless);

Server-side module 1014, which provides server-side functionalities for device control, data processing and data review, including but not limited to:

Data receiving module 10140 for receiving data from electronic devices (e.g., video data from a camera 118, FIG. 1), and preparing the received data for further processing and storage in the data storage database 10160;

Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub device server system 508, video server system 552, client device 504, smart device 204, camera 118, smart home provider server system 164) are interchangeable with one another and may be performed by any other devices or systems, where the corresponding sub-modules of these functions may additionally and/or alternatively be located within and executed by any of the devices and systems. As one example, generating of user interfaces may be performed by the user interface module 74610 (which may be located at the client interface server 556 or at the video server 554) or by the user interface module 826, depending on whether the user is accessing the video feeds and corresponding histories through a web browser 823 or an application 824 (e.g., a dedicated smart home management application) at the client device 504. The devices and systems shown in and described with respect to FIGS. 6-10 are merely illustrative, and different configurations of the modules for implementing the functions described herein are possible in various implementations.

Example User Interfaces

Figure 11A:
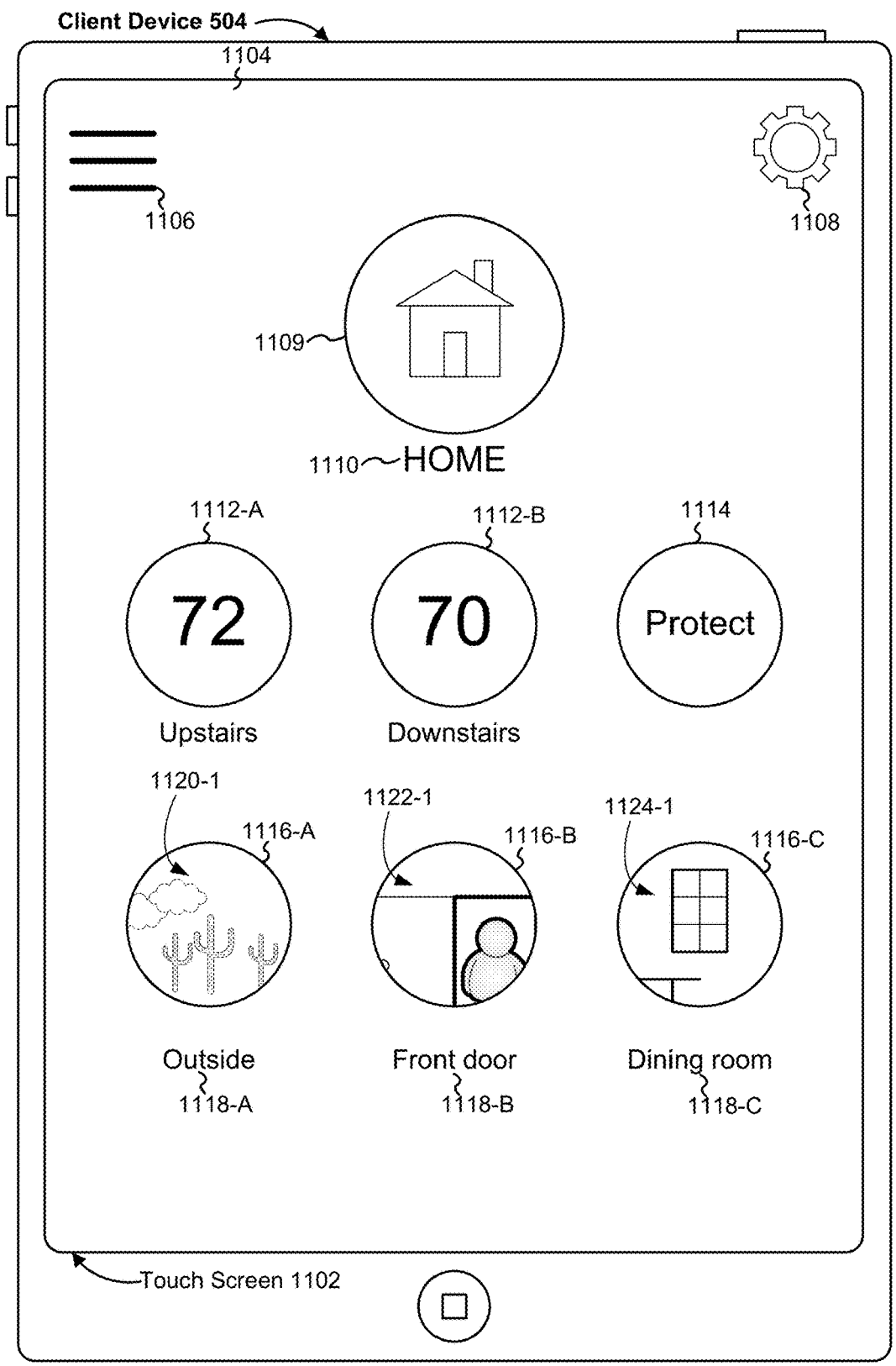
FIGS. 11A-11B illustrate example user interfaces on a client device for presenting smart home information in accordance with some implementations.
Figure 11B:
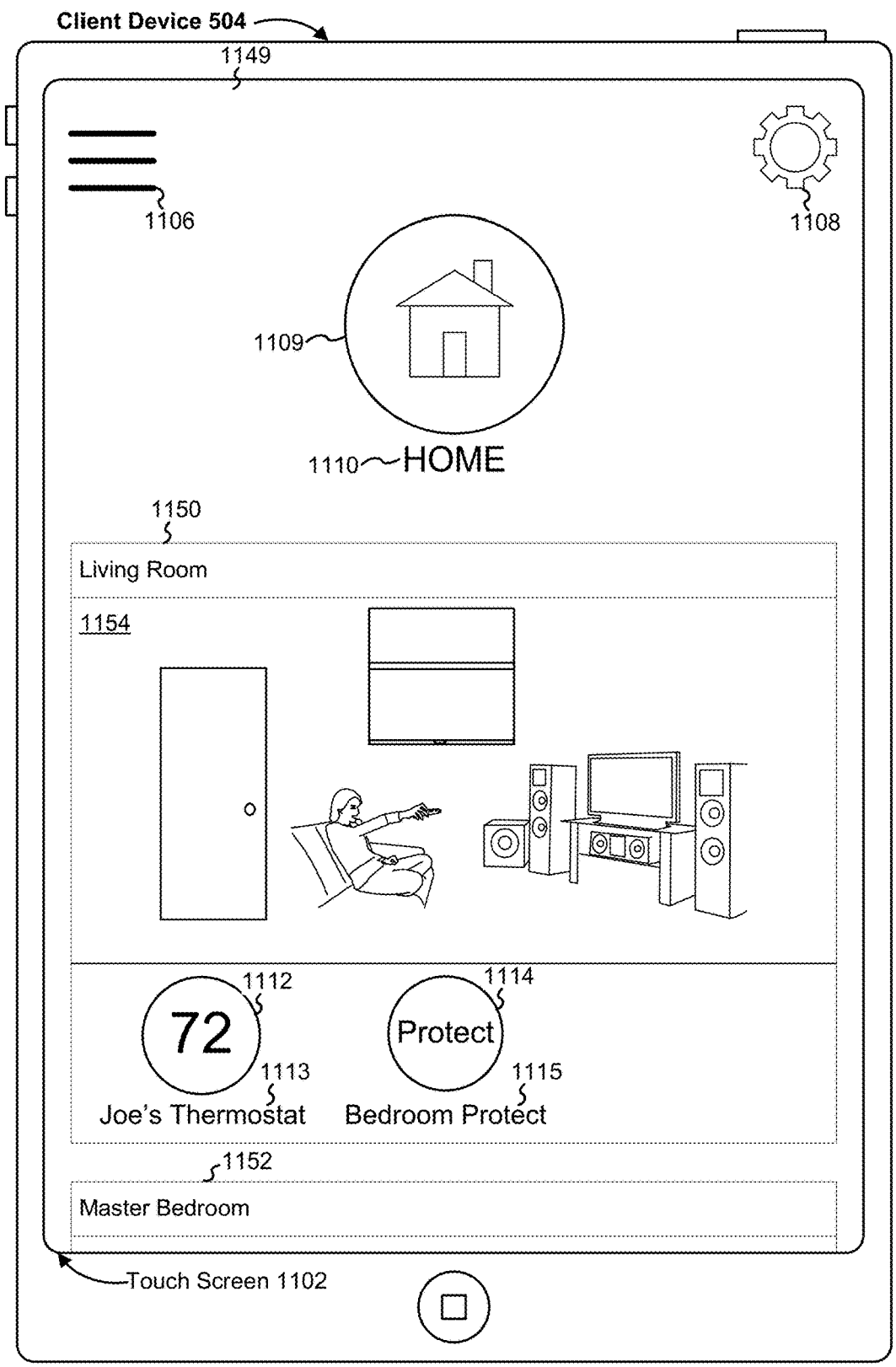

FIGS. 11A-11B illustrate example user interfaces on a client device for presenting smart home information in accordance with some implementations. FIG. 11A illustrates a client device 504 (e.g., a mobile device, such as a smart phone) with a touch screen 1102 and optionally an accelerometer 892 and/or a gyroscope 894 (FIG. 8A). A user interface 1104 of an application 824 is displayed on the touch screen 1102. In some implementations, the application is a dedicated smart home management application (also sometimes called a "smart home application"), and the user interface 1104 is a home page or screen of the smart home management application. The user interface 1104 includes multiple user interface objects (e.g., buttons, icons, etc.) that display information associated with a smart home environment 100 associated with the user and/or serve as affordances with which a user may interact to access functionalities associated with the smart home application. For example, the user interface 1104 includes a menu object 1106, a settings object 1108, a mode icon 1109 and corresponding label 1110, one or more thermostat objects 1112, a "Protect" object 1114, and one or more camera objects 1116 with corresponding labels 1118. Interface objects, such as objects 1112, 1114, and 1116, are sometimes also called interface "pucks."

The menu and settings objects 1106 and 1108, when activated by the user, provides access to an options menu or interface and a settings menu or interface for the smart home application, respectively. In some implementations, the menu object 1106 is displayed as a 3-line "hamburger menu" icon (e.g., as shown in FIG. 11A), and the settings icon is displayed as a gear icon (e.g., as shown in FIG. 11A). The mode icon 1109 and label 1110 indicates the operating mode of the smart home environment 100 with which the information displayed in user interface 1104 is associated (e.g., the user's home). For example, the smart home environment 100 may operate in a "Home" mode and an "Away" mode. In the "Home" mode, the user is presumed to be in the smart home environment 100 (e.g., within the structure 150). In the "Away" mode, the user is presumed to be remote from the smart home environment 100. Smart devices 204 may operate differently in the "Home" mode than in the "Away" mode, and certain notifications of events may be elided when in "Home" mode. The user may access a menu to change the mode by activating the mode icon 1109 (e.g., by tapping on the mode icon 1109 with a single tap gesture).

Thermostat objects 1112-A and 1112-B correspond to respective smart thermostats 102 in the smart home environment 100 and display the current detected temperatures and/or the set temperatures at the corresponding smart thermostats 102. "Protect" object 1114 provides access to a history of alert events (e.g., detected hazards, detected sounds, detected vibrations, operation of smart door lock 120, etc.) associated with the smart home environment 100. The user accesses the "Protect" history by activating the "Protect" object 1114 (e.g., by tapping on the "Protect"

object 1114 on the touch screen 1102). For example, FIG. 14U shows an example user interface with a "Protect" object activated.

The camera objects 1116-A, 1116-B, and 1116-C correspond to respective video sources 522 (or, more particularly, respective cameras 118) within the smart home environment 100. The labels 1118-A, 1118-B, and 1118-C indicate the respective video sources 522 to which the respective camera objects 1116 correspond. For example, the camera object 1116-A corresponds to a camera 118 labeled "Outside" 1118-A. In some implementations, the label is generated by the client device. In some implementations, the label is obtained from a user of the client device, or a user of the smart home environment.

In some implementations, within a respective camera object 1116, a view of a video feed or stream from the corresponding camera is displayed. For example, a view 1120 of the video feed from the "Outside" 1118-A camera is displayed in camera object 1116-A, a view 1122 of the video feed from the "Front door" 1118-B camera is displayed in camera object 1116-B, and a view 1124 of the video feed from the "Dining room" 1118-C camera is displayed in camera object 1116-C. In some implementations, the view of a video feed is displayed in a camera object 1116 as a real-time (or near real-time), live video stream from the corresponding camera or as periodically refreshed (e.g., at a rate less than typical frame rates for video) still images. In some implementations, the view is displayed at a resolution different from the original resolution and/or frame rate in which the video was captured. For example, the video views displayed in the camera objects 1116 are displayed at an 180P (180 horizontal lines progressive scan) resolution and at a frame rate of 5 or 10 frames per second, which is different from the original capture resolution (e.g., 720P or 1080P) and the original frame rate.

In some implementations, the view displayed in a camera object 1116 is cropped from the original video to fit the size and shape of the camera object 1116, and the cropping is positioned to focus on a particular portion of the video for display. For example, view 1120 is cropped to view 1120-1 to fit into circle-shaped object 1116-A, view 1122 is cropped to view 1122-1 to fit into circle-shaped object 1116-B, and view 1124 is cropped to view 1124-1 to fit into circle-shaped object 1116-C. In some implementations, the cropping is adjusted by the smart home application (e.g., the camera view module 82816) or by the hub device server system 508 or video server system 552 to a different position along the span of the video frame, which puts a different portion of the frame into display. In some implementations, the video frame is zoomed so that the height of the zoomed frame matches the height of the object, and the object is centered relative to the frame (i.e., the cropping is centered to display the center portion of the frame).

It should be appreciated that while the camera objects 1116 are shown as circular in the drawings, the camera objects 1116 may be in other shapes (e.g., square, rectangle, etc.) or each camera object 1116 may have a distinct shape (e.g., one camera object 1116 has a circular shape, another camera object 1116 has a square shape, and so on).

FIG. 11B shows another example user interface for presenting smart home information in accordance with some implementations. FIG. 11B shows a client device 504 (e.g., a mobile device, such as a smart phone) with a touch screen 1102. In some implementations, the application is a dedicated smart home management application (also sometimes called a "smart home application"), and the user interface 1149 is a home page or screen of the smart home management application. The user interface 1149 includes multiple user interface objects (e.g., buttons, icons, etc.) that display information associated with a smart home environment 100 associated with the user and/or serve as affordances with which a user may interact to access functionalities associated with the smart home application. For example, the user interface 1149 includes a menu object 1106, a settings object 1108, a mode icon 1109 and corresponding label 1110. User interface 1149 further includes a first section 1150 corresponding to a first space in the smart home environment 100 and a second section 1152 corresponding to a second space in the smart home environment 100. In FIG. 11B, the first section is denoted "Living Room" and includes interface objects associated with the "Living Room," such as video feed 1154, thermostat object 1112, and "Protect" object 1114. FIG. 11B further shows a label 1113, "Joe's Thermostat," for thermostat object 1112 and label 1115, "Bedroom Protect," for "Protect" object 1114. In some implementations, a default label (e.g., "thermostat", "protect", etc.) is utilized when a user has not set a custom label. In some implementations, the default label comprises the device name. In FIG. 11B, the second section is denoted "Master Bedroom" and is only partially visible on the touch screen 1102. As will be discussed in greater detail below, in some implementations, in response to a user scroll gesture (e.g., a vertical swipe gesture), the user interface 1149 updates to display more of the second section.

In some implementations, video feed 1154 is displayed at a resolution different from the original resolution and/or frame rate in which the video was captured. In some implementations, video feed 1154 is cropped from the original video to fit the size and shape of section 1150. In some implementations, the cropping is positioned to focus on a particular portion of the video for display. In some implementations, video feed 1154 is a real-time (or near real-time), live video stream from a corresponding camera. In some implementations, video feed 1154 is periodically refreshed (e.g., once every 20 seconds) with still images. In some implementations, video feed 1154 is stored video corresponding to a particular motion event, and is denoted as such in the user interface 1149 (e.g., with a "previous recording" label.)

In some implementations, a user of the client device 504 is enabled to switch between the user interface 1104 in FIG. 11A and the user interface 1149 in FIG. 11B (e.g., via a setting in a settings menu corresponding to settings object 1108).

In some implementations, the user interfaces illustrated in FIGS. 11A-11B, or variations thereof, are displayed on other devices (e.g., on a smart home application running on a tablet computer). For example, a tablet computer as shown in FIG. 14V. In some implementations, the user interfaces illustrated in FIGS. 11A-11B are displayed in other applications (e.g., in a web browser running on a desktop or laptop computer). For example, a web browser as shown in FIG. 14S.

Figure 12:
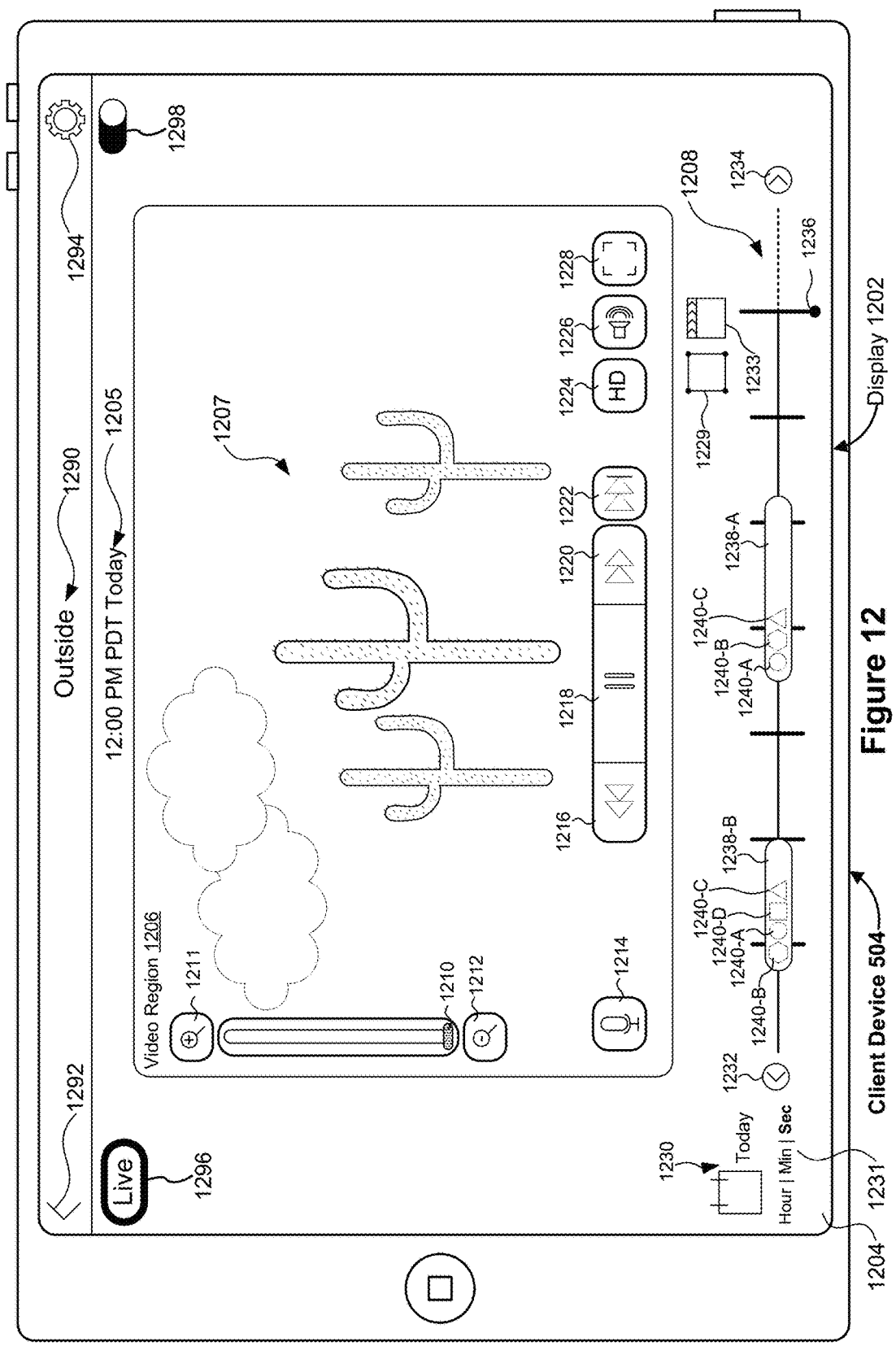
FIG. 12 illustrates an example user interface on a client device for monitoring and reviewing a video feed in accordance with some implementations.

FIG. 12 illustrates an example user interface on a client device for monitoring and reviewing a video feed in accordance with some implementations. FIG. 12 illustrates a client device 504 (e.g., a desktop computer, a laptop computer) with a display 1202. A user interface 1204 (e.g., rendered in a web browser) is displayed on the display 1202. In some implementations, the user interface 1204 is a web page associated with a smart home environment 100, and particularly, with a camera 118 in the smart home environment 100. The user interface 1204 includes multiple user interface objects (e.g., buttons, icons, etc.) that display information associated with the associated camera 118 and/or serve as affordances with which a user may interact to access functionalities associated with the associated camera 118. The user interface 1204 includes a video region 1206 in which a video feed 1207 (e.g., a live video stream or a saved video clip) from the associated camera is displayed. A camera label 1290 and time indicator 1205 identifies the associated camera 118 (in this case, the "Outside" 1118-A (FIG. 11A) camera) as well as the timestamp on the video feed 1207 displayed in the video region 1206.

FIG. 12 illustrates the client device 504 displaying video controls for accessing various functionalities related to the video feed 1207 displayed in the video region 1206 and the associated camera. In FIG. 12, the video region 1206 of the user interface 1204 includes: an elevator bar with a handle 1210 for adjusting the zoom magnification of the video feed 1207 displayed in the video region 1206, affordance 1212 for reducing the zoom magnification of the video feed 1207, and affordance 1211 for increasing the zoom magnification of the video feed 1207. In FIG. 12, the video region 1206 of the user interface 1204 also includes: affordance 1214 for enabling/disabling the microphone of the associated camera; affordance 1216 for rewinding the video feed 1207 by 10 seconds; affordance 1218 for pausing the video feed 1207; affordance 1220 for forwarding the video feed 1207 by 10 seconds; affordance 122 for jumping the video feed 1207 to the live video stream for the associated camera; optionally affordance 1224 for adjusting the playback quality of the video feed 1207; affordance 1226 for adjusting the playback volume of the video feed 1207, including muting the playback volume; and affordance 1228 for displaying the video feed 1207 in full screen mode (e.g., the video region 1206 expanded to fit the width of the display 1202). The user interface 1204 also includes backtracking affordance 1292 to backtrack to a previous user interface, settings affordance 1294, a live video indicator 1296, and camera on/off switch 1298.

Outside of the video region 1206, the user interface 1204 includes additional user interface objects and information. For example, the user interface 1204 includes a timeline 1208 for displaying camera events and their corresponding times and durations; a calendar affordance 1230 to jump to a particular calendar day in the timeline 1208; a time scale selector 1231 for selecting a level of detail in the timeline 1208; arrows 1232 and 1234 for scrolling backward and forward in the timeline, respectively; an activity zone affordance 1229 for accessing a list of alert event types and user-defined zones of interest for filtering the timeline by alert event type and/or zone of interest, as well as options to create or edit a zone of interest in the area monitored by the associated camera; and video clip affordance 1233 for accessing a user interface for creating user-custom video clips from video captured by the associated camera. The defining of zones of interest is described in the following U.S. Patent Applications filed on Oct. 8, 2014, which are incorporated by reference herein in their entirety: Ser. Nos. 14/509,999; 14/510,050; 14/510,015; 14/510,029; 14/510,007; 14/510,040; 14/510,030; 14/510,042; and Ser. No. 14/510,059.

The timeline 1208 shows a chronology of camera events associated with the associated camera. A camera event includes a corresponding video, one or more alert events that are associated with the video, and the chronology of the associated alert events. The alert events may be any event detected in the smart home environment 100 by a smart device 204 (e.g., detected hazard, detected sound, detected vibration, operation of a smart door lock 120, detected motion, etc.); the smart home environment 100 is configured to log and/or alert the user of detection of such events. In some implementations, alert events include motion events detected non-visually (e.g., detected by motion detectors) as well as motion events detected through video captured by a camera 118 (e.g., motion through or in a user-defined zone of interest). Detection of motion activity in a zone of interest is described in the following U.S. Patent Applications filed on Oct. 8, 2014, which were incorporated by reference above: Ser. Nos. 14/509,999; 14/510,050; 14/510,015; 14/510,029; 14/510,007; 14/510,040; 14/510,030; 14/510,042; and Ser. No. 14/510,059. In some implementations, each zone of interest is its own type of alert event; motion detected in one zone of interest and motion detected in another zone of interest are considered different types of alert events. In some implementations, alert events include motion activity not within any zone of interest.

In some implementations, when an alert event is detected, one or more cameras 118 proximate to the detected event or proximate to the smart devices 204 that detected the event are instructed to capture video, so as to capture a visual state of one or more areas proximate in location to, and contemporaneous (or otherwise proximate in time) with, the detected alert event. The alert event is associated with the captured video.

In some instances, the smart devices 204 detect concurrent, overlapping, and/or sequenced alert events. In some implementations, any two alert events that are in sequence with a less than a threshold amount of time (e.g., 2 seconds) between them, concurrent, or overlapping are associated with the same camera event. Thus, in some implementations, a camera event and its corresponding video are associated with multiple alert events (e.g., detected sound and vibration at same time, motion detected across multiple zones of interest in sequence).

A time marker 1236 is displayed on the timeline 1208. The time marker 1236 indicates the time in focus on the timeline 1208 and in the video region 1206. In FIG. 12, the time marker 1236 is displayed at the rightmost end of the timeline 1208, at a position between the solid portion and the dotted portion. The dotted portion indicates future time, and the solid portion includes past time up to the present. In some implementations, past time on the timeline 1208 in which the camera was off may also be represented as a dotted portion on the timeline 1208. Thus, the time marker 1236, positioned as shown in FIG. 12, is marking the current time.

Camera events are represented on the timeline by bars 1238 displayed over (e.g., overlaid on) the timeline 1208. Each bar 1238 has a length reflecting the duration of the camera event. For example, the camera event 1238-A is longer than the camera event 1238-B. In some implementations, the duration of a camera event is from the start of the earliest alert event in the camera event to the end of the last alert event in the camera event.

It should be appreciated that camera events are optionally displayed as bars 1238, depending on the fineness of the time scale of the timeline 1208. For example, camera events that are too short in duration to be displayed as bars for a particular time scale (e.g., a 5 second camera event at the hours scale) are optionally displayed as a shaped dot on the timeline 1208.

In some implementations, one or more icons 1240 corresponding to types of alert events are displayed in or near respective camera event bars 1238 to indicate the alert events associated with the respective alert events. For example, icons 1240-A, 1240-B, and 1240-C are displayed in camera event bar 1238-A; and icons 1240-A, 1240-B, and 1240-C, and 1240-D are displayed in camera event bar 1238-B. Each icon corresponds to a respective type of alert event, and is visually distinct from the others. In some implementations, the visual distinction is based on shape. For example, as shown in FIG. 12, icon 1240-A is a circle, icon 1240-B is a hexagon, icon 1240-C is a triangle, and icon 1240-D is a square. In some other implementations, the visual distinction is based on another attribute, such as color. For example, the icons 1240 are optionally circles of different colors.

In some implementations, the shape or color definitions for the icons 1240 are optionally automatically defined or user-defined. For example, shapes or colors for icons 1240 corresponding to predefined alert event types (e.g., hazard, sound, vibration, non-visual motion) are defined according to a default scheme, and shapes or colors for icons 1240 corresponding to user-defined zones of interest are defined according to the default scheme or a user definition.

In some implementations, when multiple instances of a particular type of alert event were detected during a camera event, the icon 1240 corresponding to that particular type is displayed just once within the camera event bar 1238. In some implementations, when multiple instances of a particular type of alert event were detected during a camera event, the icon corresponding to that particular type is visually adjusted to indicate the multiple instances.

In some implementations, the icons 1240 displayed within a camera event bar 1238 are ordered within the camera event bar 1238. In some implementations, the ordering is based on the chronological order of the alert events in the camera event. For example, in FIG. 12, the icons 1240 within a camera event bar are ordered from left to right, with the further right icons within the camera event bar 1238 corresponding to alert events more recent in time. In camera event 1238-A, there may be one or more multiple instances of the alert type of the type corresponding to icon 1240-C detected, but the most recent instance of that type is also the most recent alert event detected within the corresponding camera event, and thus the icon 1240-C is displayed in the rightmost position. In some other implementations, the icons 1240 displayed within a camera event 1238 are randomly ordered.

In some implementations, the icons 1240 within a camera event bar 1238 are ordered based on the chronological order of the most recent instances of each detected type of alert event, as just one icon is displayed for each type of alert event detected. Within the camera event bar 1238-A, an instance of the alert event of the type corresponding to icon 1240-C is the most recent alert event for the corresponding camera event and is more recent than the most recent instance of the alert event type corresponding to icon 1240-B detected for the corresponding camera event. As another example, within the camera event bar 1238-B, the most recent instance of the alert event type corresponding to icon 1240-D is more recent than the most recent instance of the alert event type corresponding to icon 1240-A, and thus icon 1240-D is displayed to the right of icon 1240-A.

In some implementations, alert event type icons 1240 are distinguished based on color, and when a camera event includes just one alert event type, the corresponding camera event bar 1238 is displayed with the color corresponding to the alert event type.

In some implementations, A user may click on (e.g., with a mouse) or tap on (e.g., with a contact on a touch screen) or hover over (e.g., with a mouse pointer) a camera event 1238 to view additional information about the camera event. For example, a mouse pointer is hovered over camera event bar. In response to the hovering mouse pointer, an information pop-up for the camera event is displayed. The information pop-up optionally includes a thumbnail of the video associated with the camera event; date and time information for the camera event; and icons, ordered chronologically in same manner as the icons within camera event bar, corresponding to alert event types detected for the camera event. In some implementations, the thumbnail is the video corresponding to the camera event played back at the thumbnail size. In some other implementations, the thumbnail is a still image (e.g., a frame) from the video corresponding to the camera event.

In some implementations, the time marker 1236 may be moved (e.g., dragged) along the timeline 1208 by the user to "scrub" the timeline 1208 and manually jump to a desired time in the timeline 1208. As an example of "scrubbing" the timeline 1208, the time marker 1236 is moved to a position over the camera event bar. In response to the time marker being positioned over the camera bar, a preview bar is displayed. The preview bar includes a chronological sequence of thumbnails of still frames of the video associated with the camera event. The thumbnail is the thumbnail of the still frame closest in time to the time corresponding to the timeline 1208 position where time marker 1236 is positioned.

In some implementations, the user-defined zones of interest are displayed in the video region 1206 over the video feed 1207. For example, when affordance 1229 is activated, a filtering list of user-defined zones of interest and alert event types is displayed, as well as options to edit and create, respectively, a zone of interest (not shown). The user may select one or more of the zones and alert event types for filtering of the timeline 1208 and the camera events therein by the selected zones and alert event types. The user may also select the option to edit a zone. In response to the user selecting the option to edit a zone, the defined zones are displayed in the video region 1206 while the video feed 1207 continues to be played in video region 1206, along with a prompt for the user to select a zone for editing.

In some other implementations, instead of being an affordance for opening a user interface for filtering zones of interest and alert event types, the affordance 1229 is an affordance for toggling between showing and not showing zones of interest in the video region 1206, aside from any filtering of the timeline 1208 or any option edit or create a zone of interest. In some implementations, user interface 1204 includes an affordance for opening a user interface for filtering zones of interests and an affordance for toggling between showing and not showing zones of interest in the video region 1206.

FIGS. 13A-13G illustrate example user interfaces on a client device for presenting smart home information in accordance with some implementations. In some implementations, the user interfaces depicted in FIGS. 13A-13G are user interfaces for a smart home application on a client device (e.g., client device 504), such as a smart phone or a tablet computer.

Figure 13A:
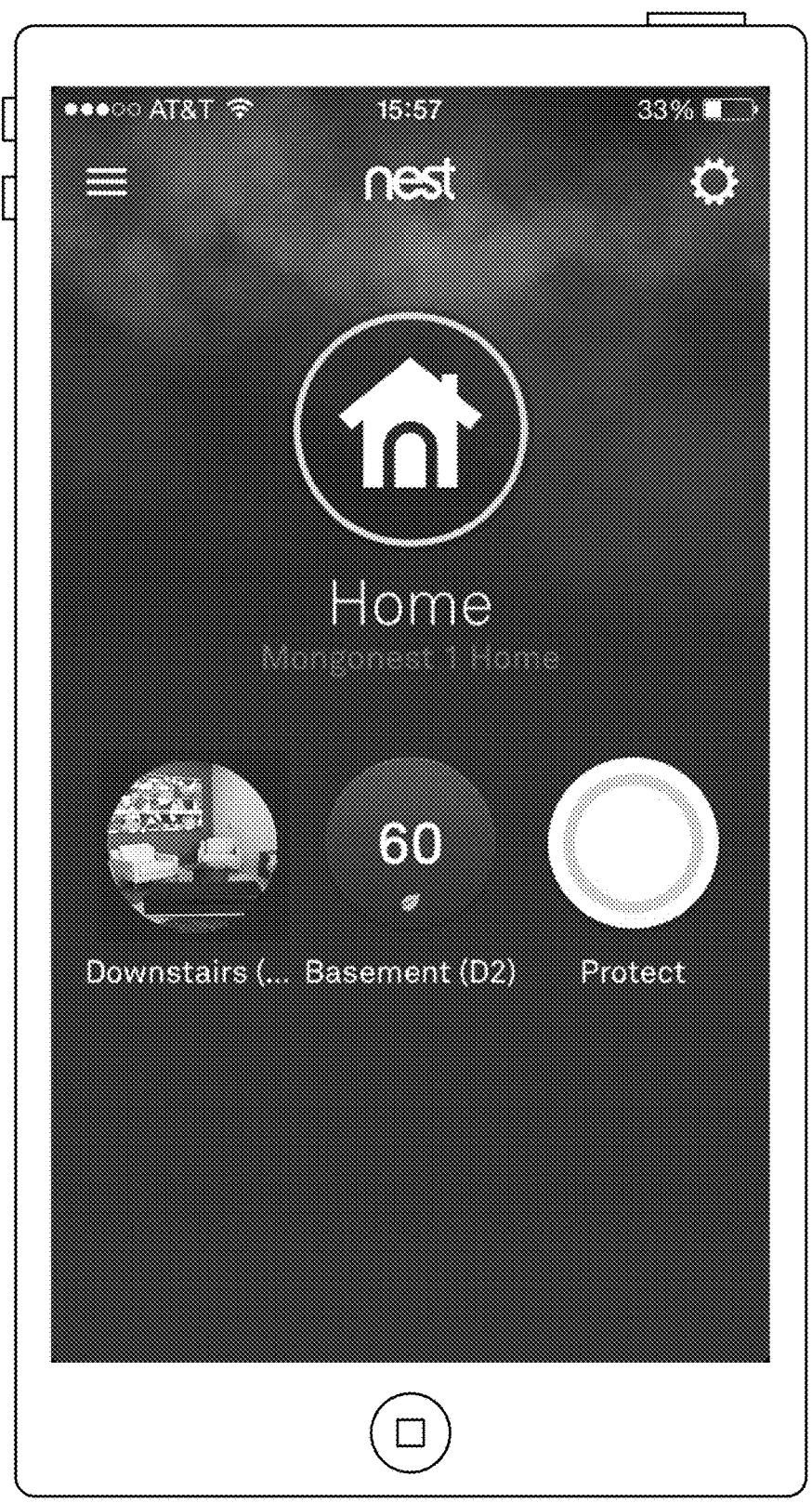
FIGS. 13A-13G illustrate example user interfaces on a client device for presenting smart home information in accordance with some implementations.
Figure 13B:
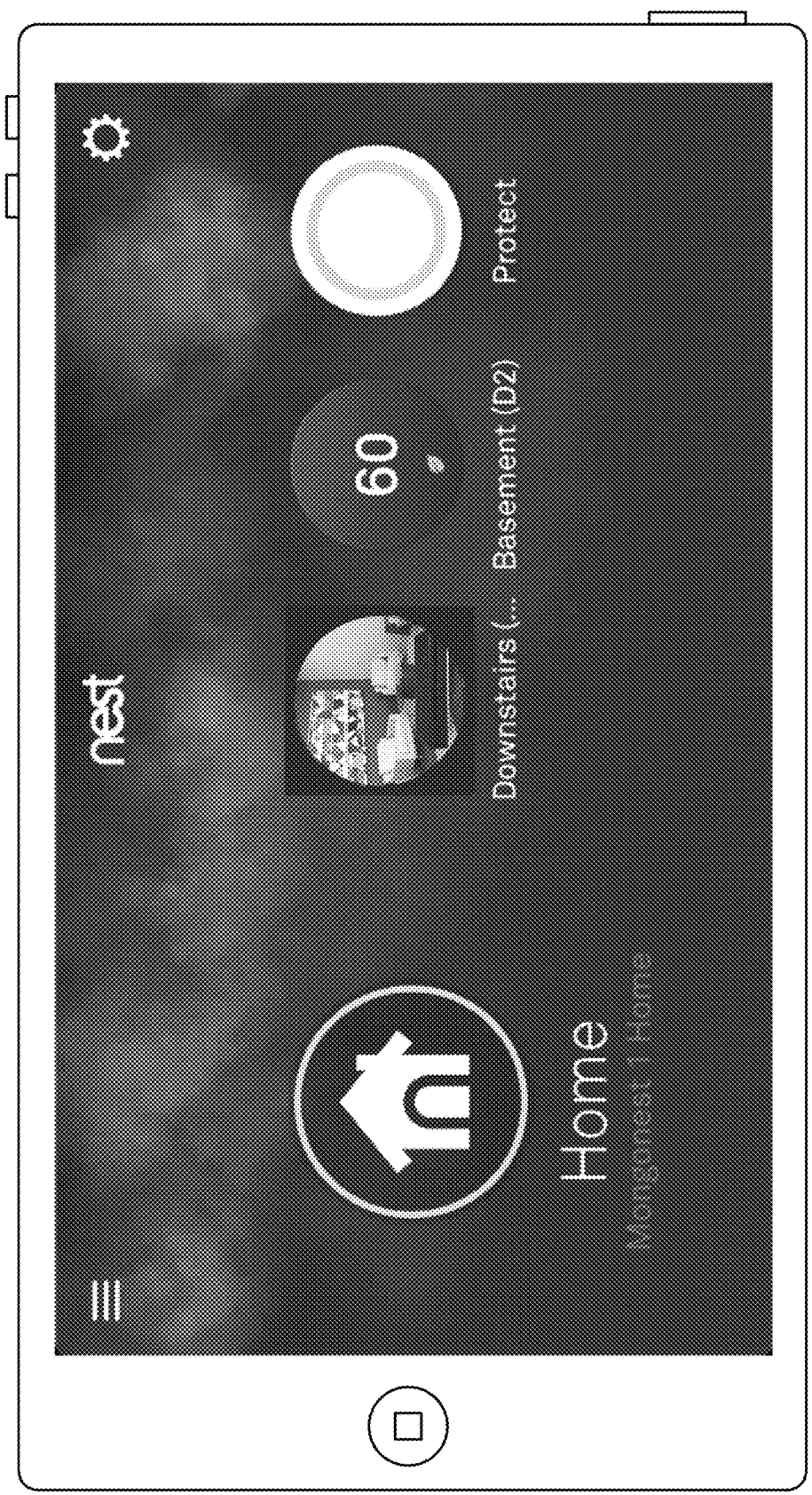

FIG. 13A shows a home page user interface analogous to user interface 1104 (FIG. 11A). The home page user interface in FIG. 13A includes a user interface element (the circular element with the label "Downstairs ( . . . " below) analogous to camera objects 1116; a video feed from a camera labeled "Downstairs (Q1)" is displayed with cropping in the user interface element. FIG. 13B shows the home page user interface in landscape orientation (the user interface as shown in FIG. 13A is oriented in portrait orientation).

A user may activate the user interface element (e.g., by performing a single tap gesture on it). For example, to access a video feed user interface a user may activate the user interface object labeled "Downstairs (Q1)."

Figure 13C:
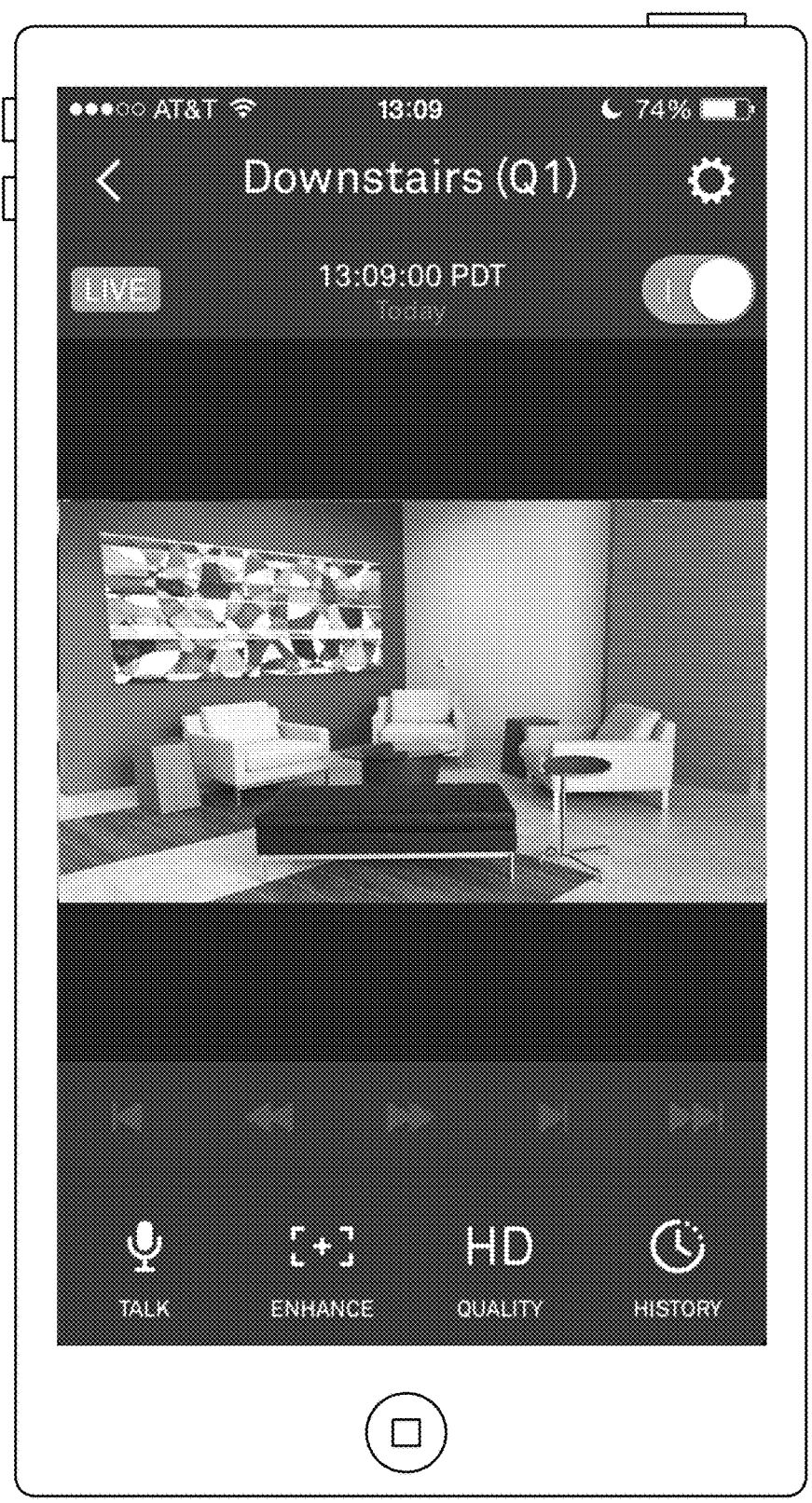
Figure 13D:
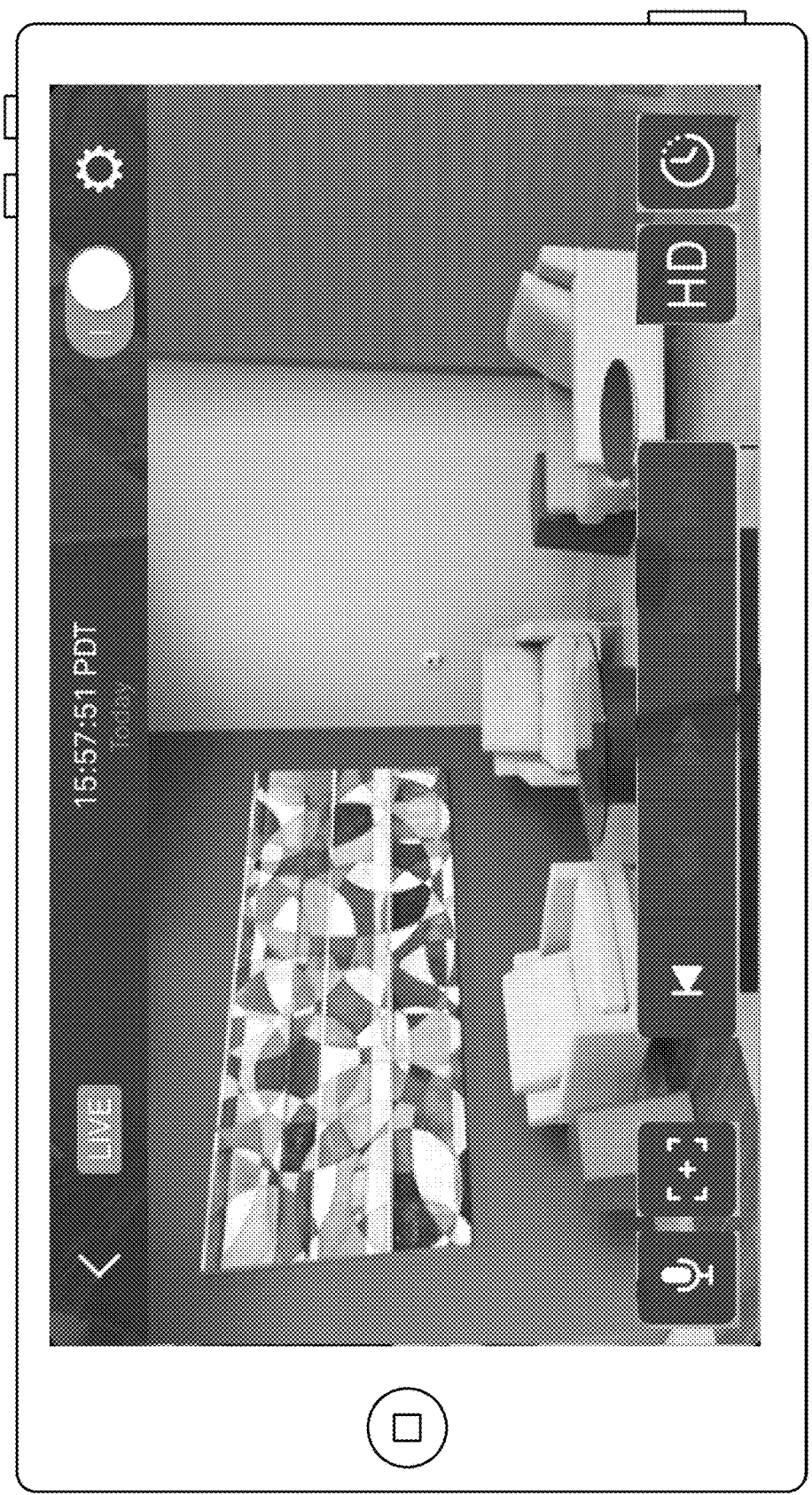

FIG. 13C shows a video feed user interface for the "Downstairs (Q1)" camera, in portrait orientation. The video feed user interface includes a label or identifier of the camera whose video feed is being shown; a date and time of the video being shown; a live feed indicator; a camera on/off switch, the video feed from the camera; and various controls and affordances, including an affordance to jump to a video corresponding to the next camera event chronologically (e.g., "Next Video," "Next Event"), an affordance to jump to a video corresponding to the previous camera event chronologically (e.g., "Previous Video," "Previous Event"), and a history affordance. FIG. 13D shows the video feed user interface in landscape orientation. In landscape orientation, the affordances and controls may be hidden by default and displayed when the user performs a gesture (e.g., a single tap gesture) on the displayed (playing or paused) video feed. A user may activate the history affordance to access a camera history user interface for the "Downstairs (Q1)" camera.

Figure 13E:
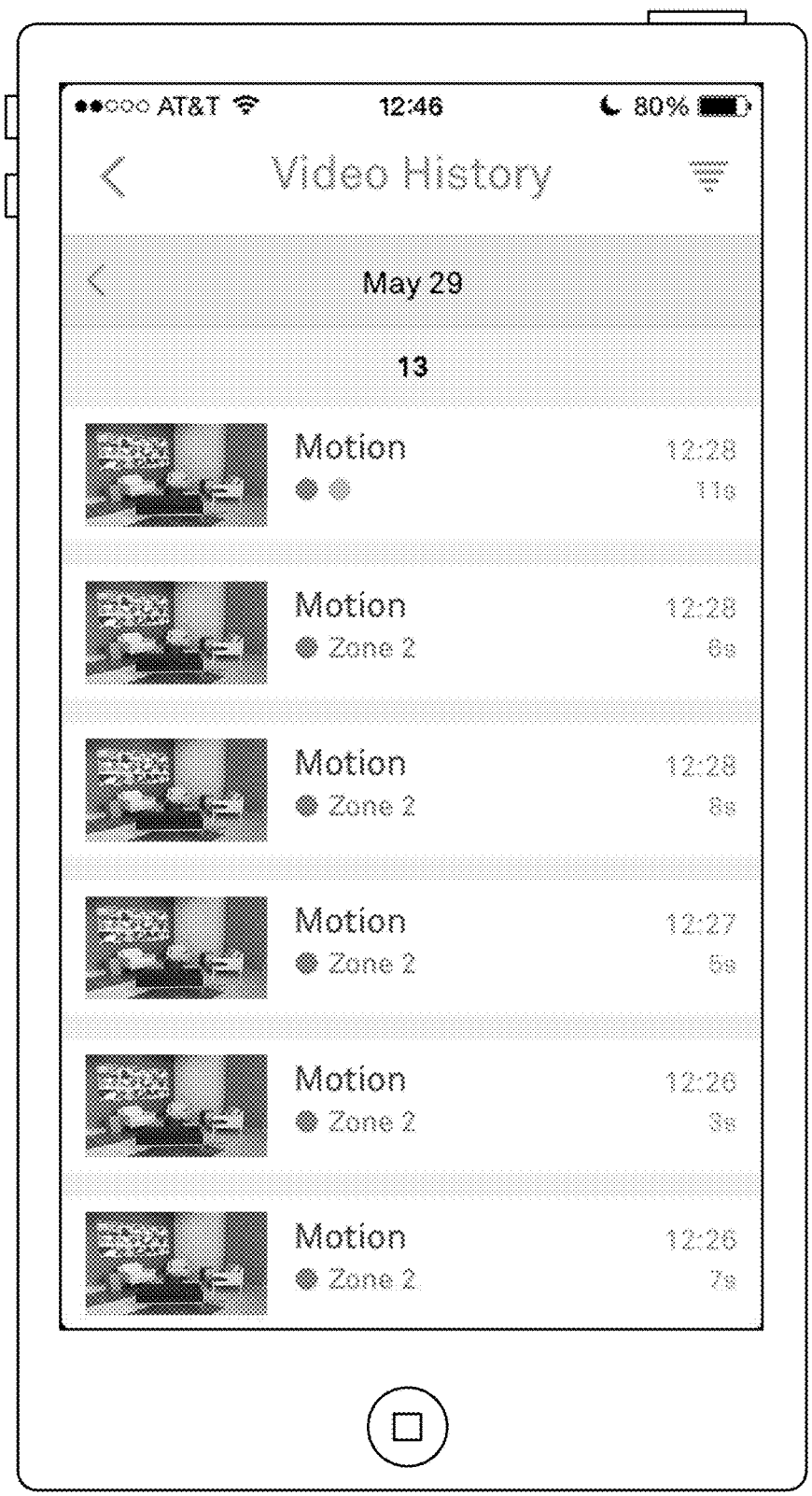

FIG. 13E shows a camera history user interface for the "Downstairs (Q1)" camera. The camera history user interface includes a scrollable list of camera events. Each camera event includes a time and duration of the camera event, a thumbnail of an associated video (where the thumbnail may be a still image of a frame from the video, periodically refreshed frames from the video, or the video itself playing at the thumbnail size), a label indicating an alert event type associated with the camera event (e.g., the primary or preeminent or dominant or longest or most recent alert event type for the camera event), and indicators (e.g., respective icons and corresponding labels or identifiers) of alert event types associated with the camera event. The indicators, in FIG. 13E, are distinct by color (e.g., the color for "Zone 2" is different for the color for "Zone 1"). Additionally, the indicators are chronologically ordered based on the times of occurrence for those alert event types or zones of interest.

The scrollable list may be filtered to show just camera events that satisfy particular filtering criteria (e.g., camera events that have particular alert event types). In some implementations, a filtering menu is used to select particular alert event types and zones of interest for filtering.

Figure 13F:
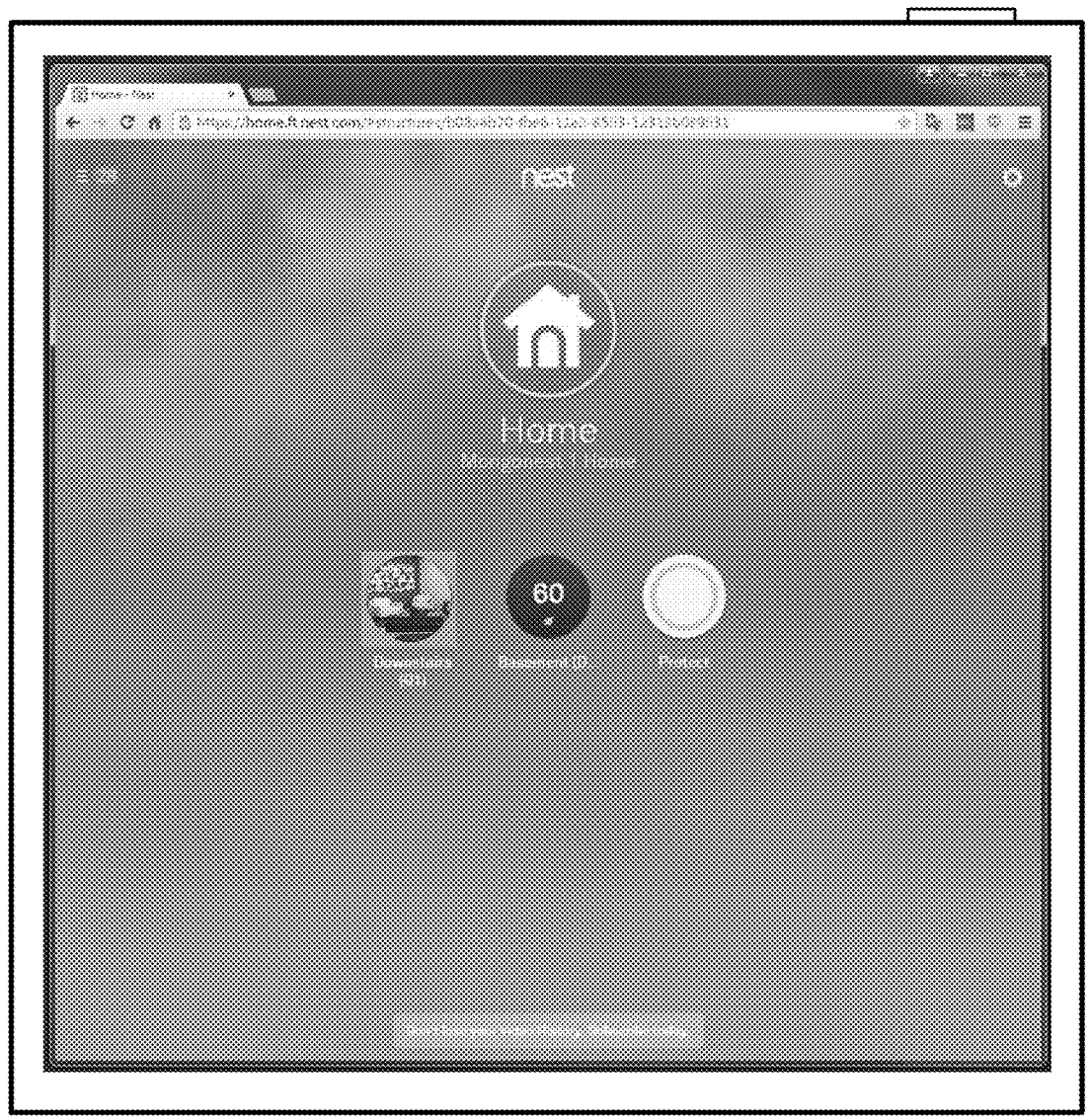

FIG. 13F shows a home page user interface analogous to user interface 1104 (FIG. 11A). The home page user interface in FIG. 13F includes a user interface element (the circular element with the label "Downstairs (Q1)" below) analogous to camera objects 1116; a video feed from a camera labeled "Downstairs (Q1)" is displayed with cropping in the user interface element. A user may activate the user interface element (e.g., by clicking on the user interface element) to access a video feed user interface analogous to user interface 1204 (FIG. 12) for the "Downstairs (Q1)" camera.

Figure 13G:
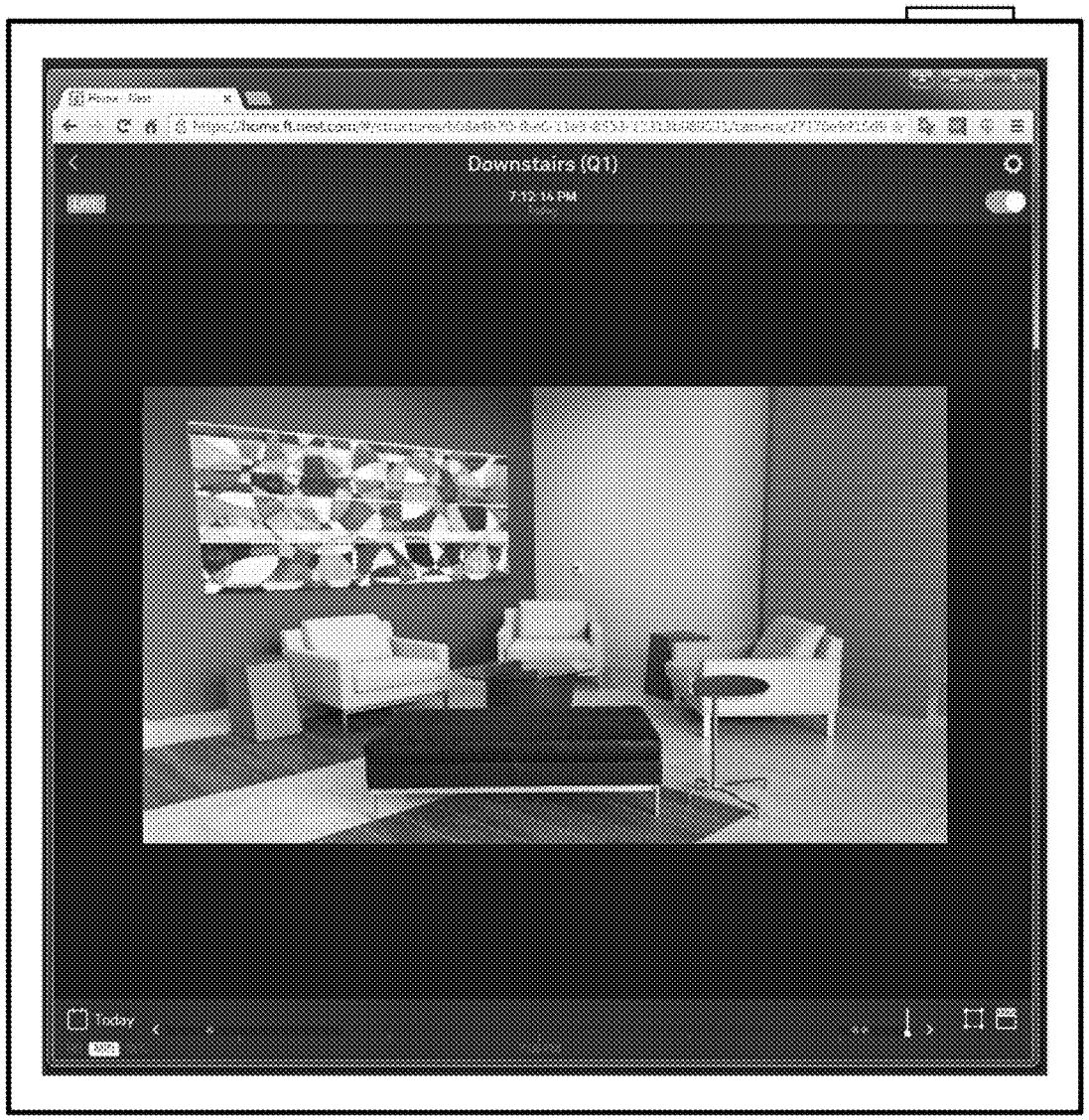

FIG. 13G shows a video feed user interface for the "Downstairs (Q1)" camera. The video feed user interface includes a label or identifier of the camera whose video feed is being shown; a date and time of the video being shown; a live feed indicator; a camera on/off switch, the video feed from the camera; various affordances, including an affordance to select a date, an affordance to access a zone filtering/editing menu (analogous to affordance 1229, FIG. 12), a timeline, and affordance(s) to change the time interval scaling in the timeline. FIG. 13G shows the timeline at the minutes scale. In some implementations, the timeline is displayed in a different scale, such as a seconds scale or an hours scale. In some implementations, a camera event is displayed on the timeline as a bar or a dot in accordance with its duration and the scale of the timeline. In some implementations, the length of the bar/dot indicates the duration of the camera event; a camera event of sufficient duration "stretches" the dot into a bar in accordance with the time scale of the timeline.

In some implementations, additional controls and affordances are displayed when a mouse pointer is hovered over the video. The additional controls and affordances include, for example zooming controls, a pause button, buttons to jump forward or backward by a predefined amount of time, a button to jump to the current live video feed, a volume control, and a button to expand the video to full-screen. In some implementations, the controls and affordances include, in addition to or in lieu of the buttons to jump forward or backward by a predefined amount of time, a button to jump forward to a video corresponding to the next camera event chronologically (e.g., "Next Video," "Next Event") and/or a button jump backward to a video corresponding to the previous camera event chronologically (e.g., "Previous Video," "Previous Event").

In some implementations, a zone filtering/editing menu is displayed in response to activation of the affordance to access the zone filtering/editing menu. The user may select or deselect the listed zones and alert event types to filter by the selected zones and alert event types. In some implementations, in the zone filtering/editing menu, there are also options to edit an existing user-defined zone of interest (e.g., "Zone 1" listed in the zone filtering/editing menu) and/or an option to create a new user-defined zone of interest. In some implementations, the zones are displayed as bounded areas with respective boundaries and boundary handles. In some implementations, the zones are displayed so that the user may select the zone to be edited by clicking on the displayed zone. If there are multiple zones of interest, in some implementations, they are displayed with different colors (e.g., one zone, and its corresponding boundary, handles, and area, is displayed in yellow; another zone is displayed in blue; and so on).

Figure 14A:
FIGS. 14A-14AA illustrate example user interfaces on a client device for presenting smart home information in accordance with some implementations.

FIGS. 14A-14AA illustrate example user interfaces on a client device for presenting smart home information in accordance with some implementations. FIG. 14A shows a user interface analogous to user interface 1149 (FIG. 11B) on a client device 504 with a touch screen 1102. The user interface in FIG. 14A includes a menu object (analogous to menu object 1106), a settings object (analogous to settings object 1108), and a mode icon 1109 and corresponding label 1110. The user interface in FIG. 14A further shows a first section 1401 labeled "Living Room" corresponding to a first space in the smart home environment. The first section 1401 includes a video feed 1403 from a camera assigned to the first space as well as a thermostat object 1405 (analogous to thermostat object 1112), and a "Protect" object 1407 (analogous to "Protect" object 1114). The user interface in FIG. 14A also shows a second section 1409 labeled "Master Bedroom" corresponding to a second space in the smart home environment. In some implementations, each user interface object includes a corresponding label. In some implementations, the user interface includes a displayed label for each user interface object, such as thermostat object 1405. For example, thermostat object 1405 is displayed with a label "Living Room Thermo." In some implementations, the displayed label is displayed below the corresponding user interface object (e.g., as shown in FIG. 11B with thermostat object 1112 and label 1113).

Figure 14B:
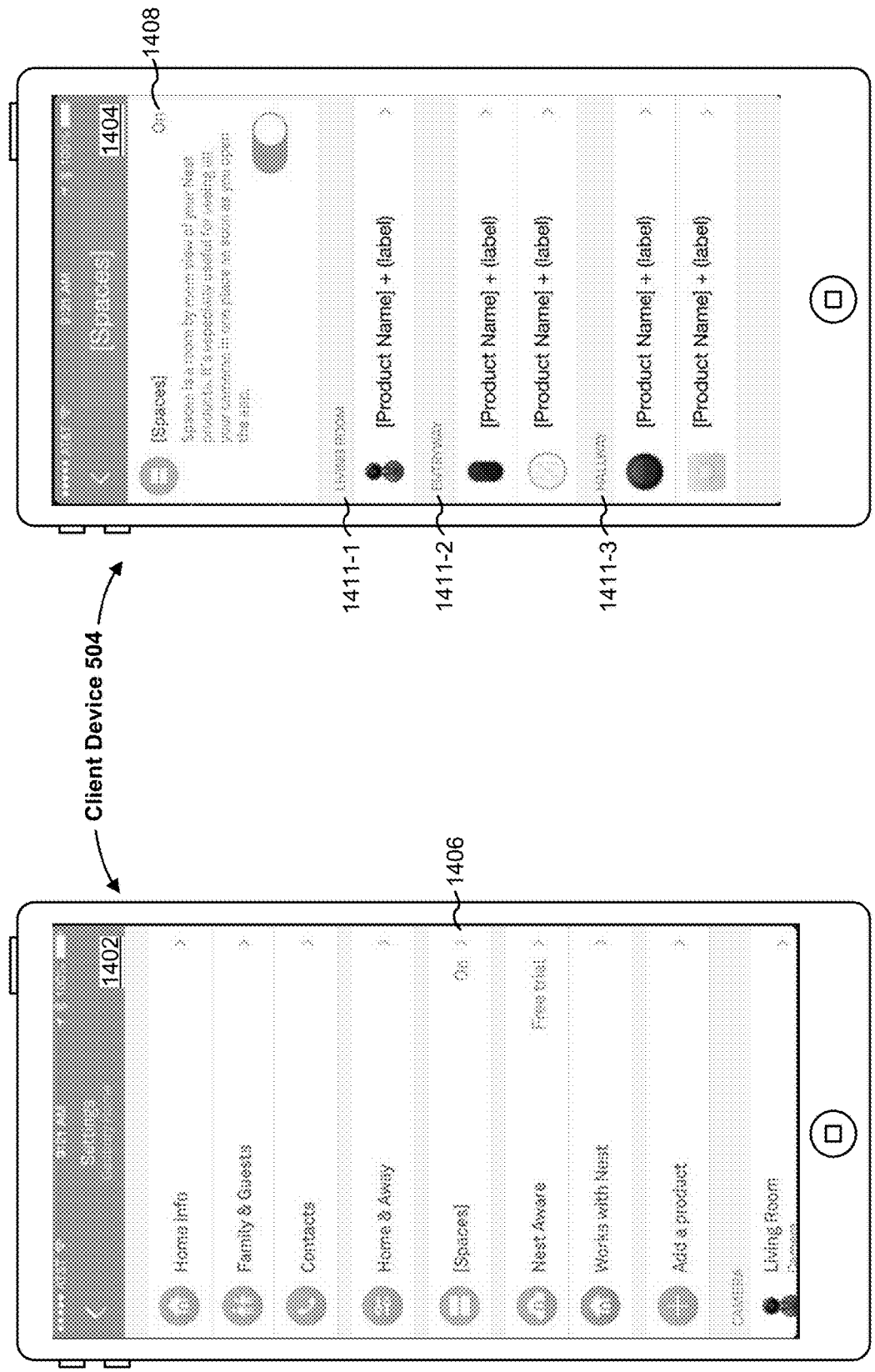

FIG. 14B shows example user interfaces for adjusting settings in a smart home application in accordance with some implementations. User interface 1402 has a plurality of option menus, including spaces option 1406. In some implementations, in response to selection of spaces option 1406, user interface 1404 is displayed. In some implementations, user interface 1404 includes indicator 1408 indicating whether a spaces setting is enabled. When the spaces setting is enabled the smart home application groups devices by location within a smart home environment. For example, user interface 1404 shows a "Living Room" space 1411-1 including a camera device; an "entryway" space 1411-2 including two devices; and a "Hallway" space 1411-3 including two devices. In some implementations, user interface 1404 displays a product name for each smart device in the list, but does not display a label. In some implementations, user interface 1404 displays a label for each smart device in the list, but not the product name. In some implementations, whether or not the product name and/or label is displayed is based on one or more user preferences.

Figure 14C:
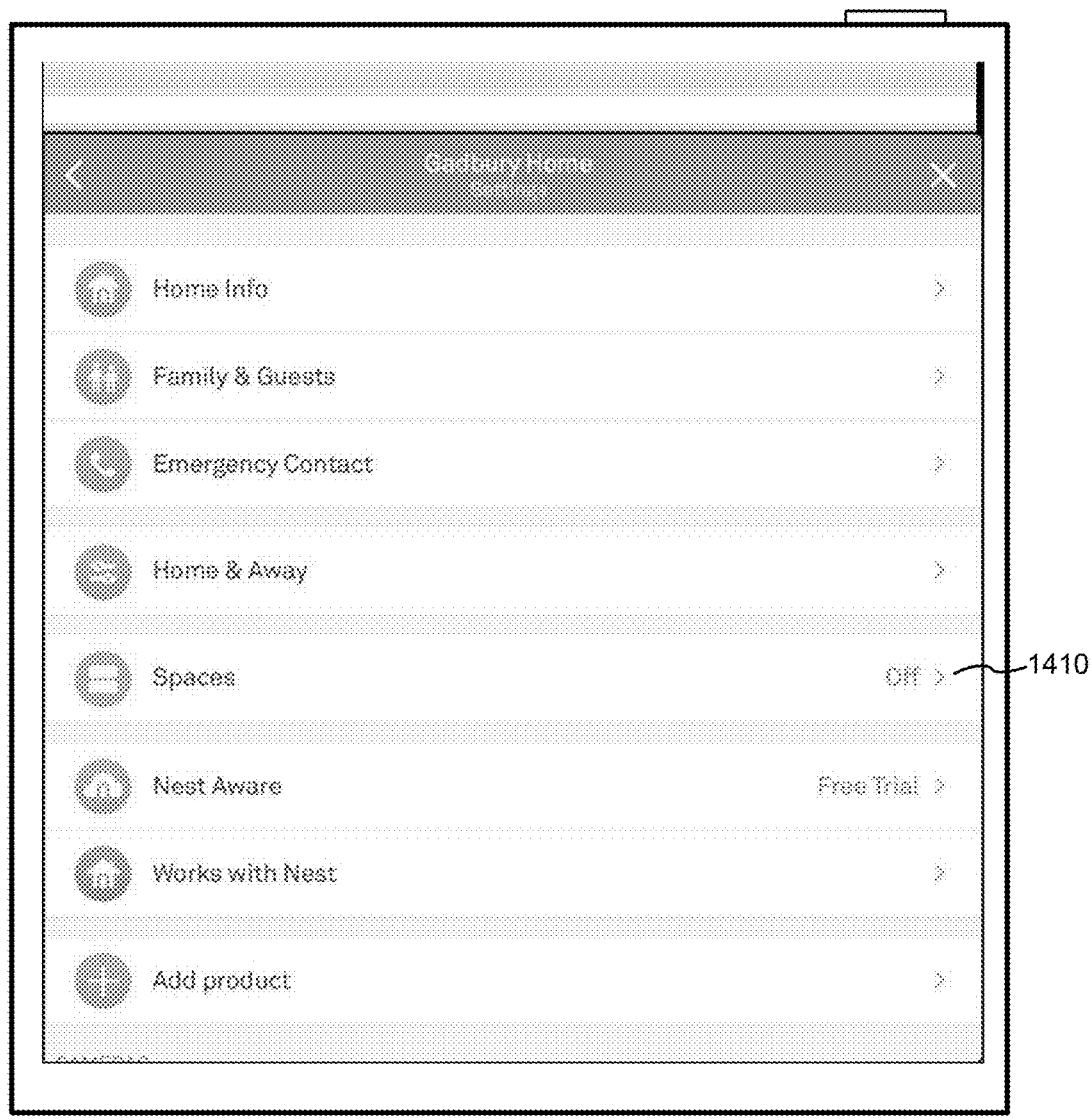
Figure 14D:
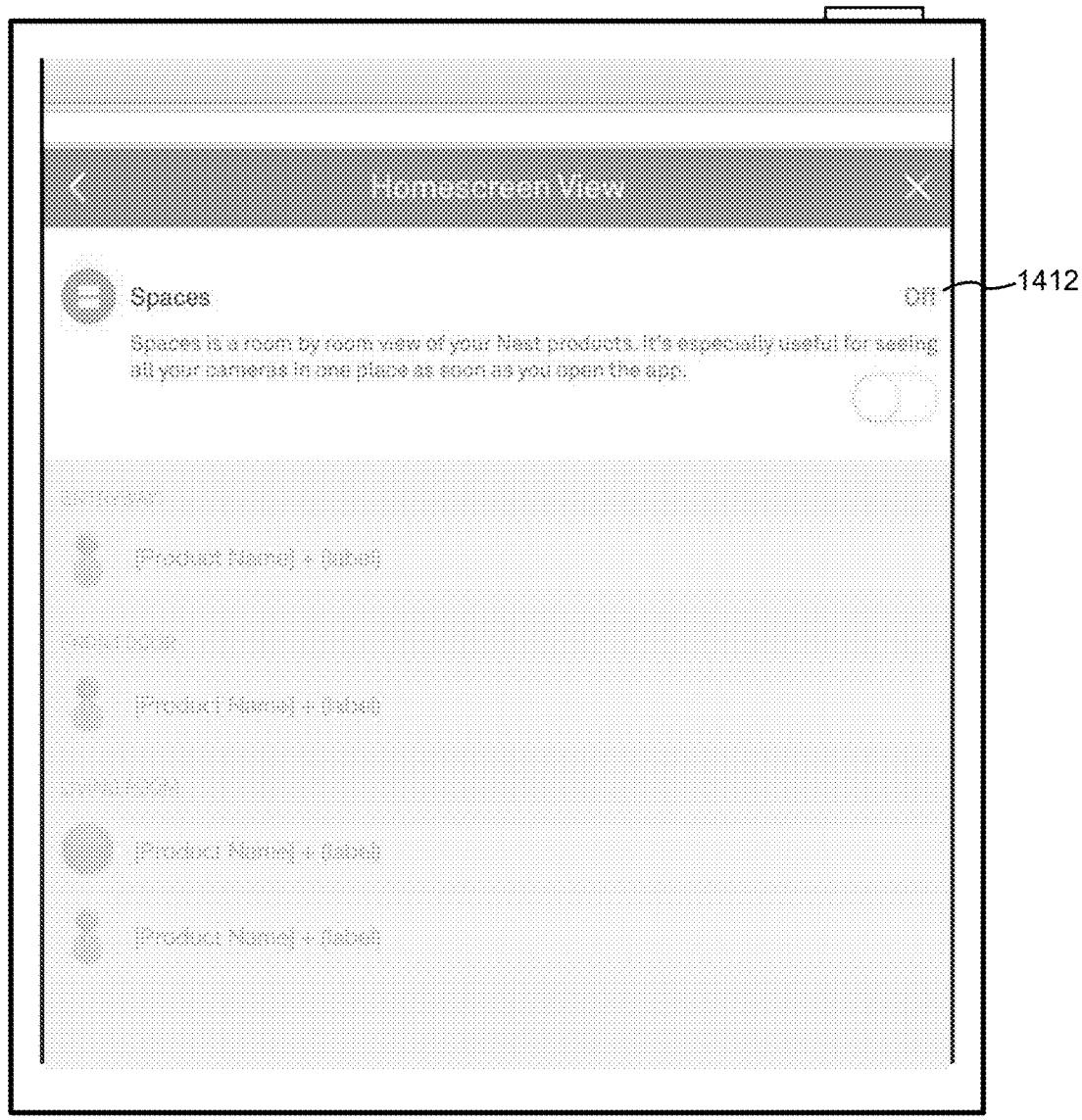
Figure 14E:
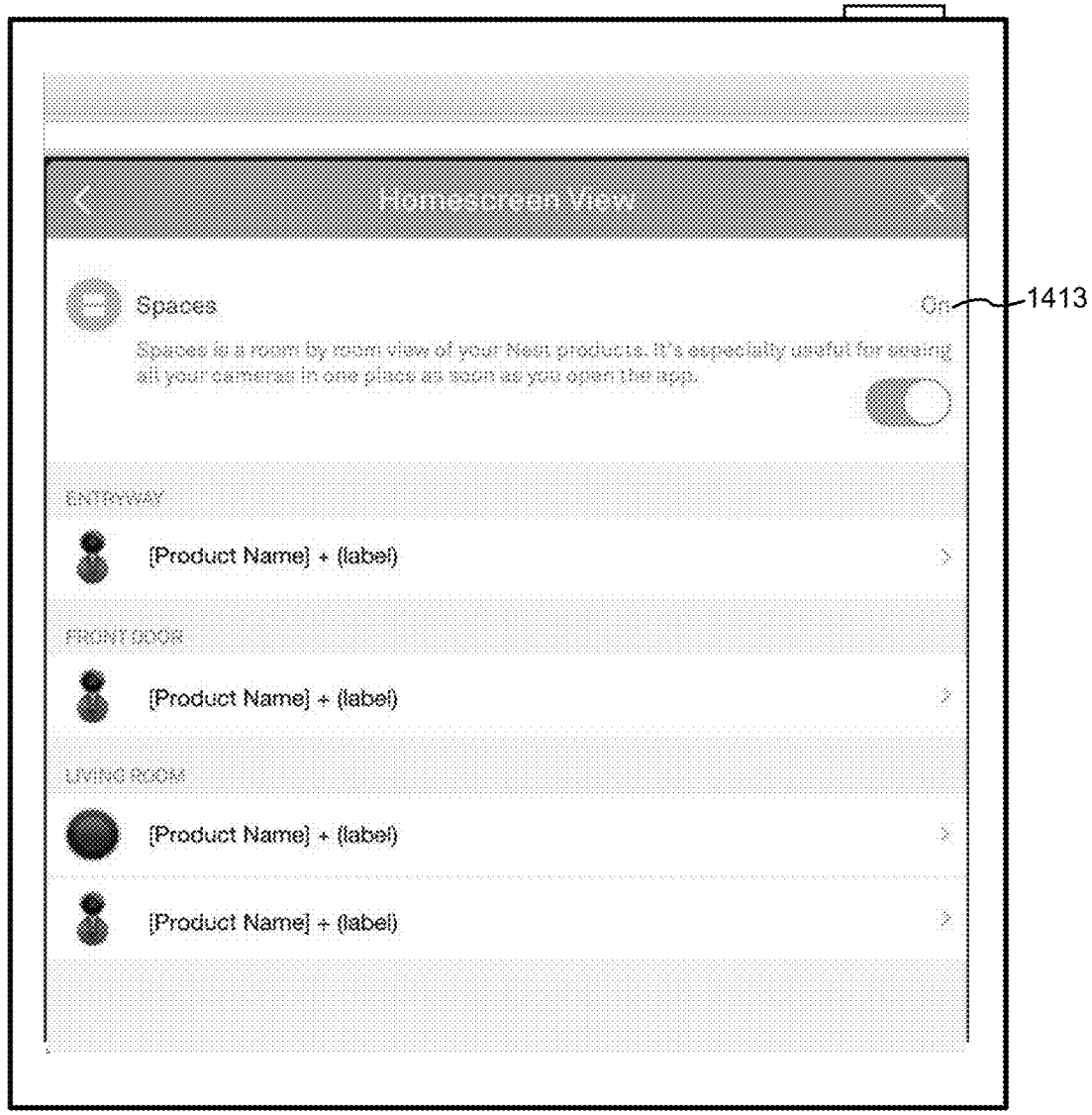
Figure 14F:
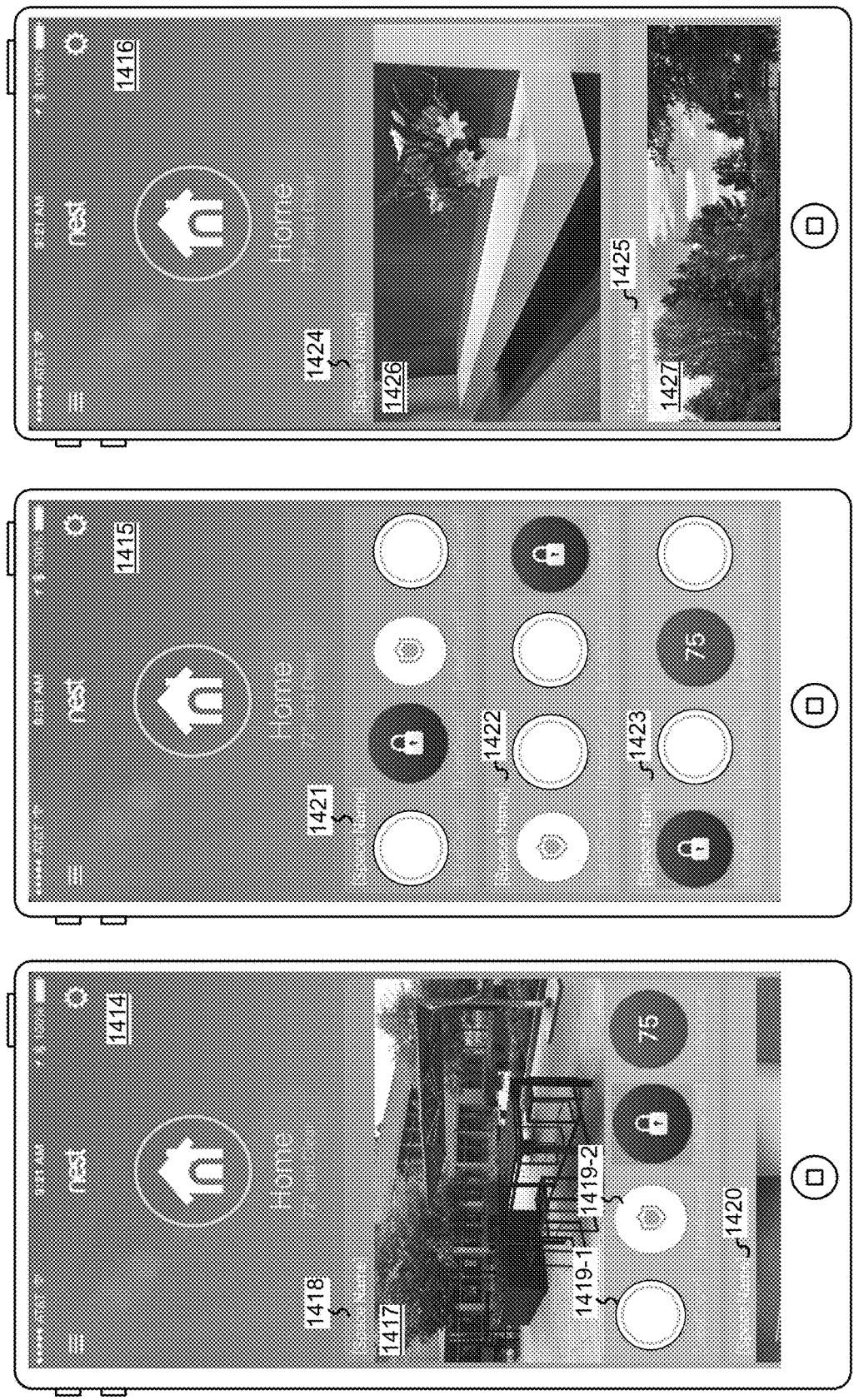

FIG. 14C shows another user interface for adjusting settings in a smart home application in accordance with some implementations. The user interface in FIG. 14C shows a plurality of option menus, including spaces option 1410. In some implementations, spaces option 1410 is displayed without text indicating whether the setting is on or off. In some implementations, in response to selection of spaces option 1410, the user interface in FIG. 14D is displayed. In some implementations, the user interface in FIG. 14D includes indicator 1412 indicating that the spaces setting is disabled. In some implementations, in response to the spaces setting being enabled (e.g., by selection of indicator 1412), the user interface in FIG. 14E is displayed. The user interface in FIG. 14E shows an "Entryway" space including a camera device; a "Front Door" space including a camera device; and a "Living Room" space including two devices. In some implementations, the user interface in FIG. 14E includes indicator 1413 indicating that the spaces setting is enabled FIG. 14F shows example user interfaces for presenting smart home information for various smart home environments in accordance with some implementations. User interface 1414 includes a first section 1418, corresponding to a first space in the smart home environment, having a video feed 1417 and a plurality of user interface objects 1419. User interface 1414 also includes a second section, corresponding to a second space in the smart home environment. Thus, the smart home environment corresponding to user interface 1414 includes the first space and the second space, where the first space has a camera and a plurality of other smart devices associated with it. User interface 1415 includes a first section 1421 corresponding to a first space in a smart home environment or dwelling, a second section 1422 corresponding to a second space, and a third section 1423 corresponding to a third space. The first section 1421 includes a first plurality of non-camera smart devices. The second section 1422 includes a second plurality of non-camera smart devices. The third section 1423 includes a third plurality of non-camera smart devices. Thus, the smart home environment corresponding to user interface 1415 includes the first space, the second space, and the third space, where each space includes a plurality of non-camera smart devices, but no camera devices. User interface 1416 includes a first section 1424, corresponding to a first space in a smart home environment, having a video feed 1426; and a second section 1425, corresponding to a second space, having a video feed 1427. Thus, the smart home environment corresponding to user interface 1416 includes the first space and the second space, where each space includes a camera device, but no non-camera smart devices.

Figure 14G:
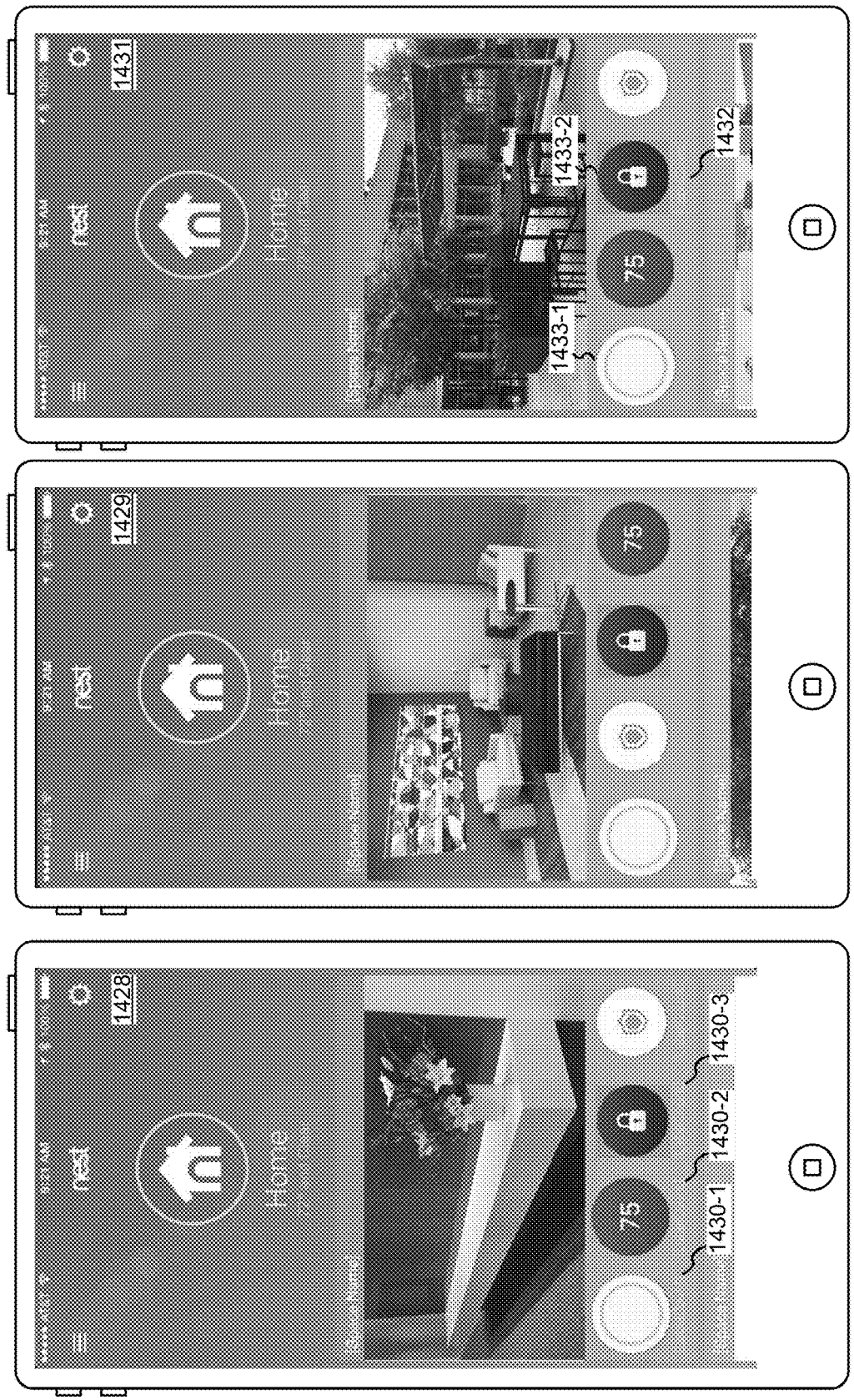

FIG. 14G shows example user interfaces for presenting smart home information for various smart home environments in accordance with some implementations. User interface 1428 includes a first section having a plurality of user interface objects with corresponding labels 1430-1, 1430-2, and 1430-3. In some implementations, labels 1430 are user-specified. In some implementations, labels 1430 are generated by the client device, the smart home application, or a server system communicatively coupled to the client device. User interface 1429 includes a first section having a plurality of user interface objects without corresponding labels. User interface 1431 includes a first section having a plurality of user interface objects 1433, including user interface object 1433-1 and user interface object 1433-2. In the example illustrated by user interface 1431, user interface object 1433-1 does not have a corresponding label whereas user interface object 1433-2 has a corresponding label 1432.

Figure 14H:
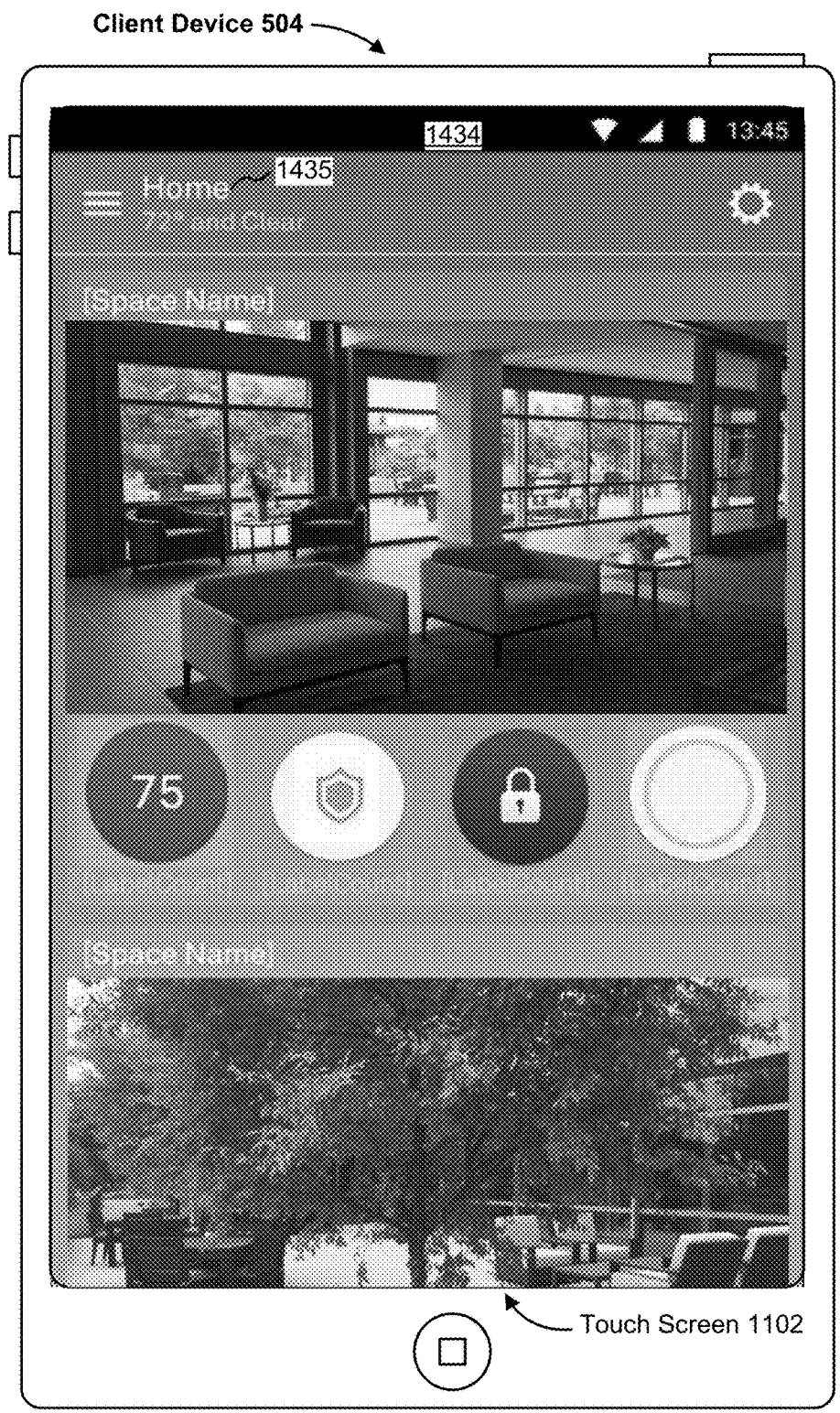

FIG. 14H shows an example user interface for presenting smart home information in accordance with some implementations. User interface 1434 includes a first section corresponding to a first space in the smart home environment and a second section corresponding to a second space. User interface 1434 further includes a navigation bar 1435. In some implementations, the navigation bar 1435 comprises a status bar and/or settings bar. In some implementations, a user interface such as user interface 1149 (FIG. 11B) is replaced by user interface 1434 in response to a user input (e.g., a user scroll gesture on touch screen 1102). In some implementations, navigation bar 1435 is visually partitioned from the first and second sections (e.g., by the green hairline shown in FIG. 14H). In some implementations, the visual partition (e.g., by the green hairline shown in FIG. 14H) indicates a state of the smart home environment. For example, a green hairline indicates no issues whereas a red hairline indicates one or more alerts are active. In some implementations, navigation bar 1435 is not visually partitioned from the first and second sections.

Figure 14I:

FIG. 14I shows example user interfaces for presenting smart home information for various smart home environments in accordance with some implementations. User interface 1436 includes a first section 1439, corresponding to a first space in the smart home environment, having a video feed 1440 and a plurality of non-camera user interface objects 1441. User interface 1436 also includes a second section 1442, corresponding to a second space in the smart home environment, having a video feed 1443 and a plurality of non-camera user interface objects. User interface 1436 further includes a navigation bar 1445. In some implementations, navigation bar 1445 includes a settings object, a menu object, and/or status information, such as home or away status. In some implementations, navigation bar 1445 comprises a settings bar and/or status bar. Thus, the smart home environment corresponding to user interface 1436 includes the first space and the second space, where both the first space and the second space have a camera and a plurality of other smart devices associated with them. User interface 1437 includes a first section 1444 corresponding to a first space in a smart home environment, a second section 1448 corresponding to a second space, and a third section 1452 corresponding to a third space. The first section 1444 includes a video feed 1446, but no non-camera user interface objects. The second section 1448 includes a second video feed 1450, but no non-camera user interface objects. The third section 1452 includes a third video feed 1454. Thus, the smart home environment corresponding to user interface 1437 includes the first space, the second space, and the third space, where each space includes a camera device, but no non-camera smart devices. User interface 1438 includes a first section 1456, corresponding to a first space in a smart home environment, having a first video feed 1458 and a second video feed 1460. User interface 1438 also includes a second section 1462, corresponding to a second space, having a video feed 1463. Thus, the smart home environment corresponding to user interface 1438 includes the first space including two camera devices, but no non-camera smart devices; and the second space including a camera device.

Figure 14J:
Figure 14K:

FIGS. 14J-14K show example user interfaces for presenting smart home information in accordance with some implementations. User interface 1465 in FIG. 14J is displayed on a client device 504 in a landscape orientation. In some implementations, a first user interface (e.g., as shown in FIG. 14A) is utilized when the client device 504 is in portrait orientation and a second user interface (e.g., as shown in FIG. 14J) is utilized when the client device 504 is in landscape orientation. User interface 1465 includes a single section 1466 having a video feed 1467 and a plurality of non-camera user interface objects. User interface 1465 also includes a navigation bar 1464. In some implementations, the navigation bar 1465 comprises a status bar and/or settings bar. Thus, the smart home environment corresponding to user interface 1465 includes only a single space with a camera device and a plurality of non-camera smart devices. User interface 1468 in FIG. 14K includes two columns with a first section 1469 in a first column and a second section 1470 in a second column. User interface 1468 also includes a navigation bar 1471. In some implementations, the navigation bar 1468 comprises a status bar and/or settings bar. Thus, the smart home environment corresponding to user interface 1468 includes both a first space and a second space with a respective camera device and plurality of non-camera smart devices.

Figure 14L:
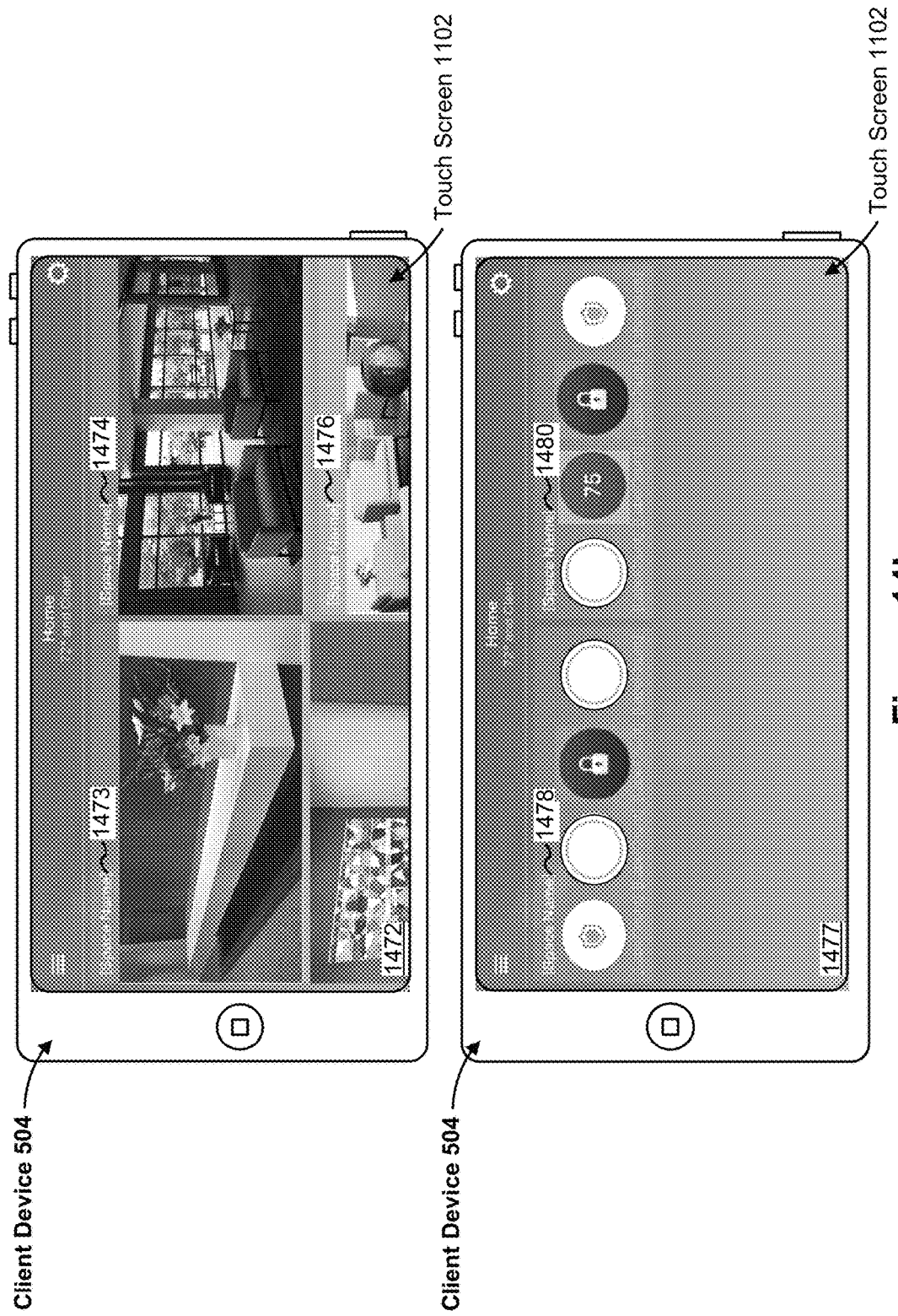

FIG. 14L shows example user interfaces for presenting smart home information for various smart home environments in accordance with some implementations. User interface 1472 includes a first section 1473 having two video feeds, a second section 1474 having one video feed, and a third section 1476. Thus, the smart home environment corresponding to user interface 1472 includes at least three spaces, where the first space includes two camera devices (but no non-camera smart devices) and the second and third spaces each include a camera device. User interface 1477 includes a first section 1478 with a plurality of non-camera user interface objects and a second section 1480 with a second plurality of non-camera user interface objects. Thus, the smart home environment corresponding to user interface 1477 includes two spaces, where both the first space and the second space include a plurality of non-camera smart devices (but no camera devices).

Figure 14M:
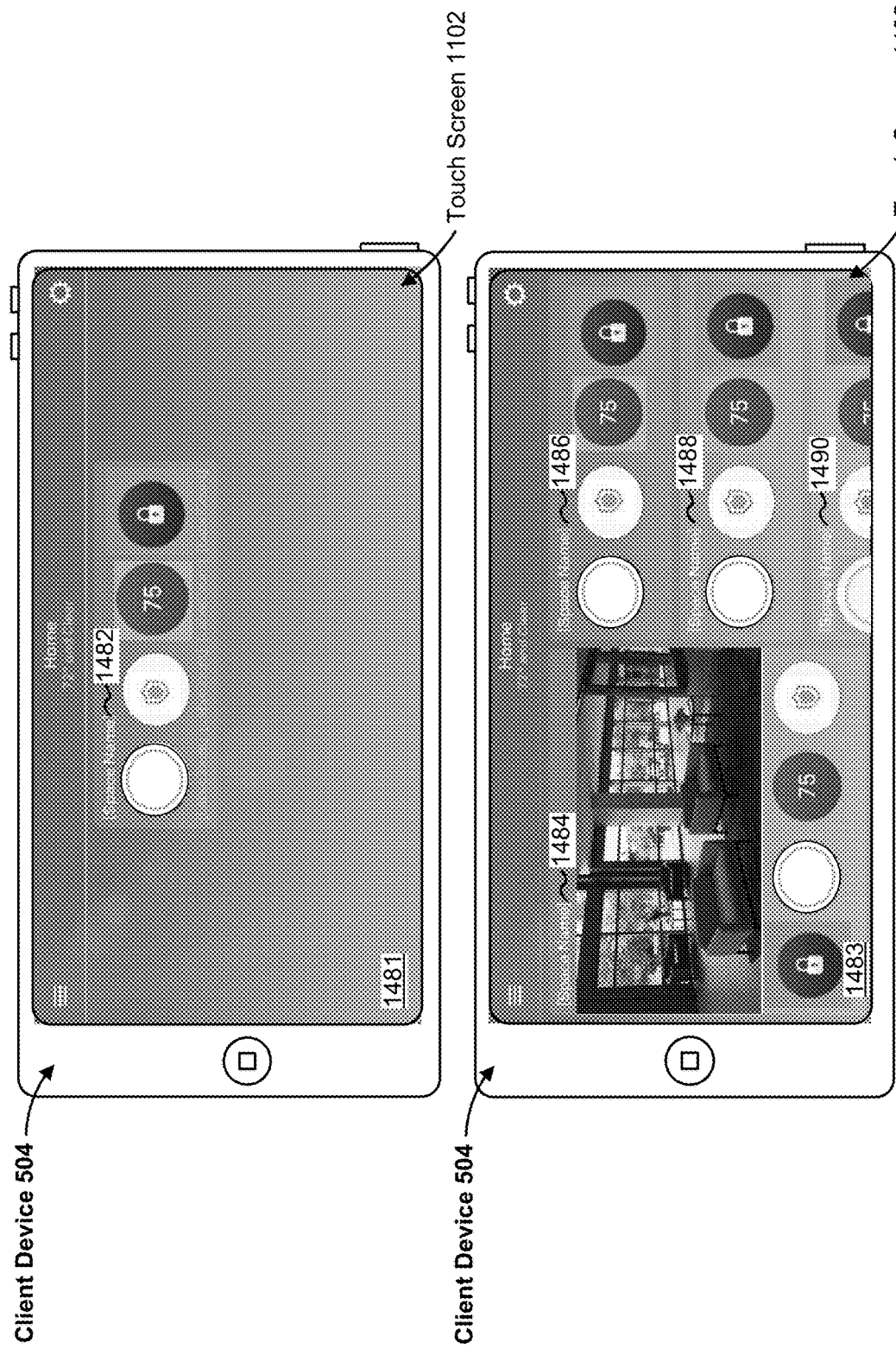

FIG. 14M shows example user interfaces for presenting smart home information for various smart home environments in accordance with some implementations. User interface 1481 is displayed on a client device 504 in a landscape orientation. User interface 1481 includes a single section 1482 centered on touch screen 1102 with a plurality of non-camera user interface objects (but no video feeds). Thus, the smart home environment corresponding to user interface 1481 includes only a single space with only a plurality of non-camera smart devices. User interface 1483 is displayed on a client device 504 in a landscape orientation. User interface 1483 includes a first section 1484 with a video feed and a plurality of non-camera user interface objects. User interface 1483 also includes a second section 1486, a third section 1488, and a fourth section 1490, each with a plurality of non-camera user interface objects. In some implementations, sections with video feeds are prioritized over (e.g., listed before) sections without video feeds. For example, section 1484 is displayed in a top position in user interface 1483. Thus, the smart home environment corresponding to user interface 1483 includes four spaces, where the first space includes a camera device and all four spaces include a plurality of non-camera smart devices.

Figure 14N:
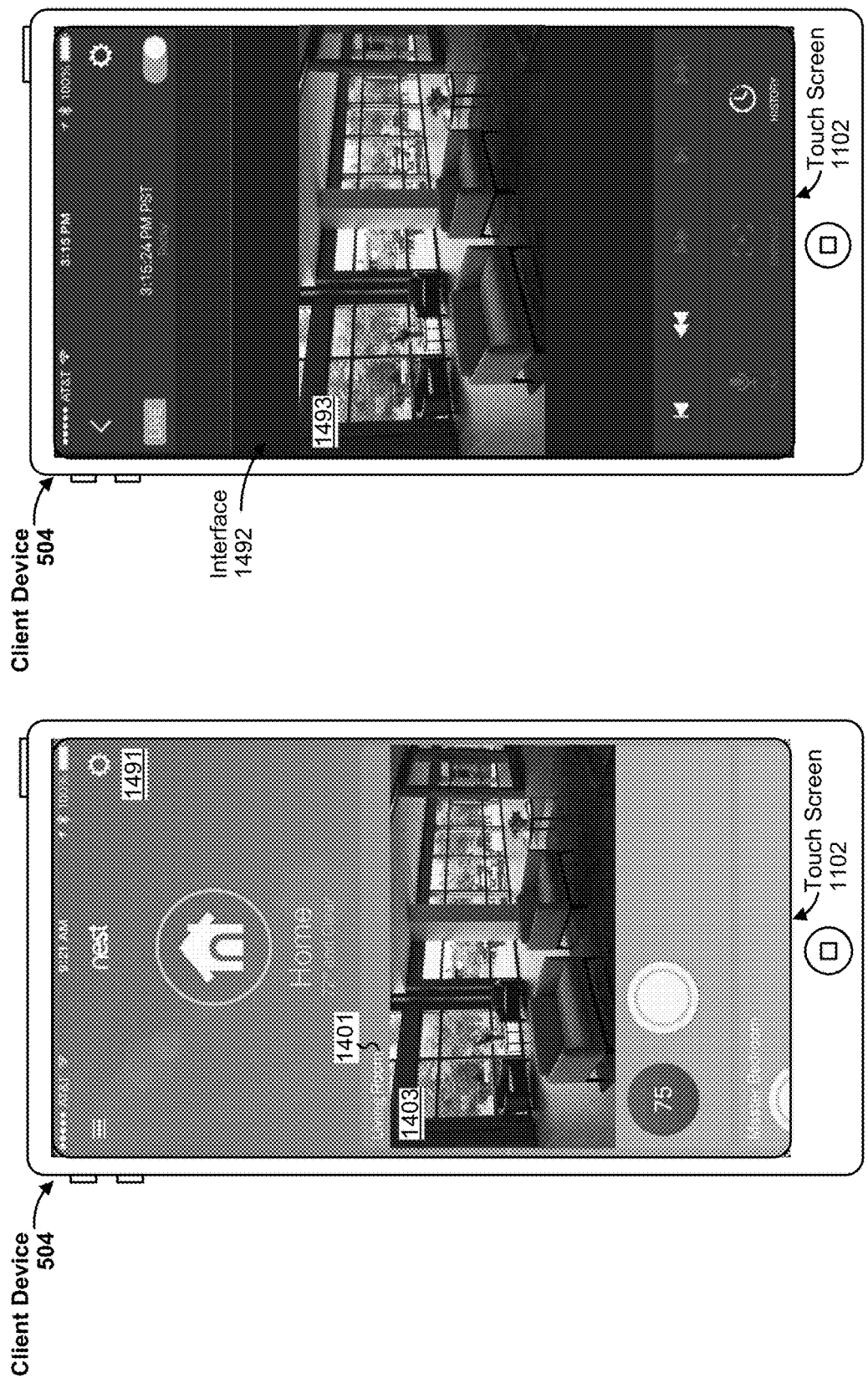

FIG. 14N shows example user interfaces for presenting smart home information in accordance with some implementations. User interface 1491 is analogous to the user interface in FIG. 14A and includes video feed 1403. User interface 1492 comprises a video feed user interface for the video feed 1403, in portrait orientation. The video feed user interface 1492 includes a date and time of the video being shown; a live feed indicator; a camera on/off switch, the video feed 1493 from the camera; and various controls and affordances analogous to those described above with respect to FIG. 12, including an affordance to jump to a video corresponding to the next camera event chronologically (e.g., "Next Video," "Next Event"), an affordance to jump to a video corresponding to the previous camera event chronologically (e.g., "Previous Video," "Previous Event"), and a history affordance. In some implementations, the user interface 1492 includes a label or identifier of the camera whose video feed is being shown. In some implementations, the user interface 1492 is displayed in response to user selection of video feed 1403 (e.g., detection of a user tap gesture on display of video feed 1403).

Figure 14O:

FIG. 14O shows example user interfaces for presenting smart home information for various smart home environments in accordance with some implementations. User interface 1494 includes a first section 1495 with a video feed and a plurality of non-camera user interface objects, including user interface object 1496. User interface object 1496 corresponds to an inactive smart device. For example, a smart device that has been disabled and/or a smart device that is not in communication with the smart home application or client device 504. User interface object 1496 in user interface 1494 is greyed-out to indicate that the corresponding smart device is inactive. In some implementations, at least one display characteristic of user interface object 1496 is adjusted based on whether or not the corresponding smart device is active. User interface 1497 includes the first section 1495 with the user interface object 1496. In user interface 1497 the label 1498 associated with user interface object 1496 is adjusted based on the smart device corresponding to user interface object 1496 being inactive. For example, the label 1498 is changed from an active label of "Right" to an inactive label of "OFFLINE."

Figure 14P:

FIG. 14P shows an example user interface for presenting smart home information in accordance with some implementations. FIG. 14P shows a user interface similar to the user interface shown in FIG. 14A, except that the user interface in FIG. 14P includes banner 1499. In some implementations, banner 1499 includes information regarding an update rate for video feed 1403. In some implementations, banner 1499 includes global notifications (e.g., notifications involving multiple sections, devices, or spaces). In some implementations, banner 1499 includes notifications not related to a particular user interface object (or smart device). In some implementations, banner 1499 is displayed in response to client device 504, a video server system (e.g., video server system 552, FIG. 5B), and/or the smart home application determining that a network connection between client device 504 and the camera corresponding to video feed 1403 does not meet one or more predetermined criteria. For example the network connection has low available bandwidth (e.g., the bandwidth is lower than a bitrate for video feed 1403) and/or high latency. In some implementations, the network connection is denoted as unsuitable for large data transfers (e.g., data transfers associated with streaming video at high resolutions such as 720p or 1080p). For example, the user of client device 504 has indicated that cellular connections are unsuitable for large data transfers (e.g., due to transfer limits and/or transfer costs).

Figure 14Q:
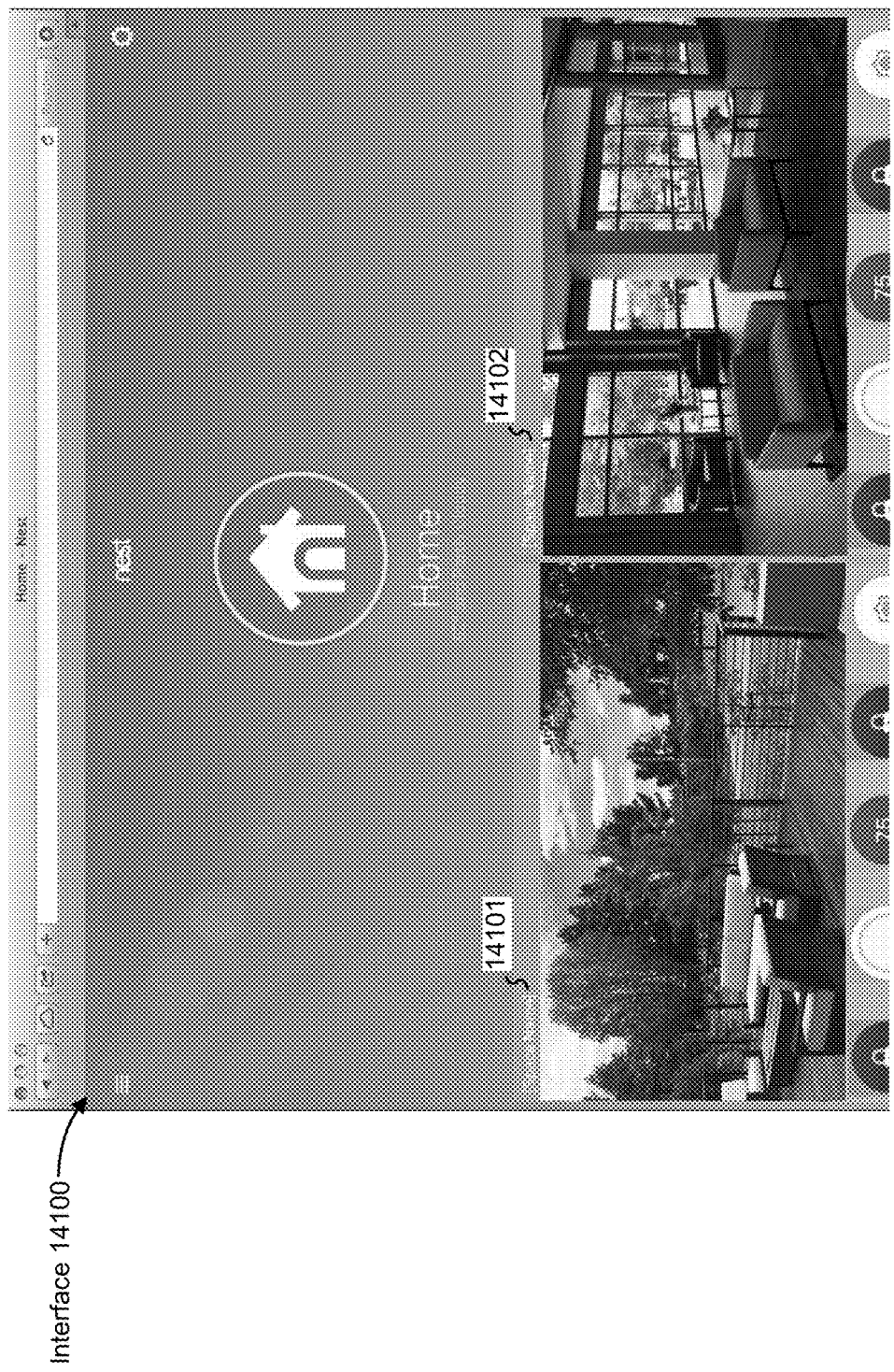

FIG. 14Q shows an example user interface for presenting smart home information in accordance with some implementations. The user interface 14100 in FIG. 14Q is analogous to the user interface in FIG. 14A. In some implementations, the user interface 14100 is displayed in a web browser (e.g., in a web browser running on a personal computer). User interface 14100 includes a first section 14101 corresponding to a first space in a smart home environment, and a second section 14102 corresponding to a second space in a smart home environment. The first section 14101 and the second section 14102 each include a video feed and a plurality of non-camera user interface objects.

Figure 14R:
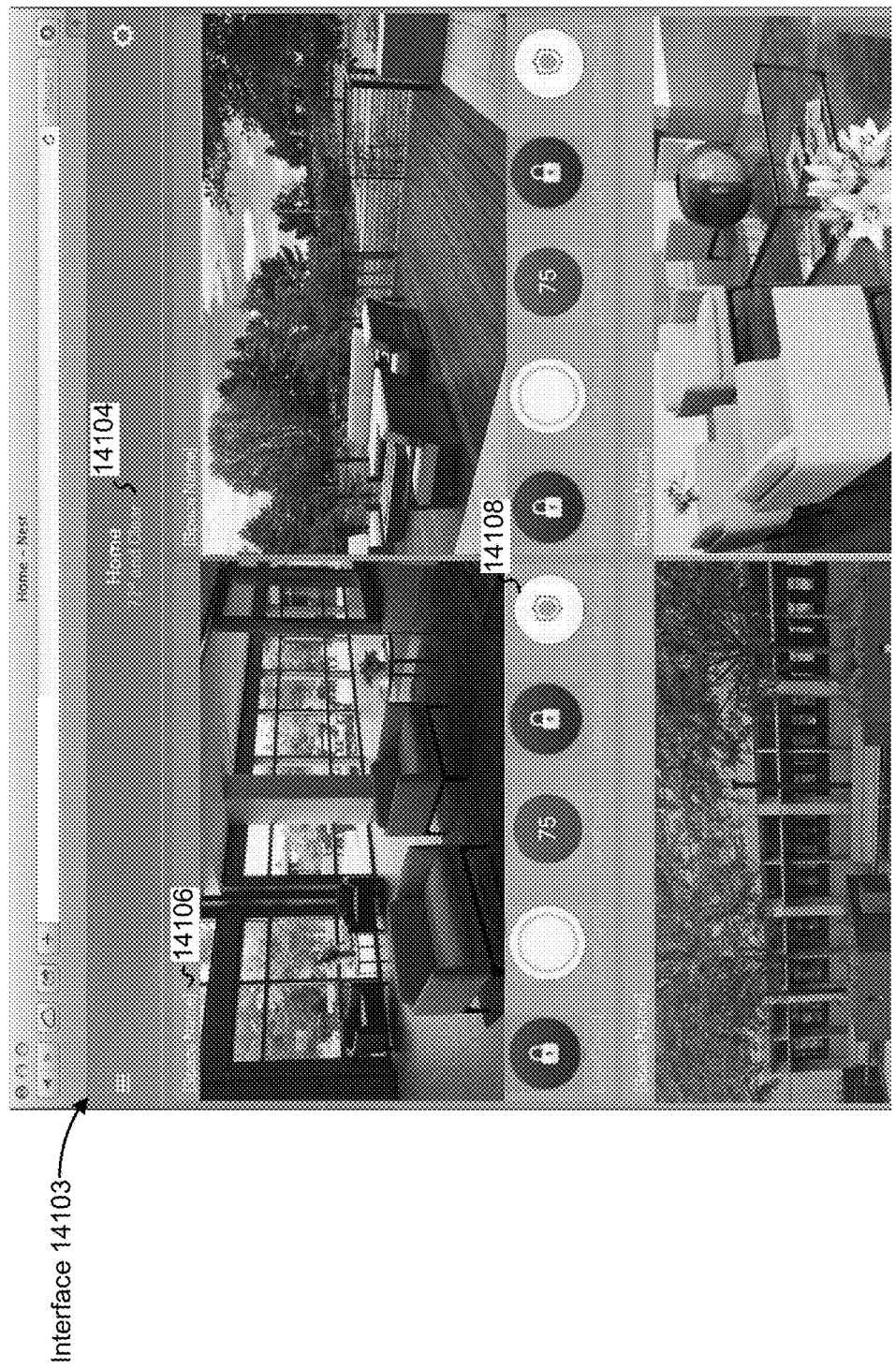
Figure 14S:
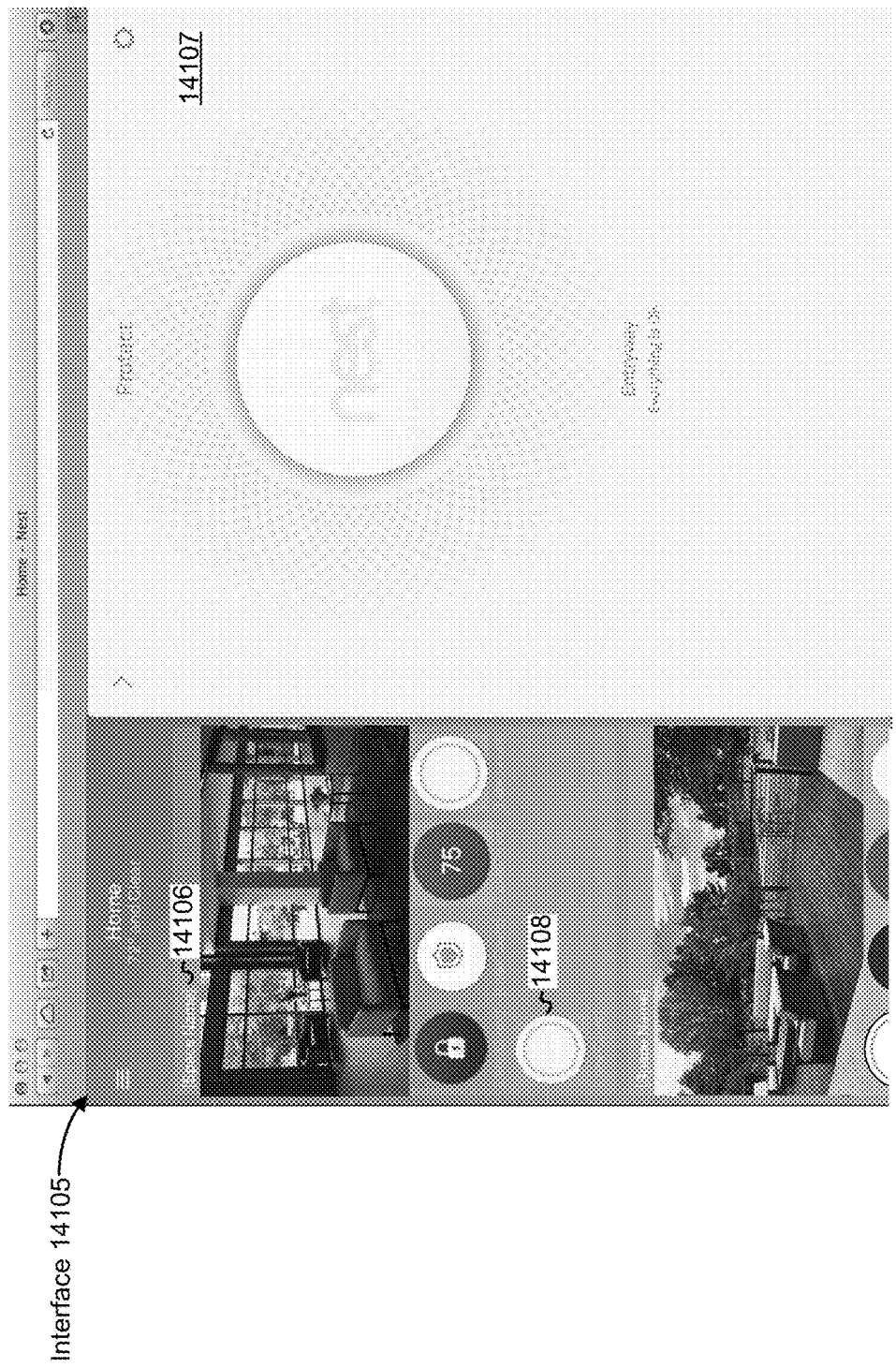

FIG. 14R shows an example user interface for presenting smart home information in accordance with some implementations. User interface 14103 in FIG. 14R includes a first section 14106 with a video feed and a plurality of user interface objects, including user interface object 14108. User interface 14103 also includes a plurality of additional sections, each with a video feed and a plurality of user interface objects. User interface 14103 also includes a navigation bar 14104, analogous to navigation bar 1435 in FIG. 14H.

FIG. 14S shows an example user interface for presenting smart home information in accordance with some implementations. User interface 14105 in FIG. 14S includes a first section 14106 and a second section, each with a video feed and a plurality of user interface objects. User interface 14105 further includes a third section 14107 for displaying information about a smart device corresponding to user interface object 14108. In some implementations, third section 14107 is displayed in response to a user selection of user interface object 14108. For example, in response to detection of a user tap gesture over the display of user interface object 14108. In some implementations, the third section 14107 is configured to cover approximately two-thirds of the display in response to selection of a non-camera user interface object. In some implementations, a third section is configured to cover approximately all of the display in response to selection of a camera user interface object, such as a video feed. In some implementations, the third section includes status information regarding the corresponding smart device (e.g., a "Protect" device). In some implementations, the third section includes one or more affordances for communicating with the smart device (e.g., toggling on/off state, adjusting operating mode, etc.).

Figure 14T:
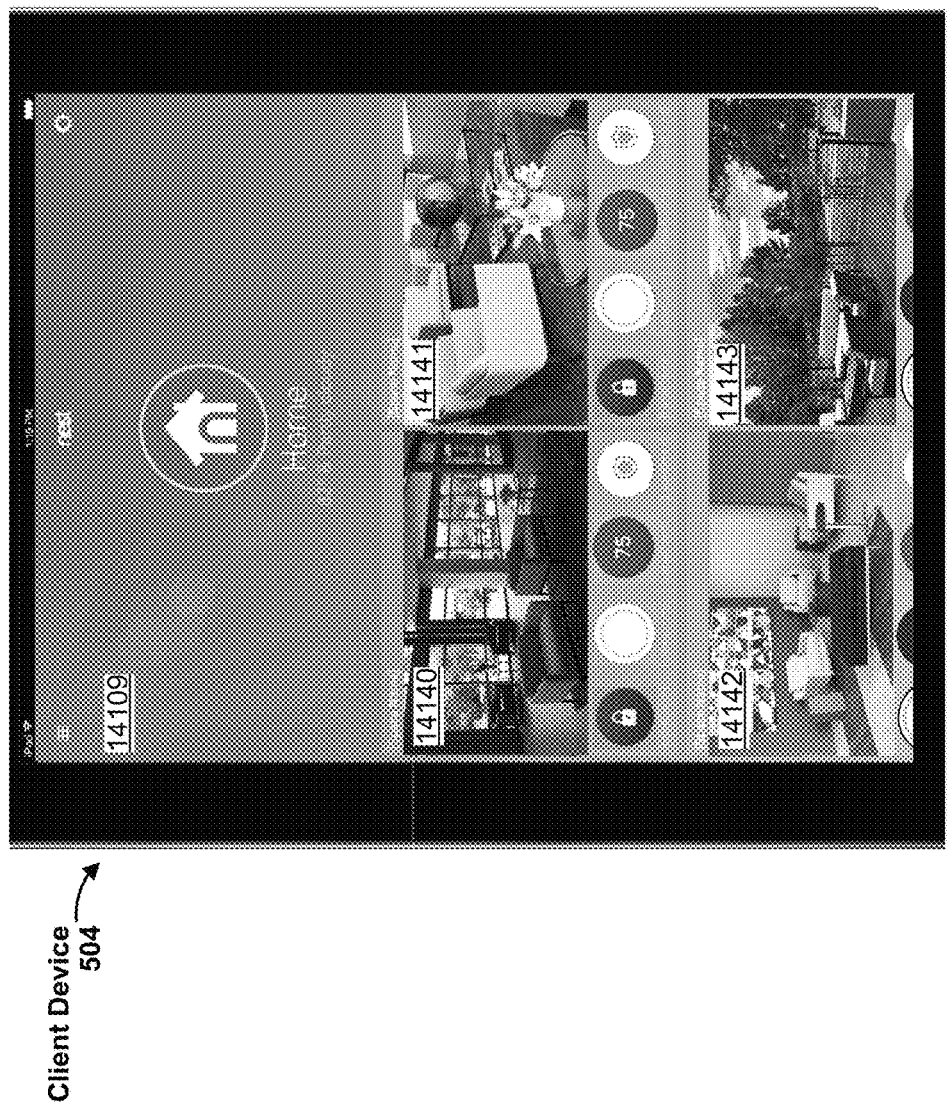
Figure 14U:
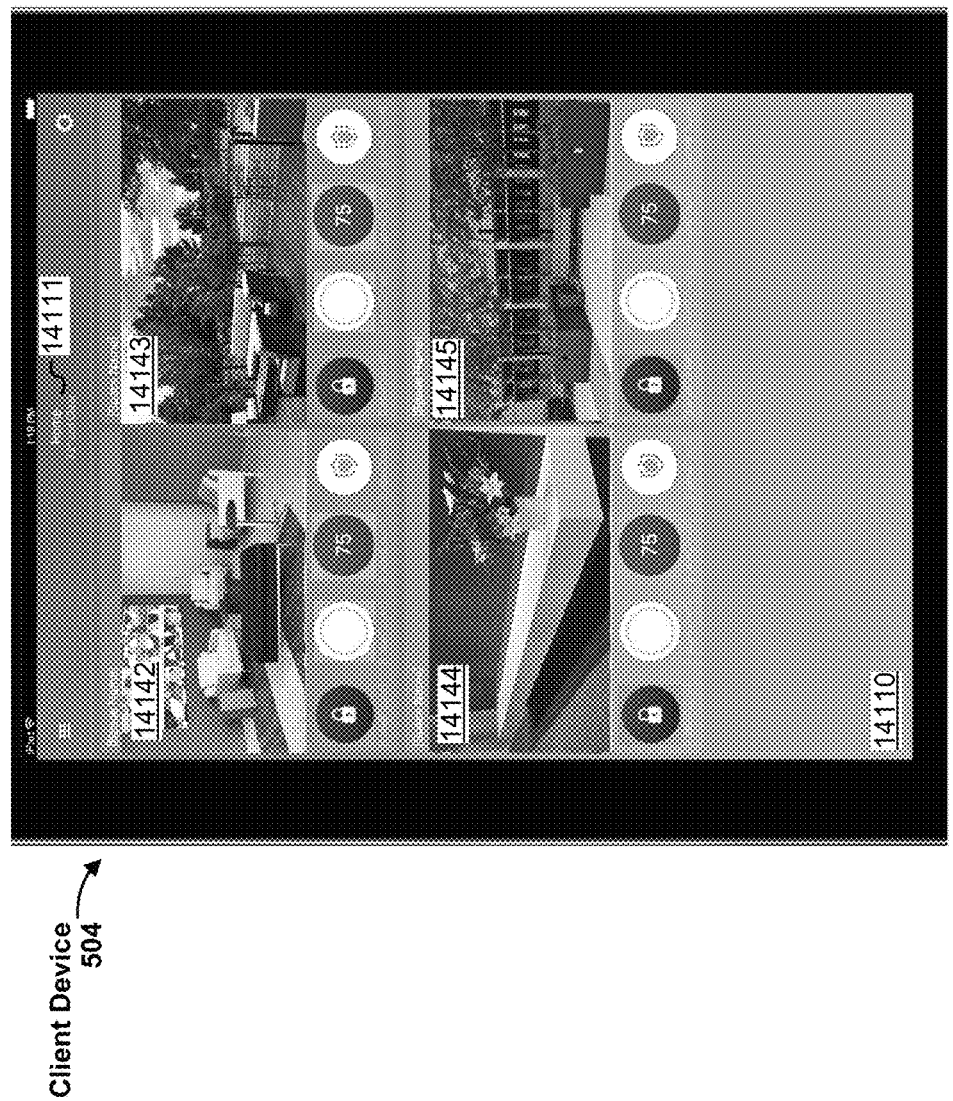
Figure 14V:
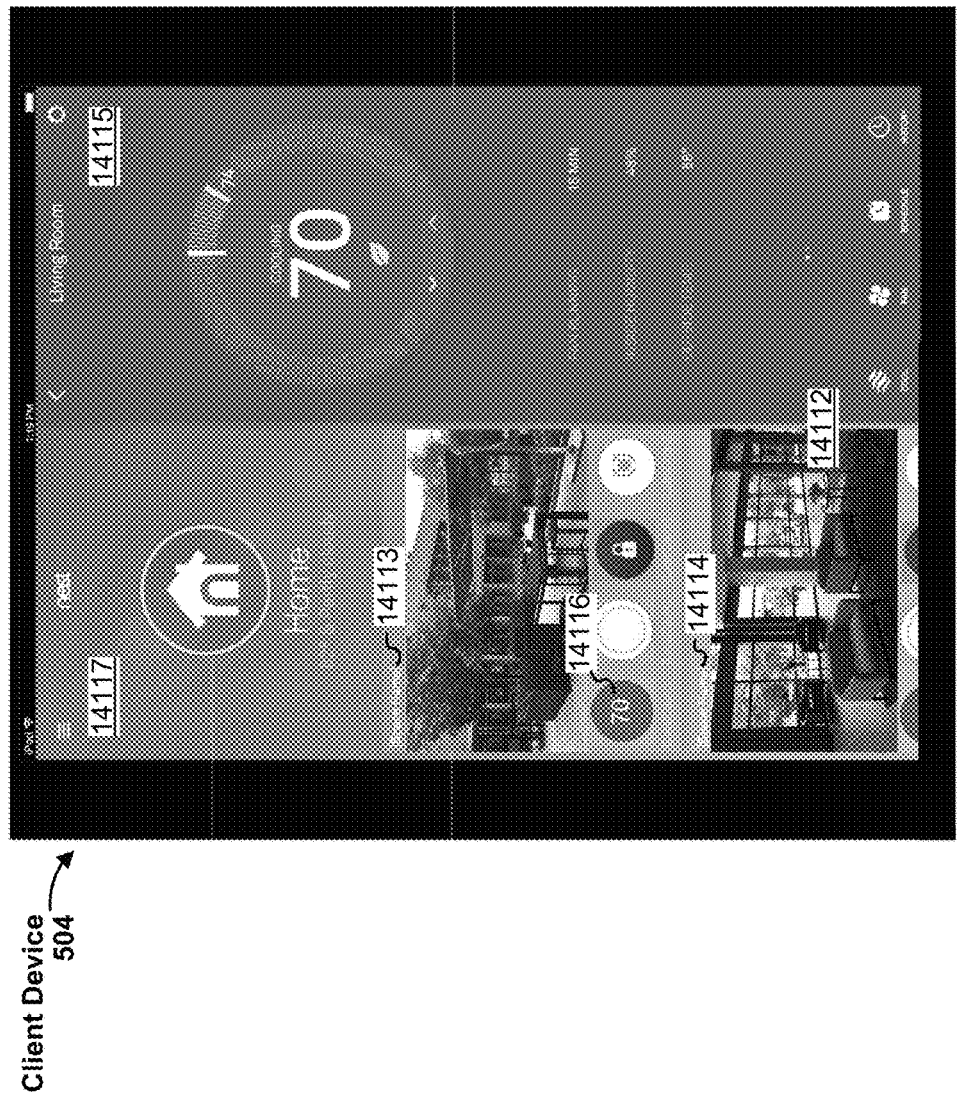

FIG. 14T shows an example user interface for presenting smart home information in accordance with some implementations. The user interface 14109 in FIG. 14T is analogous to the user interface in FIG. 14A. The user interface 14109 includes a plurality of sections, each with a video feed and a plurality of user interface objects. The user interface 14109 includes video feeds 14140, 14141, 14142, and 14143.

FIG. 14U shows an example user interface for presenting smart home information in accordance with some implementations. User interface 14110 in FIG. 14U includes four sections, each with a video feed and a plurality of user interface objects. User interface 14110 also includes a navigation bar 14111, analogous to navigation bar 1435 in FIG. 14H. User interface 14110 includes video feeds 14142, 14143, 14144, and 14145. Thus, user interface 14110 includes two video feeds (video feeds 14142 and 14143) from FIG. 14T. In some implementations, user interface 14110 in FIG. 14U is displayed in response to a user scroll gesture received on user interface 14109 in FIG. 14T. The smart home environment corresponding to user interface 14110 includes four spaces, where the each space includes a camera device and four non-camera smart devices.

FIG. 14V shows an example user interface for presenting smart home information in accordance with some implementations. User interface 14112 in FIG. 14V includes a first section 14113 and a second section 14114, each with a video feed and a plurality of user interface objects. User interface 14112 further includes a third section 14115 for displaying information about a smart device, and/or receiving user inputs adjusting settings and operation of the smart device, corresponding to user interface object 14116. In some implementations, third section 14115 is display in response to a user selection of user interface object 14116. For example, in response to detection of a user tap gesture over the display of user interface object 14116. In some implementations, the third section 14115 is configured to cover approximately half of the display in response to selection of a non-camera user interface object. In some implementations, a third section is configured to cover approximately all of the display in response to selection of a camera user interface object, such as a video feed. User interface 14112 also includes a home section 14117 with a menu user interface object and information about the smart home environment, including a home/away status indicator.

Figure 14W:
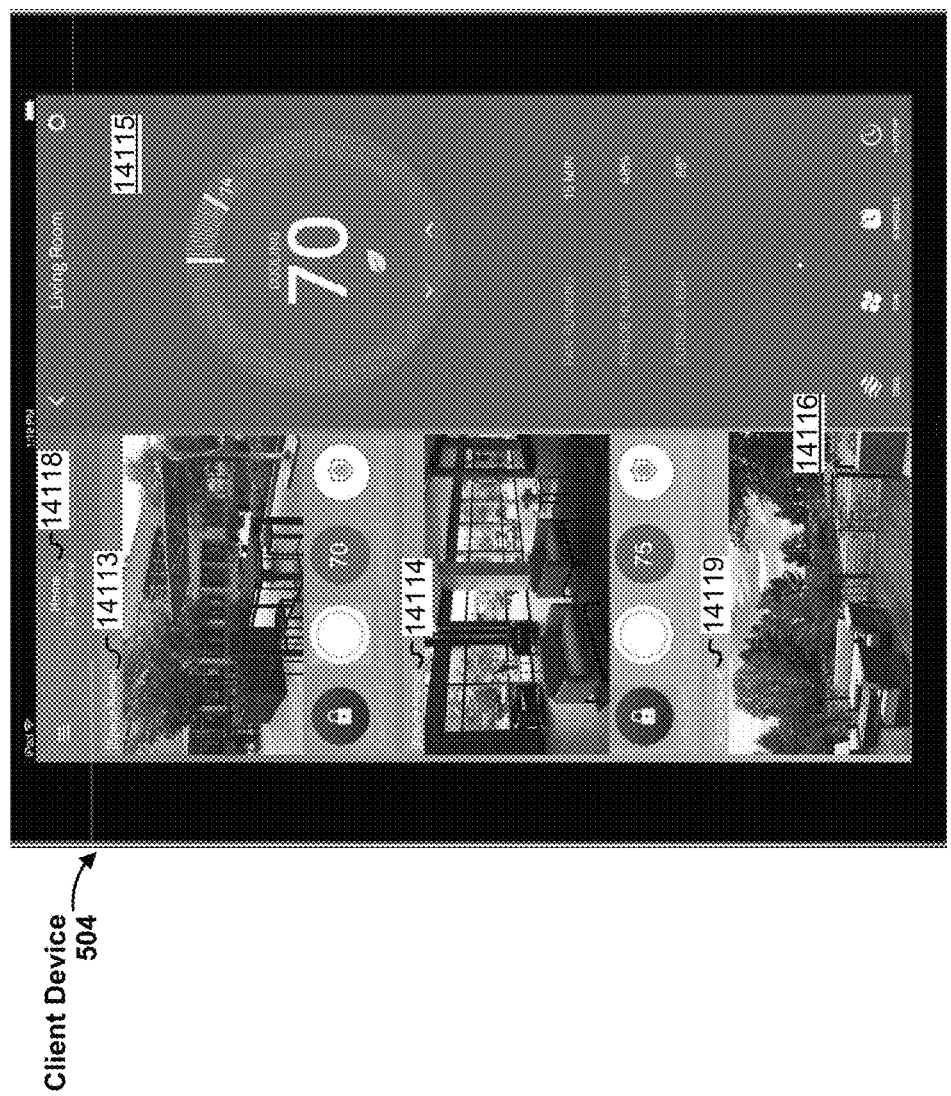

FIG. 14W shows an example user interface for presenting smart home information in accordance with some implementations. User interface 14116 in FIG. 14W includes first section 14113, second section 14114, and third section 14115 as discussed above with respect to FIG. 14V. User interface 14116 also includes a fourth section 14119 with a video feed. User interface 14116 further includes a navigation bar 14118. In some implementations, the navigation bar 14118 comprises a status bar and/or settings bar. In some implementations, the navigation bar 14118 is displayed in place of a home section (e.g., in place of home section 14117 in FIG. 14V) in response to a user scroll command. For example, user interface 14112 in FIG. 14V is replaced with user interface 14116 in FIG. 14W in response to the client device 504 detecting a user scroll-down gesture on the left half of the touch screen. In some implementations, a home section (e.g., home section 14117 in FIG. 14V) is displayed in place of the navigation bar 14118 in response to a user scroll command. In some implementations, navigation bar 14118 is visually partitioned from section 14113 (e.g., by the green hairline shown in FIG. 14W). In some implementations, navigation bar 14118 is not visually partitioned from the first section.

Figure 14X:
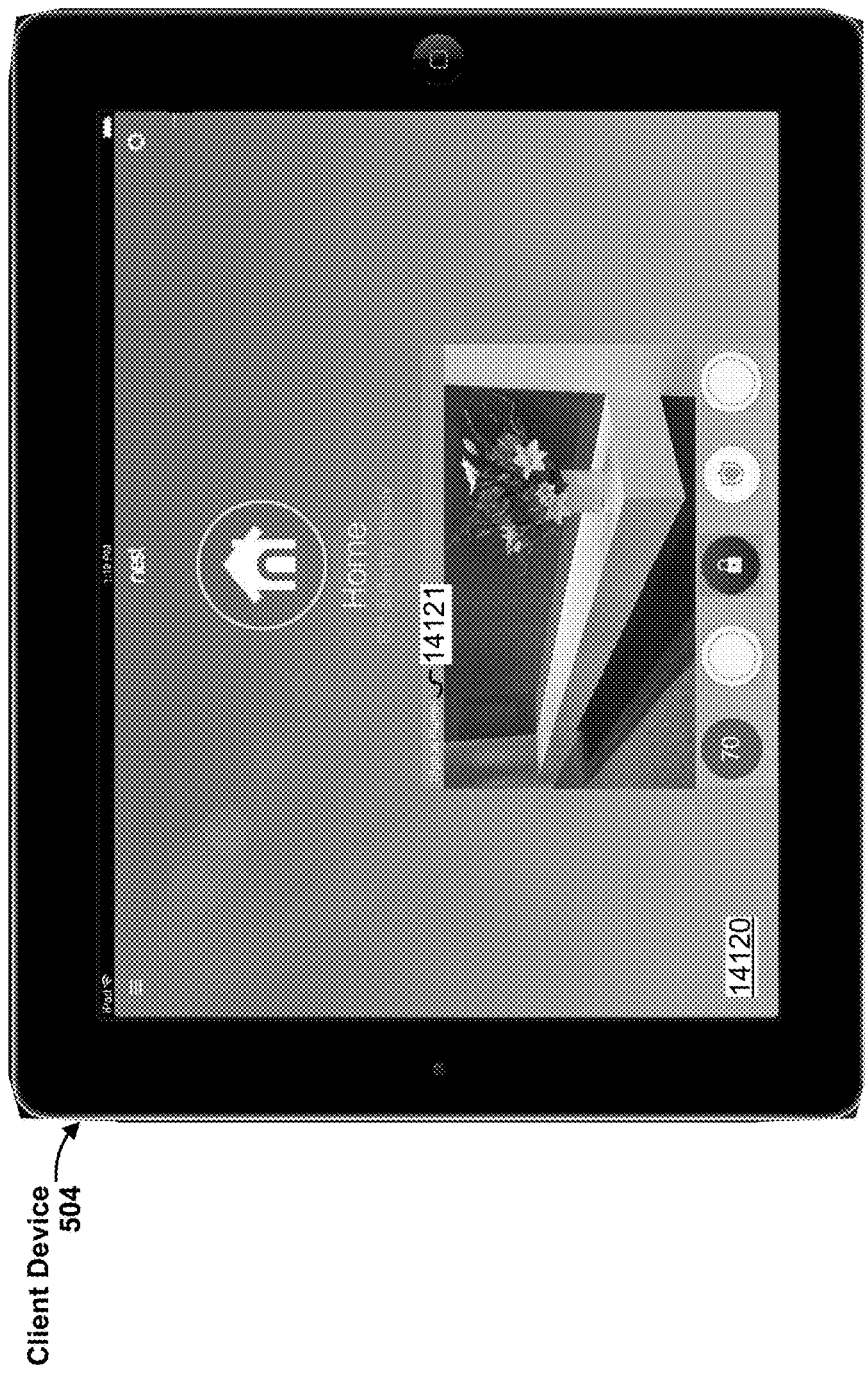

FIG. 14X shows an example user interface for presenting smart home information in accordance with some implementations. User interface 14120 includes a first section 14121 corresponding to a first space in a smart home environment. The first section 14121 includes a video feed and a plurality of user interface objects. Thus, the smart home environment corresponding to user interface 14120 includes only one space. The one space has a camera device and a plurality of non-camera smart devices associated with it.

Figure 14Y:

FIG. 14Y shows an example user interface for presenting smart home information in accordance with some implementations. User interface 14122 in FIG. 14Y includes a first section 14123 and a second section 14124. The first section 14124 corresponds to a first space in a smart home environment and includes a video feed and a plurality of user interface objects. The second section 14124 corresponds to a second space in the smart home environment and includes a video feed and a plurality of user interface objects.

Figure 14Z:
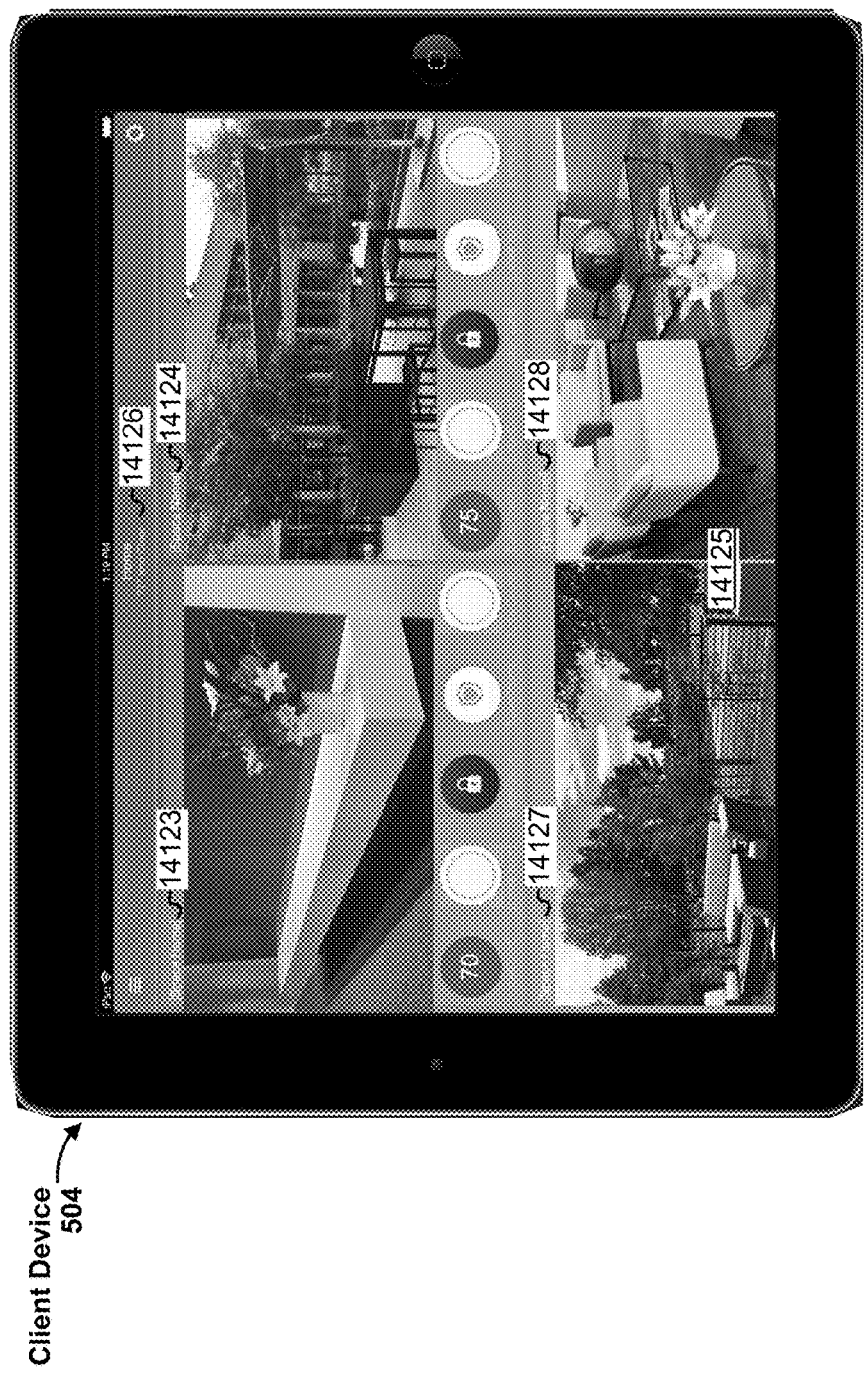
Figure 14A:

FIG. 14Z shows an example user interface for presenting smart home information in accordance with some implementations. User interface 14125 in FIG. 14Z includes first section 14123 and second section 14124 as discussed above with respect to FIG. 14Y. User interface 14125 also includes a third section 14127 and a fourth section 14128, each with a video feed. User interface 14125 further includes a navigation bar 14126. In some implementations, the navigation bar 14125 comprises a status bar and/or settings bar. In some implementations, the navigation bar 14126 is displayed in place of a home section (e.g., in place of the home section shown in FIG. 14Y) in response to a user scroll command. For example, user interface 14122 in FIG. 14Y is replaced with user interface 14125 in FIG. 14Z in response to the client device 504 detecting a user scroll-down gesture on the touch screen. In some implementations, user interface 14125 in FIG. 14Z is replaced by user interface 14122 in FIG. 14Y in response to the client device 504 detecting a user scroll-up gesture on the touch screen.

FIG. 14AA shows an example user interface for presenting smart home information in accordance with some implementations. User interface 14130 in FIG. 14AA includes a first section 14132, corresponding to a first space in a smart home environment, and a second section 14133, corresponding to a second space in a smart home environment, each with a video feed and a plurality of user interface objects. User interface 14130 further includes a third section 14134 for displaying information about a smart device, and/or receiving user inputs adjusting settings and operation of the smart device, corresponding to user interface object 14136. In some implementations, third section 14134 is display in response to a user selection of user interface object 14136. For example, in response to detection of a user tap gesture over the display of user interface object 14136. In some implementations, the third section 14134 is configured to cover approximately two-thirds of the display in response to selection of a non-camera user interface object. In some implementations, a third section is configured to cover approximately all of the display in response to selection of a camera user interface object, such as a video feed. User interface 14130 also includes a navigation bar 14135.

The user interfaces illustrated in FIGS. 13A-13G and 14A-14AA comprise example user interfaces for use with various electronic devices (e.g., mobile phones, tablet computers, desktop computers, etc.) and corresponding to particular smart home environments. These user interfaces are more intuitive and efficient and thereby increase the effectiveness, efficiency, and user satisfaction with such systems and environments.

Example Processes

Figure 15A:
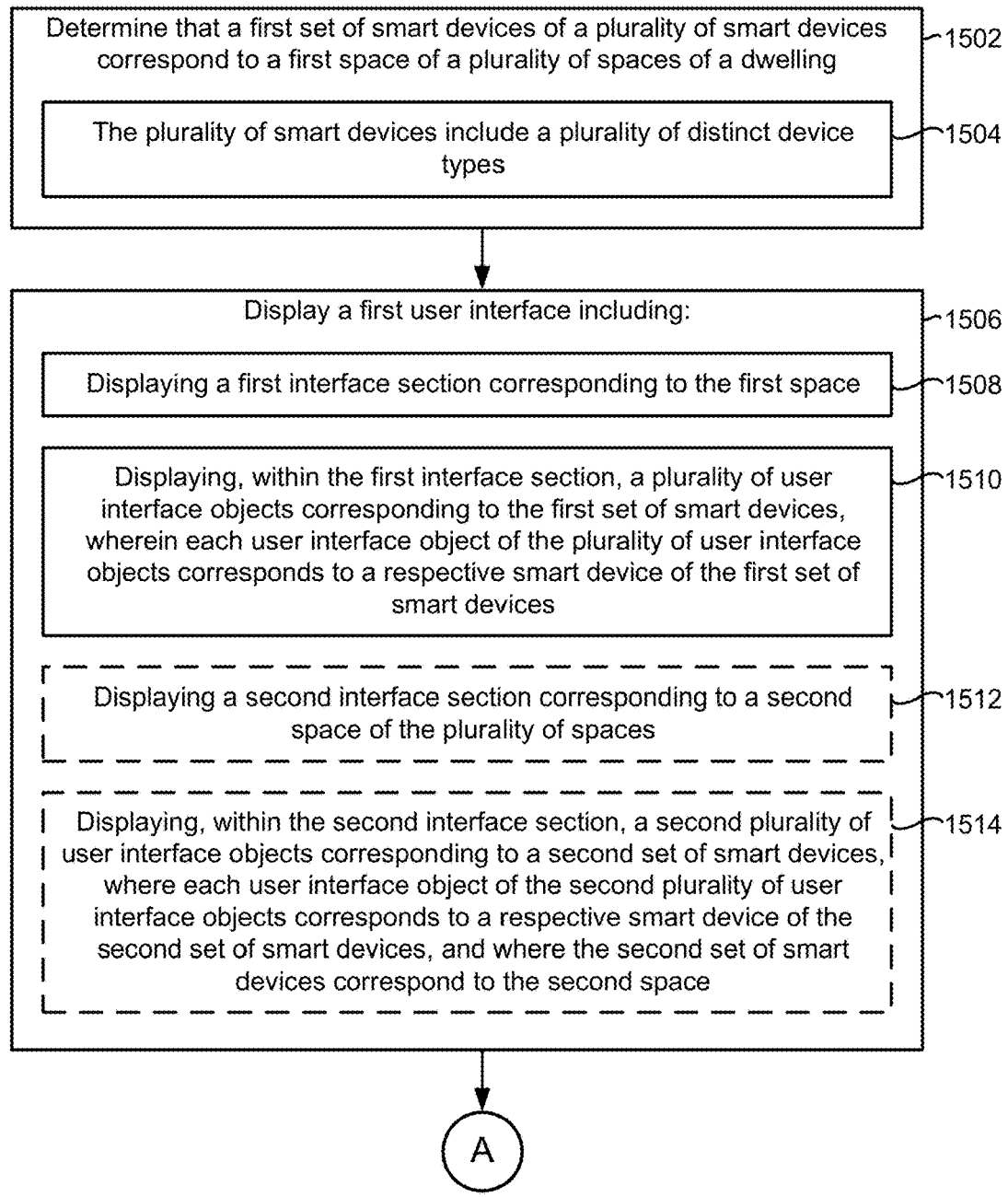
FIGS. 15A-15C illustrate a flowchart diagram of a method for presenting smart home information in accordance with some implementations.
Figure 15B:
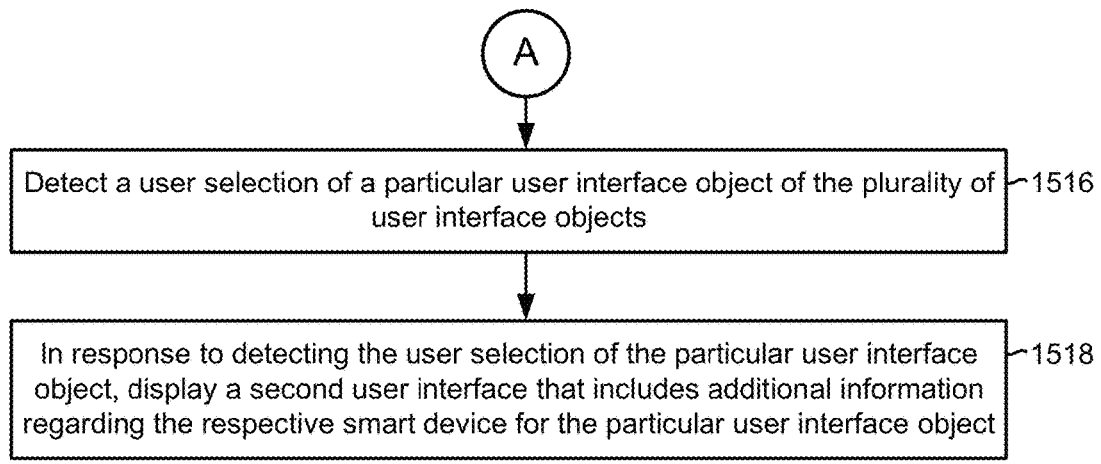
Figure 15C:
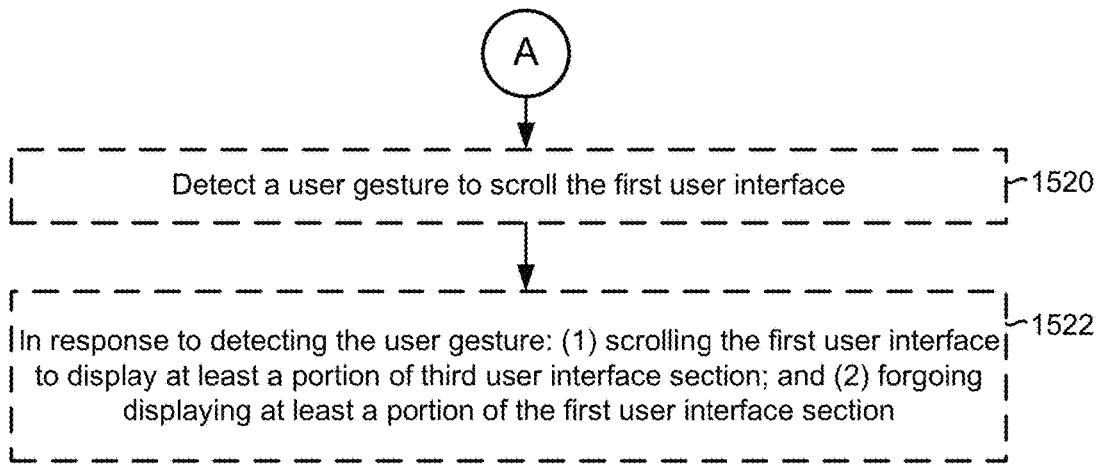

FIGS. 15A-15C illustrate a flowchart diagram of a method 1500 for of presenting information within a user interface corresponding to a plurality of smart devices including a plurality of distinct device types, in accordance with some implementations. In some implementations, the method 1500 is performed by an electronic device with one or more processors, memory, and a display. In some implementations, the electronic device optionally includes a touch screen, an accelerometer, and/or an audio input device. For example, in some implementations, the method 1500 is performed by client device 504 (FIGS. 5A-5B and 8) or one or more components thereof (e.g., client-side module 502, presentation module 821, input processing module 822, web browser module 823, application 824, user interface module 826). In some implementations, the method 1500 is governed by instructions that are stored in a non-transitory computer-readable storage medium (e.g., within memory 806) and the instructions are executed by one or more processors of the electronic device (e.g., the CPUs 802). Optional operations are indicated by dashed lines (e.g., boxes with dashed-line borders).

In an application executing at the electronic device (e.g., client device 504), the electronic device determines (1502) that a first set of smart devices of the plurality of smart devices correspond to (e.g., are assigned to and/or are located within) a first space (e.g., a living room, backyard, patio, etc.) of a plurality of spaces of a smart home environment. In some implementations, the smart home environment comprises a dwelling. For example, the electronic device determines that a set of smart devices including a camera, a smart thermostat, and a "Protect" device are assigned to a "Living Room" space. In some implementations, determining that a first set of smart devices correspond to a first space comprises determining whether a particular parameter for each smart device is set to a particular state. For example, determining whether a "where" parameter for each device is set to "Living Room," corresponding to a living room space. In some implementations, the application comprises a smart home application. In some implementations, the application comprises one of application(s) 824 (FIG. 8A).

The plurality of smart devices includes (1504) a plurality of distinct device types. For example, the plurality of smart devices includes a camera device, a smart thermostat, and a "protect" device. In some implementations, the plurality of smart devices includes at least two of the smart device types described above with respect to smart devices 204.

The electronic device displays (1506) a first user interface. For example, client device 504 in FIG. 14Y displays user interface 14122. In some implementations, the electronic device displays the first user interface utilizing user interface module 826 and/or presentation module 821 (FIG. 8A).

Displaying the user interface includes displaying (1508) a first interface section corresponding to the first space. For example, the user interface 14122 in FIG. 14Y includes a first section 14123. In some implementations, displaying a user interface section includes displaying a UI container (or border) for the interface section (e.g., to delineate interface section). In some implementations, displaying a user interface section includes displaying a label (e.g., a space name) for the first space.

Displaying the user interface includes displaying (1510), within the first interface section, a plurality of user interface objects corresponding to the first set of smart devices, wherein each user interface object of the plurality of user interface objects corresponds to a respective smart device of the first set of smart devices. In some implementations, a particular user interface object corresponds to a plurality of smart devices within the first set of smart devices (e.g., multiple security devices). For example, the user interface 14122 in FIG. 14Y includes a first section 14123 with a video feed and a plurality of non-camera interface objects. In some implementations, the first interface section includes only a single user interface object.

In some implementations, displaying a particular user interface object of the plurality of user interface objects includes displaying status information for the smart device corresponding to the user interface object. For example, display of user interface object 1405 in FIG. 14A includes an indication of the current temperature for the smart thermostat corresponding to the user interface object 1405. As another example, display of user interface object 1407 in FIG. 14A includes an indication of the current status of a "Protect" device corresponding to the user interface object 1406 (e.g., the green ring indicating no problems). In some implementations, the device receives updated status information for the smart device and, in response, updates display of the corresponding user interface object. For example, the camera for video feed 1403 is disabled and display of video feed 1403 is replaced with status information for the camera indicating that the camera is disabled. In some implementations, the status information indicates that the corresponding device is off (e.g., disabled by a user). In some implementations, the status information indicates that the corresponding device is offline (e.g., not communicatively coupled to the electronic device, or not powered). In some implementations, in response to a user input, an operating state of the corresponding smart device is adjusted. For example, in response to a double tap gesture detected on touch screen 1102 (FIG. 11B) at a location corresponding to video feed 1403, the corresponding camera is toggled on/off. As another example, in response to a right-swipe gesture detected on touch screen 1102 (FIG. 11B) at a location corresponding to user interface object 1405, the target temperature for the corresponding smart thermostat is raised. As another example, in response to a tap gesture on a user interface object corresponding to a smart lock, the state of the smart lock is toggled (e.g., locked/unlocked). As another example, in response to a double tap gesture on a user interface object corresponding to a lamp, the state of the lamp is toggled (e.g., on/off). As another example, in response to a tap-and-hold gesture on a user interface object corresponding to a fan, the rotational speed of the fan is increase/decreased.

In some implementations, displaying the user interface includes displaying (1512) a second interface section corresponding to a second space of the plurality of spaces. For example, the first space encompasses a living room and the second space encompasses a bedroom in a smart home environment. In some implementations, displaying the second user interface section comprises displaying only a portion of the second interface section. For example, the user interface in FIG. 14A includes a first section 1401, labeled "Living Room," and a second section 1409, labeled "Master Bedroom." In some implementations, displaying the second user interface section comprises displaying only a portion of the second interface section. For example, the user interface in FIG. 14A shows only a portion of the second section 1409, labeled "Master Bedroom."

In some implementations, displaying the user interface includes displaying (1514), within the second interface section, a second plurality of user interface objects corresponding to a second set of smart devices, where each user interface object of the second plurality of user interface objects corresponds to a respective smart device of the second set of smart devices, and where the second set of smart devices correspond to the second space. For example, the user interface 14122 in FIG. 14Y includes a first section 14123 with a video feed and a plurality of non-camera interface objects and a second section 14124 with a second video feed and a second plurality of non-camera interface objects.

The electronic device detects (1516) a user selection of a particular user interface object of the plurality of user interface objects. For example, client device 504 in FIG. 14A detects a user selection of video feed 1403. In response to detecting the user selection of the particular user interface object, the electronic device displays (1518) a second user interface that includes additional information regarding the corresponding smart device for the particular user interface object. For example, in response to detecting a user selection of video feed 1403 in user interface 1491 in FIG. 14N, the client device 504 display user interface 1492 in FIG. 14N. As another example, in response to detecting a user selection of user interface object 14108 in user interface 14103 in FIG. 14R, the electronic device displays user interface 14105 in FIG. 14S.

In some implementations, in response to a first type of user input, the device displays the second user interface. In some implementations, in response to a second type of user input, the device adjusts one or more operating parameters of the corresponding smart device. For example, in response to a tap gesture detected on touch screen 1102 (FIG. 14A) at a location corresponding to video feed 1403, a second user interface is displayed, such as interface 1492 in FIG. 14N. In this example, in response to a double tap gesture detected on touch screen 1102 (FIG. 14A) at a location corresponding to video feed 1403, the corresponding camera is toggled on/off.

In some implementations, displaying the second user interface includes displaying the first interface section and a second interface section. For example, the user interface 14105 in FIG. 14S includes sections 14106, 14108, and 14107. In some implementations, displaying the second user interface includes forgoing displaying the first user interface. For example, in FIG. 14N user interface 1491 is replaced by user interface 1492. In some implementations, the display of the first and second interface sections is adjusted (e.g., the dimensions of the first and second sections are adjusted). For example, in response to selection of user interface object 14108 in FIG. 14R, a first section 14106 and a second section are shifted to the left and section 14107 is displayed. In some implementations, the dimensions of a video feed are unchanged. For example, in FIG. 14N user interface 1491 is replaced by user interface 1492 and the dimensions of video feed 1403 are the same as the dimensions of video feed 1493. In some implementations, the resolution of the video feed is unchanged. For example video feed 1403 and video feed 1493 have a same resolution. In some implementations, the resolution of the video feed increases. In some implementations, the frame rate of a video feed is unchanged, while in other implementations, the frame rate increases. In some implementations, whether or not the first and second sections continue to be displayed depends on the type of interface object of the particular interface object selected by the user. For example, selection of a camera interface object causes the first and second sections to cease to be displayed, whereas selection of a non-camera interface objects causes the first and second sections to continue to be displayed.

In some implementations, the electronic device detects (1520) a user gesture to scroll the first user interface. In response to detecting the user gesture (1522), the electronic device: (1) scrolls the first user interface to display at least a portion of third user interface section; and (2) forgoes displaying at least a portion of the first user interface section. In some implementations, the third user interface section corresponds to a third space in the dwelling. For example, client device 504 displaying user interface 14112 in FIG. 14V detects a user scroll gesture, and in response, displaying user interface 14116 as shown in FIG. 14W. In transitioning between user interface 14112 and user interface 14116, home section 14117 ceases to be displayed and section 14119 is displayed.

In some implementations: (1) the electronic device: (a) determines an orientation of the device; (b) detects a change in the orientation of the client device; and, (c) in response to detecting the change in the orientation: (i) displays a second user interface; and (ii) displays, within the second user interface, the first interface section and the second interface section; (2) displaying the first interface comprises displaying the first interface based on the determined orientation; and (3) displaying the second user interface includes displaying the first interface section and the second interface section in relative locations that are distinct from relative locations of the first interface section and the second interface section in the first user interface. For example, FIG. 14H shows client device 504 in a portrait orientation. FIG. 14H also shows user interface 1434 with two sections stacked vertically (e.g., in a single column). FIG. 14K shows client device 504 in a landscape orientation. FIG. 14K also shows user interface 1468 with two sections side-by-side (e.g., in two columns). In accordance with some implementations, the client device 504 display user interface 1434 in accordance with a determination that it is in a portrait orientation. The client device 504 detects a change in the orientation to a landscape orientation and, in response, displays user interface 1468.

In some implementations: (1) the first set of smart devices includes a first camera; (2) the electronic device receives a video feed corresponding to the first camera; (3) displaying, within the first interface section, the plurality of user interface objects corresponding to the first set of smart devices includes displaying a particular user interface object, of the plurality of user interface objects, corresponding to the camera, and (4) displaying the particular user interface object includes displaying the video feed. For example, the user interface in FIG. 14A includes a first section 1401 with a video feed 1403. In some implementations, the first set of smart devices includes a plurality of cameras, and a plurality of video feeds corresponding to the plurality of cameras are displayed. In some implementations, the video feeds are down-sampled in the user interface. In some implementations, the video feeds cease to be down-sampled in response to a user input, such as a user selection of a particular video feed.

In some implementations: (1) in accordance with a determination that the video feed meets a predetermined display criterion, the electronic device updates the video feed display; and, (2) in accordance with a determination that the video feed does not meet the predetermined display criterion, the electronic device forgoes updating the video feed display. For example, the electronic device (1) updates the video feed only when it is (fully or partially) displayed on the screen; or (2) updates the video feed only when it is centered (or nearly centered) on the screen. In accordance with some implementations, client device 504 in FIG. 14W updates video feeds in sections 14113 and 14114, but does not update the video feed in section 14119 because section 14119 is not fully displayed.

In some implementations: (1) the electronic device identifies a connectivity condition between the client device and a server system (e.g., video server system 552, FIG. 5B); and (2) displaying the video feed comprises displaying the video feed with a refresh rate based on the connectivity condition. In some implementations, the connectivity condition is the based on the connection type (e.g., WiFi, 4G, etc.) of the client device. In some implementations, the connectivity condition is based on available bandwidth. For example, video feed 1403 in FIG. 14P is displayed with a refresh rate of 3 frames per second due to a connectivity condition.

In some implementations, the electronic device: (1) receives a second video feed corresponding to a second camera; and (2) displays, within the first user interface, the second video feed within a second interface section, the second interface section corresponding to a second space of the plurality of spaces. For example, user interface 1434 in FIG. 14H includes a first section with a first video feed and a second section with a second video feed.

In some implementations, the video feed and the second video feed are received concurrently by the client device from a server system communicatively coupled to the first camera and the second camera. For example, video server system 552 in FIG. 5B. In some implementations, the video feeds are live video feeds. In some implementations, one or more of the video feeds comprise stored a video clip (e.g., a video clip containing a motion event).

In some implementations, displaying the first interface section includes displaying a label for each user interface object of at least a subset of the plurality of user interface objects. For example, user interface 1431 includes label 1432 corresponding to user interface object 1433-2.

In some implementations: (1) each user interface object of the plurality of user interface objects has a respective object type; (2) the electronic device sorts the plurality of user interface objects based on the respective object types; and (3) displaying the first interface section includes displaying the sorted plurality of user interface objects. In some implementations, the respective object type corresponds to a device type of the respective smart device of the first set of smart devices. In some implementations, sorting the plurality of user interface objects includes prioritizing objects with more user interactive options. For example, smart thermostat objects are prioritized over security status objects. In some implementations, video feeds are prioritized over other types of user interface objects. In some implementations, the user interface objects are sorted based on historical activity (e.g., most often used, most recently used, etc.). In some implementations, the user interface objects are sorted based on their current operating states. For example, security devices in an alarm state are assigned highest priority. In some implementations, the user interface objects are sorted based on user preferences and/or a manual user sorting.

In some implementations: (1) displaying the first user interface comprises displaying the first user interface in accordance with a determination that the plurality of smart devices includes a camera; (2) the electronic device: (a) displays a second user interface in accordance with a determination that the plurality of smart devices does not include a camera; and (b) displays, within the second user interface, a plurality of user interface objects corresponding to the plurality of smart devices; (3) each user interface object of the plurality of user interface objects has a respective object type; and (4) displaying the plurality of user interface objects corresponding to the plurality of smart devices comprises displaying the plurality of user interface objects corresponding to the plurality of smart devices sorted in accordance with the respective object types. In some implementations, the user interface is determined automatically without any user interaction. In some implementations, the electronic device displays a user interface similar to user interface 1104 in FIG. 11A when the smart home environment contains no cameras, and displays a user interface similar to user interface 1149 in FIG. 11B when the smart home environment contains one or more cameras. In some implementations, the electronic device displays a user interface similar to user interface 1104 in FIG. 11A when the smart home environment consists of few spaces (e.g., 1, 2, or 3 spaces), and displays a user interface similar to user interface 1149 in FIG. 11B when the smart home environment consists of many spaces (e.g., more than 3 spaces).

In some implementations: (1) the electronic device obtains a determination that a camera has been added to the plurality of smart devices; and (2) displaying the first user interface comprises displaying the first user interface after obtaining the determination. In some implementations, the first user interface is displayed in response to obtaining the determination. In some implementations, a notification screen (e.g., an option screen) is displayed in response to obtaining the determination. In some implementations, the option screen gives the user an option to display the first user interface instead of a second user interface. For example an option to display user interface 1149 in FIG. 11B rather than user interface 1104 in FIG. 11A.

In some implementations: (1) the electronic device: (a) receives user selection of a display layout; and (b) in response to receiving the user selection, displays a second user interface including a plurality of user interface objects corresponding to the plurality of smart devices; (2) each user interface object of the plurality of user interface objects has a respective object type; and (3) displaying the plurality of user interface objects corresponding to the plurality of smart devices comprises displaying the plurality of user interface objects corresponding to the plurality of smart devices sorted in accordance with the respective object types. For example, the plurality of smart devices are sorted such that all camera user interface objects are first, all thermostat user interface objects are second, all "protect" user interface objects are third, etc.

In some implementations: (1) each smart device of the plurality of smart devices has a respective location parameter; and (2) the electronic device assigns each smart device of the first set of smart devices to the first space based on each respective location parameter. In some implementations, the location parameter is set by a user. In some implementations, the location parameter is determined by the smart device. In some implementations, the location parameter is assigned by a second smart device (e.g., a hub device). In some implementations, a device's where parameter is reset (or re-determined) in accordance with a determination that the device has moved.

In some implementations, the location parameters are stored in a device table, such as Table 1.

TABLE 1

| Example Device Table Device Table | | |
|---|---|---|
| DEVICE TYPE | DEVICE LOCATION | DEVICE LABEL |
| Thermostat | Living Room | [none] |
| Protect | Hallway | Left |
| Protect | Hallway | Right |

TABLE 1-continued

| Example Device Table Device Table | | |
|---|---|---|
| DEVICE TYPE | DEVICE LOCATION | DEVICE LABEL |
| Hub | Entryway | [none] |
| Protect | Bedroom | Jack's |
| Protect | Bedroom | Jill's |
| Camera | Living Room | [none] |
| Camera | [unassigned] | Camera #2 |
| Camera | Upstairs | Upstairs Cam |

In some implementations, Table 1 comprises metadata stored in a smart device, such as hub device 180, FIG. 1. In some implementations, Table 1 is stored at a server, such as hub device server system 508. In Table 1, the device location parameter corresponds to a space within the smart home environment. Thus, the smart home environment includes a "Living Room" space, a "Hallway" space, an "Entryway" space, a "Bedroom" space, and an "Upstairs" space.

The camera device labeled "Camera #2" in Table 1 has not been assigned a location, as denoted by "[unassigned]" as its device location field. In some implementations, unassigned devices are displayed together in a section corresponding to an "unassigned" space. For example, in accordance with some implementations, section 1425 in user interface 1416 shown in FIG. 14F contains user interface objects that are currently unassigned. In some implementations, a user is prompted to assign a location to unassigned devices prior to display of those devices in a user interface.

The thermostat device in Table 1 is has not been given a device label, as denoted by "[none]" in its device label field. In some implementations, smart devices without labels are given a default label, such as "none" or "thermostat." In some implementations, smart devices without user-assigned labels are given a default label based on the device type, such as "Thermostat" or "Lock." In some implementations, smart devices without labels are displayed in a user interface without a label. For example, user interface object 1433-1 in FIG. 14G is displayed in user interface 1431 without a label.

In some implementations: (1) the plurality of smart devices includes a second set of smart devices, where each smart device in the second set of smart devices has an unassigned (or undefined) location parameter; and (2) the electronic device: (a) displays a second user interface; and (b) displays, within the second user interface, a listing of the second set of smart devices. For example, a spaces setting user interface similar to user interface 1404 in FIG. 14B is displayed with a listing of unassigned devices. In some implementations, the listing includes each smart device in the plurality of smart devices. For example, a spaces setting user interface similar to user interface 1404 in FIG. 14B is displayed with a listing of unassigned devices as well as listings of devices in spaces 1411. In some implementations, selecting a device within the listing enables the user to set the location parameter.

In some implementations: (1) the plurality of smart devices includes a second set of smart devices, where each smart device in the second set of smart devices has an unassigned (or undefined) location parameter; and (2) displaying the first user interface further includes: (a) displaying a second interface section corresponding to the unassigned location parameter; and (b) displaying, within the second interface section, a second plurality of user interface objects corresponding to the second set of smart devices, where each user interface object of the second plurality of user interface objects corresponds to a respective smart device of the second set of smart devices.

In some implementations, the plurality of spaces correspond to a particular geographical location (e.g., a home or structure), and displaying the first user interface further includes displaying a second interface section with information about the particular geographical location (e.g., home status, weather info, etc.). For example, user interface 14112 in FIG. 14V includes the home section 14117 showing weather information about a particular geographical location. In some implementations, the second interface section is replaced with a bar when scrolling. For example, the home section 14117 in FIG. 14V is replaced with navigation bar 14118 in response to a scroll event. In some implementations, the application includes multiple interfaces, including a home screen interface (e.g., with one space shown) and a scrolling interface with multiple sections corresponding to multiple spaces shown simultaneously.

In some implementations: (1) the first user interface includes a plurality of interface sections including the first interface section, and each interface section of the plurality of interface sections corresponds to a respective space of the plurality of spaces; (2) the electronic device sorts the plurality of interface sections; and (3) displaying the first user interface comprises displaying the first user interface with the sorted plurality of interface sections. In some implementations, the sections are sorted by one or more of: (1) alphabetically by label, (2) by the user, and (3) by prioritizing sections with specific device types (such as cameras), (4) by a number of smart devices associated with each section, and the like.

In some implementations, the electronic device displays a second user interface including a listing of the plurality of spaces. In some implementations, the user can adjust the display order of the spaces by adjusting the listing. In some implementations, the user can edit, remove, and/or add a space within the listing. For example, a user can rename a "bedroom" space as "Master Bedroom" by selecting it within the listing.

In some implementations, the electronic device determines a size and/or orientation of the display; and based on the determined display size and/or orientation, forgoes displaying a particular interface section corresponding to a particular space. For example, in accordance with a determination that the particular interface section won't fit on the display. In some implementations, only part of the particular interface section is displayed along with a scroll affordance, such as a scroll bar. For example, user interface 14122 in FIG. 14Y shows two sections corresponding to two spaces in a smart home environment. By contrast, user interface 14109 in FIG. 14T shows four sections corresponding to four spaces in the smart home environment.

In some implementations: (1) the plurality of user interface objects includes a first user interface object corresponding to a first smart device; and (2) the electronic device adjusts display of the first user interface object in accordance with a determination that the first smart device is offline (e.g., disabled, powered off, not communicatively coupled, not responding, etc.). For example, FIG. 14O shows user interfaces 1494 and 1497 where display of user interface object 1496 is adjusted in accordance with a determination that the corresponding device is offline.

Figure 16:
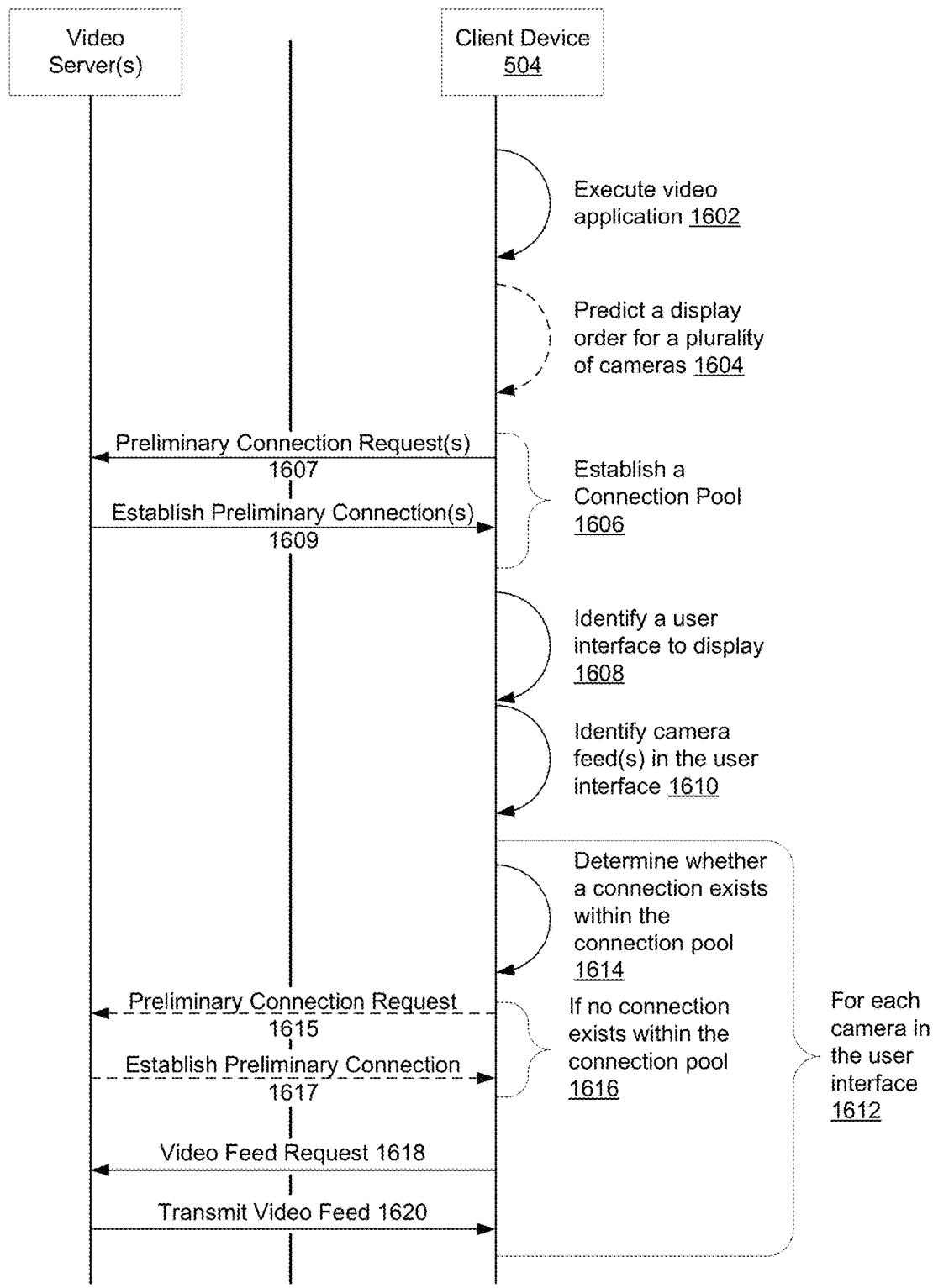
FIG. 16 illustrates a flowchart diagram of a method for presenting video feeds in a user interface on a client device in accordance with some implementations.

FIG. 16 illustrates a flowchart diagram of a method 1600 for presenting camera information in a user interface in accordance with some implementations. In some implementations, the method 1600 is performed by an electronic device with one or more processors, memory, a display, and optionally a touch screen, an accelerometer, and/or an audio input device. For example, in some implementations, the method 1600 is performed by client device 504 (FIGS. 5A-5B and 8) or one or more components thereof (e.g., client-side module 502, presentation module 821, input processing module 822, web browser module 823, application(s) 824, user interface module 826). In some implementations, the method 1600 is governed by instructions that are stored in a non-transitory computer readable storage medium (e.g., the memory 806) and the instructions are executed by one or more processors of the electronic device (e.g., the CPUs 802).

The client device executes (1602) a video application. In some implementations, the video application comprises a smart home application. In some implementations, the video application is executed in response to a user input (e.g., selection of an application icon). In some implementations, the video application comprises a web browser. In some implementations, the video application comprises one of application(s) 824 (FIG. 8A).

In some implementations, the client device predicts (1604) a user-preferred display order for a plurality of cameras. In some implementations, the prediction is based on most recently viewed cameras, most frequently viewed cameras, historical tendencies of a particular user, location of cameras, labels of cameras, and the like. In some implementations, the device determines a display order for the plurality of cameras.

The client device establishes (1606) a connection pool by establishing (1609) one or more preliminary connections. The client device sends (1607) one or more preliminary connection requests to one or more video servers. The one or more video servers confirm (e.g., acknowledge) the one or more preliminary connection requests. In some implementations, each preliminary connection corresponds to a particular camera in a smart home environment. In some implementations, the client device maintains each preliminary connection to facilitate communication of video data from the one or more video servers to the client device. In some implementations, a preliminary connection comprises an established communication connection between the client device and the server. In some implementations, the client device establishes a connection pool utilizing network communication module 820, video connection module 8202, and/or connection pool module 8204 (FIG. 8A). In some implementations, the client device sends the one or more preliminary connection requests via network interface(s) 804 (FIG. 8A).

The client device identifies (1608) a user interface to display. In some implementations, the user interface comprises a home screen. In some implementations, the user interface is analogous to the user interface 14100 in FIG. 14Q. In some implementations, the client device utilizes the user interface module 826 and/or the smart home application 824 to identify the user interface to display.

The client device identifies (1610) one or more camera feeds to be displayed in the user interface. In some implementations, the one or more camera feeds include feeds that will be at least partially displayed in the initial view of the user interface. In some implementations, the one or more camera feeds include feeds that to be displayed in response to a scroll input (e.g., a user scroll gesture). In some implementations, the client device identifies the one or more camera feeds based on the predicted display order for the cameras.

For each camera in the user interface (1612), the client device determines (1614) whether a connection exists for the camera in the connection pool. In some implementations, the client device determines whether the connection exists by utilizing network communication module 820, video connection module 8202, and/or connection pool module 8204.

In accordance with a determination that the connection does not exist for the camera in the connection pool (1616), the client device establishes the connection (1617). The client device sends (1615) a preliminary connection request to a video server. In response to the request, the video server confirms the preliminary connection request. In some implementations, the client device establishes the connection utilizing network communication module 820, video connection module 8202, and/or connection pool module 8204 (FIG. 8A). In some implementations, the client device sends the preliminary connection request via network interface(s) 804 (FIG. 8A).

For each camera in the user interface (1612), the client device requests (1618) the video feed for the camera from the video server. In response to the request, the video server transmits (1620) the video feed to the client device. In some implementations, the client device requests the video feed via the preliminary connection. In some implementations, the video feed is received by the client device via the preliminary connection. In some implementations, for each camera in the user interface, the client device determines if the camera is active or inactive (e.g., on or off or offline). In some implementations, the client device requests the video feed for the camera from the video server in accordance with a determination that the camera is active.

In some implementations, the client device establishes connections with, and receives video feeds from, one or more camera devices. Although FIG. 16 shows client device 504 communicating with one or more video servers, in some implementations, client device 504 communicates with one or more camera devices instead.

In some implementations, the client device includes a display, one or more processors, and memory storing one or more programs for execution by the one or more processors (e.g., client device 504, FIG. 8A).

In some implementations, the client device receives a request to execute an application for communicating with a plurality of smart devices, the plurality of smart devices including a plurality of cameras. In some implementations, the request is received from a user of the client device. In some implementations, the user activates a smart home application on the client device (e.g., one of application(s) 824 and/or client-side module 502, FIG. 8A). In some implementations, the request to execute the application is received as part of a start-up sequence for the client device.

In some implementations, the client device, in response to receiving the request to execute the application, establishes a preliminary connection for each of at least a subset of the plurality of cameras. In some implementations, the preliminary connection comprises an active connection that is not transmitting a video feed. In some implementations, a preliminary connection comprises an initial handshake between the client device and remote computing system, such as camera device 118 (FIG. 9B) or video server 554 (FIG. 7B). In some implementations, the client device establishes the connection utilizing network communication module 820, video connection module 8202, and/or connection pool module 8204 in conjunction with network interface(s) 804 (FIG. 8A).

In some implementations, the client device identifies a user interface for display to a user via the display, the user interface including a video feed from a particular camera of the plurality of cameras. In some implementations, the user interface comprises a home screen. In some implementations, the user interface is analogous to the user interface 14100 in FIG. 14Q. In some implementations, the client device utilizes the user interface module 826 and/or the smart home application 824 to identify the user interface to display.

In some implementations, the client device, after identifying the user interface for display, determines whether a preliminary connection has been established for the particular camera. For example, the user interface shown in FIG. 14A includes video feed 1403 corresponding to a particular camera. In this example, the client device 504 determines whether a preliminary connection has been established for the particular camera.

In some implementations, the client device, in accordance with a determination that the preliminary connection has been established for the particular camera, requests, via the preliminary connection, the video feed for the particular camera. In some implementations, the client device requests, via the preliminary connection, the video feed for the particular camera. In some implementations, the video feed is received by the client device via the preliminary connection.

In some implementations, the client device displays the user interface with the video feed for the particular camera. In some implementations, the connection is a TCP connection. For example, the user interface shown in FIG. 14A includes a display of video feed 1403 corresponding to a particular camera.

In some implementations, the client device, in accordance with a determination that the preliminary connection has not been established for the particular camera, establishes the preliminary connection for the particular camera. In some implementations, the client device establishes the connection utilizing network communication module 820, video connection module 8202, client-side module 502, and/or connection pool module 8204 in conjunction with network interface(s) 804 (FIG. 8A).

In some implementations, the client device predicts a display order for the plurality of cameras. In some implementations, the prediction is based on most recently viewed cameras, most frequently viewed cameras, historical tendencies of a particular user, location of cameras, labels of cameras, and the like. In some implementations, the client device determines a display order for the plurality of cameras. In some implementations, the client device predicts the display order utilizing client data 830 (FIG. 8B). In some implementations, the client device predicts the display order based on data received from video server 554, such as information from device information database 7326 and/or camera events history 7328.

In some implementations, the client device ranks the plurality of cameras in accordance with the predicted display order. In some implementations, the cameras predicted to be higher in the display order are ranked above cameras predicted to be lower in the display order. In some implementations, the cameras are ranked based on which are most recently used/viewed. In some implementations, the cameras are ranked based on one or more user preferences. For example, a ranking of cameras by likelihood of being requested for viewing again by the user.

In some implementations, establishing the preliminary connection for each of at least the subset of the plurality of cameras comprises establishing the preliminary connection for each of at least the subset of the plurality of cameras based on the ranking. For example, the client device establishes a preliminary connection for each of the top five cameras in the ranking. In some implementations, establishing the preliminary connection for each of at least the subset of the plurality of cameras comprises establishing the preliminary connection for each of at least the subset of the plurality of cameras based on the predicted display order.

In some implementations, the identified user interface includes a plurality of video players for simultaneous display to the user. For example, the user interface 1438 in FIG. 14I includes a video player for each of video feed 1458, video feed 1460, and video feed 1463. In some implementations, the client device manages the plurality of video players utilizing video player module 8262.

In some implementations, the client device determines that video feeds from a first subset of cameras of the plurality of cameras are to be displayed within the identified user interface, the first subset of cameras including the particular camera. For example, client device 504 in FIG. 14I determines that video feeds 1458, 1460, and 1463 are to be displayed within user interface 1438. In some implementations, the client device utilizes user interface module 826, presentation module 821, client-side module 502, and/or application(s) 824 to determine that video feeds from the first subset of cameras are to be displayed.

In some implementations, the client device assigns a video feed from each camera of the first subset of cameras to a video player of the plurality of video players, including assigning the video feed from the particular camera to a particular video player. For example, client device 504 in FIG. 14I assigns video feed 1458 to a first video player, video feed 1460 to a second video player, and video feed 1463 to a third video player. In some implementations, the client device implements the video player utilizing video player module 8262.

In some implementations, displaying the user interface with the video feed comprises displaying a first view of the user interface including video feeds from each camera of the first subset of cameras. For example, client device 504 in FIG. 14Y displays a first view including section 14123 having a first video feed and section 14124 having a second video feed. In this example, the client device 504 in FIG. 14Z displays a second view including section 14123 having a first video feed, section 14124 having a second video feed, section 14127 having a third video feed, and section 14128 having a fourth video feed.

In some implementations, the client device, for each camera in the first subset of cameras: (1) determines whether a preliminary connection has been established for the camera; and (2) in accordance with a determination that a preliminary connection has not been established for the camera, establishing a preliminary connection for the camera. For example, the client device 504 utilizes one or more of network communication module 820, video connection module 8202, connection pool module 8204, and connection pool data 8303 to determine whether a preliminary connection has been established for each camera.

In some implementations, establishing the preliminary connection for the camera comprises: (1) prior to establishing the preliminary connection for the camera, determining whether a maximum number of preliminary connections has been reached; and (2) in accordance with a determination that the maximum number of preliminary connections has been reached: (a) based on a ranking of the preliminary connections, terminating a second preliminary connection; and (b) after terminating the second preliminary connection, establishing the preliminary connection for the camera. In some implementations, the maximum number of connections is set to prevent clogging of an antenna of the client device. In some implementations, the maximum number of connections is based on an estimate of total bandwidth usage by the application and/or an estimate of available bandwidth. For example, based on one or more current network conditions, a maximum for the number of preliminary connections for a particular client device is set at six. Thus, if six preliminary connections are established for the particular client device, an established connection must be terminated before a new preliminary connection can be made. In some implementations, the ranking of established preliminary connections is based on historical usage information such as most recently viewed, most frequently viewed, and usage patterns of a particular user. In some implementations, the rank is based on a prediction of which cameras are most likely to be requested for viewing by a particular user.

In some implementations, the client device: (1) receives a request from the user to display a second view of the user interface (e.g., via a scroll gesture); (2) determines that video feeds from a second subset of cameras of the plurality of cameras are to be displayed within the second view of the user interface, wherein the second subset of cameras does not include the particular camera; (3) reassigns the particular video player to a video feed from a camera in the second subset of cameras; and (4) displays the second view of the user interface including displaying video feeds from each camera of the second subset of cameras. For example, the client device 504 in FIG. 14T displays a user interface 14I09 including video feeds 14140, 14141, 14142, and 14143. In this example, in response to a user scroll gesture, client device 504 displays in FIG. 14U a second view with video feeds 14142, 14143, 14144, and 14145. Thus in this example, a video player utilized for video feed 14140 in FIG. 14T is reassigned to one of video feeds 14142, 14143, 14144, or 14145 in FIG. 14U. Likewise, a video player utilized for video feed 14141 in FIG. 14T is reassigned to one of video feeds 14142, 14143, 14144, or 14145 in FIG. 14U. In some implementations, the video player is reassigned to a video feed to be displayed in a same or similar location as the prior video feed. For example, the video player utilized for video feed 14140 in FIG. 14T is reassigned to video feed 14144 in FIG. 14U. In some implementations, the client device manages the plurality of video players utilizing video player module 8262.

In some implementations, reassigning the particular video player to the video feed from the camera in the second subset of cameras comprises: (1) ceasing to display the video feed from the particular camera; and (2) displaying the video feed from the camera in the second subset of cameras. In some implementations, the client device sends a request to stop transmitting the video feed for the particular camera via the corresponding preliminary connection. In some implementations, the client device sends the request to stop transmitting in response to the video feed no longer being displayed in the user interface. For example, in response to a user scroll gesture which results in the video feed being scrolled off the display, the client device sends the request to stop transmitting.

In some implementations: (1) establishing the preliminary connection for each of at least a subset of the plurality of cameras comprises establishing a preliminary connection for the camera in the second subset of cameras; and (2) the client device: (a) after establishing the preliminary connection for the camera and before reassigning the particular video player, receives the video feed from the camera; and (b) after reassigning the particular video player to the video feed from the camera in the second subset of cameras, transcodes the video feed from the camera. In some implementations, the client device: (1) establishes a preliminary connection with a video server; (2) requests a video feed via the preliminary connection; (3) in response to the request, receives the video feed via the preliminary connection; and (4) transcodes the video feed via a video player in a user interface.

In some implementations, identifying the user interface comprises identifying the user interface based on one or more characteristics of the client device. In some implementations, identifying the user interface comprises identifying a number of video players to be displayed. In some implementations, the number of video players to be displayed is based on the display size of the client device. In some implementations, the number of video players to be displayed is based on the CPU and/or GPU of the client device. In some implementations, the number of video players to be displayed is based on a number of active cameras in a corresponding smart home environment. In some implementations, identifying the user interface comprises identifying the user interface based on one or more user settings and/or one or more user preferences of a user of the client device. In some implementations, identifying the user interface comprises identifying the user interface based on one or more network conditions of a communication network coupled to the device (e.g., network(s) 162, FIG. 5A). In some implementations, identifying the user interface comprises identifying the user interface based on the status of one or more smart devices in a corresponding smart home environment.

In some implementations, displaying the user interface with the video feed comprises: (1) displaying the user interface with a distorted (e.g., blurred) image previously received from the particular camera; (2) after displaying the blurred image, receiving an updated image from the particular camera; (3) displaying the updated image in place of the blurred image; and (4) after displaying the updated image, displaying the video feed in place of the updated image. In some implementations, the client device utilizes blurred image data 832 to display a blurred image. In some implementations, the client device displays blurred image data until an updated image for the corresponding camera's field of view is received. For example, an image captured by the camera less than 90, 60, or 30 seconds prior to display.

In some implementations: (1) the client device determines a video refresh rate for the video feed from the particular camera based on one or more connection conditions; and (2) displaying the user interface with the video feed comprises displaying the video feed at the determined video refresh rate. In some implementations, the refresh rate is based on one or more of the capabilities of the client device, user preferences, and a user data plan. In some implementations, the connection conditions include information on whether the device has an active WiFi connection and/or an active 4G connection. In some implementations, the one or more connection conditions indicate that the network coupled to the client device is poor (e.g., low available bandwidth and/or high latency), and the client device determines a low refresh rate for the video feed based on the poor network conditions. For example, FIG. 14P shows the client device 504 displaying a user interface with a video feed 1403 having a refresh rate of three frames per minute and a banner 1496 notifying the user of the low refresh rate.

In some implementations: (1) the client device, in response to the request for the video feed from the particular camera, receives a portion of the video feed corresponding to a previously detected motion event; and (2) displaying the user interface with the video feed comprises displaying the portion of the video feed corresponding to the previously detected motion event. For example, the video feed corresponds to a sixty-three second motion event from the previous night. In some implementations, a user of the client device requests the portion of the video feed corresponding to the previously detected motion event. In some implementations, the client device alerts the user to the previously detected motion event and, in response to a user view request, retrieves the portion of the video feed corresponding to the motion event for display.

In some implementations, the client device: (1) in response to the request for the video feed from the particular camera, receives a live video feed from the particular camera in addition to receiving the portion of the video feed corresponding to the previously detected motion event; and (2) in response to a user selection within the user interface: (a) ceases to display the portion of the video feed corresponding to the previously detected motion event; and (b) displays the live video feed. In some implementations, the client device receives a portion of the video feed corresponding to a previous motion event and a live video feed. For example, the client device transcodes the portion of the video feed corresponding to the previous motion event based on a first user input. In this example, in response to a second user input, the client device ceases to transcode the portion of the video feed corresponding to the previous motion event and transcodes the live video feed.

In some implementations: (1) establishing the preliminary connection for each of at least a subset of the plurality of cameras comprises establishing the preliminary connection with a server having (e.g., storing) the video feed for the particular camera; and (2) the client device: (a) receives the video feed from the particular camera; and (b) in response to the receiving the request for the video feed from the particular camera, sends the video feed to the client device. In some implementations, establishing the respective preliminary connection for each of at least a subset of the plurality of cameras based on the ranking comprises establishing the preliminary connection with a respective server having the video feed for the respective camera.

In some implementations: (1) the server receives a plurality of video feeds from the particular camera, including the particular video feed, each video feed of the plurality of video feeds having a distinct resolution; (2) the server determines that the particular video feed is appropriate for the client device; and (3) sending the video feed to the client device comprises sending the video feed to the client device in accordance with the determination that the video feed appropriate for the client device. In some implementations, the determination is based on the client device's capabilities, such as CPU, GPU, and/or display limitations. In some implementations, the determination is based on network conditions (e.g., whether a WiFi connection is available). In some implementations, the determination is based on a cost of transmitting data to the client device (e.g., the client device's data plan).

In some implementations: (1) the received video feed has a first resolution; (2) the server: (a) determines that a second resolution is appropriate for the client device, the second resolution being lower than the first resolution; and (b) converts the video feed from the first resolution to the second resolution; and (3) sending the video feed to the client device comprises sending the video feed at the second resolution to the client device. For example, the received video feed has a resolution of 1080p and the server determines that 720p is appropriate for the client device.

In some implementations, the client device, after establishing the preliminary connection for each of at least the subset of the plurality of cameras, periodically verifies each preliminary connection. For example, the client device periodically sends a ping via the preliminary connection (e.g., sends a ping every 60 seconds).

In some implementations, the client device: (1) in response to receiving the request to execute the application, establishes a preliminary connection for each of a plurality of non-camera smart devices of the plurality of smart devices; and (2) receives device information, via the preliminary connection, for a particular non-camera smart device. In some implementations, the device information is pushed by the server (e.g., sent by the server without receiving a request from the client).

In some implementations: (1) the client device: (a) while establishing the preliminary connection for each of the plurality of non-camera smart devices, displays a loading screen; and (b) in accordance with a determination that the preliminary connection for each of the plurality of non-camera smart devices has been established, ceases to display the loading screen; and (2) displaying the user interface with the video feed comprises displaying the user interface with the video feed in accordance with a determination that the preliminary connection for each of the plurality of non-camera smart devices of the plurality of smart devices has been established. In some implementations, displaying the user interface is independent of the establishment of the respective preliminary connections for each of the cameras. For example, in response to a request to execute an application (e.g., a smart home application) the client device identifies six non-camera smart devices and six camera smart devices. In this example, the client device begins the process of establishing connections with the six non-camera smart devices and establishing connections with the six camera smart devices. While establishing the connections with the six non-camera smart devices, the client device displays a loading screen. Once the connections for the six non-camera smart devices are established, the client device displays a first user interface (e.g., a home screen) regardless of whether connections have been established for all six camera smart devices. In some implementations, in accordance with a determination that the preliminary connection for each of the plurality of non-camera smart devices has been established or cannot be established, the client device ceases to display the loading screen. In some implementations, a preliminary connection attempt times out after a predetermined amount of time (e.g., 10 seconds), and the client device determines that the connection cannot be established.

In some implementations: (1) displaying the user interface with video feed comprises displaying the video feed within a first video player in the user interface; and (2) the client device: (a) receives a user request to display a second user interface corresponding to the particular camera; and (b) in response to receiving the user request, displays the second user interface including displaying the video feed within a second video player in the second user interface. In some implementations, the user request is a user selection of the transcoded video feed in the user interface. In some implementations, the video player in the first user interface is reused in the second user interface. For example, FIG. 14N shows client device 504 displaying a first user interface 1491 including a video feed 1403. In this example, in response to a user selection of video feed 1403, the client device displays user interface 1492 including video feed 1493.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a client device having a display, one or more processors, and memory storing one or more programs for execution by the one or more processors:
receiving a request from a user to execute an application for communicating with a plurality of smart devices, the plurality of smart devices including a plurality of cameras;
in response to receiving the user request to execute the application, establishing a preliminary connection via one or more wireless networks for each of at least a subset of the plurality of cameras, wherein establishing each preliminary network connection comprises completing a communication handshake between the client device and the camera;
identifying a user interface for display to the user via the display based on one or more characteristics of the client device, the user interface including a video feed from a particular camera of the plurality of cameras;
after identifying the user interface for display, determining whether a preliminary connection has been established for the particular camera;
in accordance with a determination that the preliminary connection has been established for the particular camera, requesting, via the preliminary connection, the video feed for the particular camera; and
displaying the user interface with the video feed for the particular camera via the display.

2. The method of claim 1, further comprising:
in accordance with a determination that the preliminary connection has not been established for the particular camera, establishing the preliminary connection for the particular camera; and
requesting, via the preliminary connection, the video feed for the particular camera.

3. The method of claim 1, further comprising:
predicting a display order for the plurality of cameras; and
ranking the plurality of cameras in accordance with the predicted display order;
wherein establishing the preliminary connection for each of at least the subset of the plurality of cameras comprises establishing the preliminary connection for each of at least the subset of the plurality of cameras based on the ranking.

4. The method of claim 1, wherein the identified user interface includes a plurality of video players for simultaneous display to the user, and the method further comprises:
determining that video feeds from a first subset of cameras of the plurality of cameras are to be displayed within the identified user interface, the first subset of cameras including the particular camera; and
assigning a video feed from each camera of the first subset of cameras to a video player of the plurality of video players, including assigning the video feed from the particular camera to a particular video player;
wherein displaying the user interface with the video feed comprises displaying a first view of the user interface including video feeds from each camera of the first subset of cameras.

5. The method of claim 4, further comprising, for each camera in the first subset of cameras:
determining whether a preliminary connection has been established for the camera; and
in accordance with a determination that a preliminary connection has not been established for the camera, establishing a preliminary connection for the camera.

6. The method of claim 5, wherein establishing the preliminary connection for the camera comprises:
prior to establishing the preliminary connection for the camera, determining whether a maximum number of preliminary connections has been reached; and
in accordance with a determination that the maximum number of preliminary connections has been reached:
based on a ranking of the preliminary connections, terminating a second preliminary connection; and
after terminating the second preliminary connection, establishing the preliminary connection for the camera.

7. The method of claim 4, further comprising:
receiving a request from the user to display a second view of the user interface;
determining that video feeds from a second subset of cameras of the plurality of cameras are to be displayed within the second view of the user interface, wherein the second subset of cameras does not include the particular camera;
reassigning the particular video player to a video feed from a camera in the second subset of cameras; and
displaying the second view of the user interface including displaying video feeds from each camera of the second subset of cameras.

8. The method of claim 7, wherein reassigning the particular video player to the video feed from the camera in the second subset of cameras comprises:
ceasing to display the video feed from the particular camera; and
displaying the video feed from the camera in the second subset of cameras.

9. The method of claim 7, wherein establishing the preliminary connection for each of at least a subset of the plurality of cameras comprises establishing a preliminary connection for the camera in the second subset of cameras; and
the method further comprises:
after establishing the preliminary connection for the camera and before reassigning the particular video player, receiving the video feed from the camera; and
after reassigning the particular video player to the video feed from the camera in the second subset of cameras, transcoding the video feed from the camera.

10. The method of claim 1, further comprising determining a video refresh rate for the video feed from the particular camera based on one or more connection parameters;
wherein displaying the user interface with the video feed comprises displaying the video feed at the determined video refresh rate.

11. The method of claim 1, further comprising, in response to the request for the video feed from the particular camera, receiving a portion of the video feed corresponding to a previously detected motion event;

wherein displaying the user interface with the video feed comprises displaying the portion of the video feed corresponding to the previously detected motion event.

12. An electronic device, comprising:
a display;
one or more processors;
memory storing one or more programs to be executed by the one or more processors, the one or more programs comprising instructions for:
receiving a request from a user to execute an application for communicating with a plurality of smart devices, the plurality of smart devices including a plurality of cameras;
in response to receiving the user request to execute the application, establishing a preliminary connection via one or more wireless networks for each of at least a subset of the plurality of cameras, wherein establishing each preliminary network connection comprises completing a communication handshake between the electronic device and the camera;
identifying a user interface for display to the user via the display based on one or more characteristics of the electronic device, the user interface including a video feed from a particular camera of the plurality of cameras;
after identifying the user interface for display, determining whether a preliminary connection has been established for the particular camera;
in accordance with a determination that the preliminary connection has been established for the particular camera, requesting, via the preliminary connection, the video feed for the particular camera; and
displaying the user interface with the video feed for the particular camera via the display.

13. The electronic device of claim 12, wherein the one or more programs further comprise instructions for:
in accordance with a determination that the preliminary connection has not been established for the particular camera, establishing the preliminary connection for the particular camera; and
requesting, via the preliminary connection, the video feed for the particular camera.

14. The electronic device of claim 12, wherein the one or more programs further comprise instructions for:
predicting a display order for the plurality of cameras; and
ranking the plurality of cameras in accordance with the predicted display order;
wherein establishing the preliminary connection for each of at least the subset of the plurality of cameras comprises establishing the preliminary connection for each of at least the subset of the plurality of cameras based on the ranking.

15. The electronic device of claim 12, wherein the identified user interface includes a plurality of video players for simultaneous display to the user, and wherein the one or more programs further comprise instructions for:
determining that video feeds from a first subset of cameras of the plurality of cameras are to be displayed within the identified user interface, the first subset of cameras including the particular camera; and
assigning a video feed from each camera of the first subset of cameras to a video player of the plurality of video players, including assigning the video feed from the particular camera to a particular video player;
wherein displaying the user interface with the video feed comprises displaying a first view of the user interface including video feeds from each camera of the first subset of cameras.

16. A non-transitory computer-readable storage medium storing one or more programs, the one or more programs comprising instructions, which, when executed by an electronic device with a display and one or more processors, cause the electronic device to perform operations comprising:
receiving a request from a user to execute an application for communicating with a plurality of smart devices, the plurality of smart devices including a plurality of cameras;
in response to receiving the user request to execute the application, establishing a preliminary connection via one or more wireless networks for each of at least a subset of the plurality of cameras, wherein establishing each preliminary network connection comprises completing a communication handshake between the electronic device and the camera;
identifying a user interface for display to the user via the display based on one or more characteristics of the electronic device, the user interface including a video feed from a particular camera of the plurality of cameras;
after identifying the user interface for display, determining whether a preliminary connection has been established for the particular camera;
in accordance with a determination that the preliminary connection has been established for the particular camera, requesting, via the preliminary connection, the video feed for the particular camera; and
displaying the user interface with the video feed for the particular camera via the display.

17. The non-transitory computer-readable storage medium of claim 16, wherein the one or more programs further comprise instructions, which, when executed by the electronic device, cause the electronic device to perform operations comprising:
in accordance with a determination that the preliminary connection has not been established for the particular camera, establishing the preliminary connection for the particular camera; and
requesting, via the preliminary connection, the video feed for the particular camera.

18. The non-transitory computer-readable storage medium of claim 16, wherein the one or more programs further comprise instructions, which, when executed by the electronic device, cause the electronic device to perform operations comprising:
predicting a display order for the plurality of cameras; and
ranking the plurality of cameras in accordance with the predicted display order;
wherein establishing the preliminary connection for each of at least the subset of the plurality of cameras comprises establishing the preliminary connection for each of at least the subset of the plurality of cameras based on the ranking.

19. The non-transitory computer-readable storage medium of claim 16, wherein the identified user interface includes a plurality of video players for simultaneous display to the user, and wherein the one or more programs further comprise instructions, which, when executed by the electronic device, cause the electronic device to perform operations comprising:

determining that video feeds from a first subset of cameras of the plurality of cameras are to be displayed within the identified user interface, the first subset of cameras including the particular camera; and assigning a video feed from each camera of the first subset of cameras to a video player of the plurality of video players, including assigning the video feed from the particular camera to a particular video player;

wherein displaying the user interface with the video feed comprises displaying a first view of the user interface including video feeds from each camera of the first subset of cameras.

* * * * *